United States Patent
Guan et al.

(10) Patent No.: US 9,504,054 B2
(45) Date of Patent: Nov. 22, 2016

(54) METHOD AND APPARATUS FOR SENDING UPLINK/DOWNLINK SCHEDULING INFORMATION, AND METHOD AND APPARATUS FOR RECEIVING UPLINK/DOWNLINK SCHEDULING INFORMATION

(71) Applicant: HUAWEI TECHNOLOGIES CO., LTD., Shenzhen (CN)

(72) Inventors: Lei Guan, Beijing (CN); Wenji Liu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 371 days.

(21) Appl. No.: 13/956,899

(22) Filed: Aug. 1, 2013

(65) Prior Publication Data

US 2013/0322378 A1 Dec. 5, 2013

Related U.S. Application Data

(63) Continuation of application No. PCT/CN2012/070828, filed on Feb. 1, 2012.

(30) Foreign Application Priority Data

Feb. 1, 2011 (CN) .......................... 2011 1 0034427
Oct. 20, 2011 (CN) .......................... 2011 1 0320442

(51) Int. Cl.
*H04W 72/12* (2009.01)
*H04L 5/00* (2006.01)

(52) U.S. Cl.
CPC ......... *H04W 72/12* (2013.01); *H04W 72/1289* (2013.01); *H04L 5/0037* (2013.01); *H04L 5/0073* (2013.01); *H04W 72/1273* (2013.01)

(58) Field of Classification Search
CPC ............ H04W 72/12; H04W 72/1289; H04W 72/1273; H04L 5/0037; H04L 5/0073
See application file for complete search history.

(56) References Cited

U.S. PATENT DOCUMENTS 8,054,767 B2 * 11/2011 Choi ..................... H04L 5/0053
370/252
2010/0027446 A1 2/2010 Choi et al.
(Continued)

FOREIGN PATENT DOCUMENTS

CN 101296508 10/2008
CN 101606347 12/2009
(Continued)

OTHER PUBLICATIONS

*Issues on Carrier Aggregation for Advance E-UTRA*, 3GPP TSG RAN WG1 #55bis, R1-090280, Ljubljana, Slovenia, Jan. 12-16, 2009, pp. 1-5.
(Continued)

*Primary Examiner* — Andrew Lai
*Assistant Examiner* — Chuong M Nguyen
(74) *Attorney, Agent, or Firm* — Staas & Halsey LLP

(57) ABSTRACT

The present invention provides a method and an apparatus for sending uplink/downlink scheduling information, and a method and an apparatus for receiving uplink/downlink scheduling information. The method for sending downlink scheduling information includes: determining, in downlink subframes on a second carrier, a first downlink subframe, in which at time corresponding to the first downlink subframe, a subframe on a first carrier is an uplink subframe; and sending, on a fifth downlink subframe on the first carrier, downlink scheduling information corresponding to the first downlink subframe on the second carrier to a terminal, in which time corresponding to the fifth downlink subframe is before the time corresponding to the first downlink sub-
(Continued)

frame. The present invention achieves the purpose of performing uplink and downlink scheduling on a second carrier through a first carrier bearing a PDCCH.

13 Claims, 14 Drawing Sheets

(56) References Cited

U.S. PATENT DOCUMENTS

| | | | | |
|---|---|---|---|---|
| 2011/0013543 | A1* | 1/2011 | Lim | H04W 72/042 370/281 |
| 2011/0070845 | A1* | 3/2011 | Chen | H04L 5/001 455/91 |
| 2012/0113941 | A1* | 5/2012 | Chung | H04W 72/1289 370/329 |
| 2012/0257554 | A1* | 10/2012 | Kim | H04L 5/001 370/280 |
| 2013/0322378 | A1 | 12/2013 | Guan et al. | |

FOREIGN PATENT DOCUMENTS

| | | |
|---|---|---|
| CN | 101651895 | 2/2010 |
| CN | 101729221 | 6/2010 |
| CN | 101772179 | 7/2010 |
| CN | 102624507 | 8/2012 |
| WO | WO2008127015 | 10/2008 |
| WO | WO2010/077051 | 7/2010 |
| WO | 2011/005032 A2 | 1/2011 |
| WO | WO2011053990 | 5/2011 |

OTHER PUBLICATIONS

*PDCCH structure for multiple component carriers*, 3GPP TSG RAN WG1 #56, R1-090653, Athens, Greece, Feb. 9-13, 2009, pp. 2-5.
*Issues on Cross-Carrier PDCCH Indication for Carrier Aggregation*, 3GPP TSG RAN WG1 meeting #58, R1-093047, Shenzhen, China, Aug. 24-28, 2009 (6 pp.).
*PDCCH blind decoding and search space for carrier aggregation of LTE-A*, 3GPP TSG-RAN WG1 #61, R1-102892, Montreal, Canada, May 10-14, 2010, pp. 2-9.
Notice of Reasons for Rejection, dated Jun. 10, 2014, in corresponding Japanese Application No. 2013-552093 (6 pp.).
*3rd Generation Partnership Project; Technical Specification Group Radio Access Network; Evolved Universal Terrestrial Radio Access (E-UTRA); Physical channels and modulation (Release 10)*, 3GPP TS 36.211 V10.0.0, Dec. 2010, pp. 1-103.
*3rd Generation Partnership Project; Technical Specification Group Radio Access Network; Evolved Universal Terrestrial Radio Access (E-UTRA); Physical layer procedures (Release 10)*, 3GPP TS 36.213 V10.0.1, Dec. 2010, pp. 1-98.
International Search Report and Written Opinion, dated May 3, 2012, in corresponding International Application No. PCT/CN2012/070828 (15 pp.).
*HARQ and Cross-carrier Scheduling for Different TDD Configurations*, 3GPP TSG RAN WG2 Meeting #74, R2-112798, Barcelona, Spain, May 9-13, 2011, pp. 1-3, XP50495238.
*Data scheduling in CA with different TDD UL-DL configurations*, 3GPP TSG RAN WG1 Meeting #66, R1-112503, Athens, Greece, Aug. 22-26, 2011, pp. 1-3, XP50537588.
*Support of Different TDD UL-DL Configurations on Different Bands*, 3GPP TSG-RAN WG1 #66, R1-112540, Athens, Greece, Aug. 22-26, 2011, pp. 1-3, XP50537617.
*Cross Carrier Scheduling Scenarios for CC Specific TDD Configuration*, 3GPP TSG-RAN WG1 Meeting#66bis, R1-113166, Zhuhai, China, Oct. 10-14, 2011 (2 pp.) XP50538298.
*HARQ Procedure for Full Duplex Mode in CC specific TDD configuration*, 3GPP TSG-RAN WG1 Meeting #67, R1-113888, San Francisco, CA, Nov. 14-18, 2011 (5 pp.) XP50561969.
Extended European Search Report, dated Apr. 7, 2014, in corresponding European Application No. 12741978.6 (9 pp.).
International Search Report mailed May 3, 2012 in corresponding International Application No. PCT/CN2012/070828.
European Office Action dated Dec. 7, 2015 in corresponding European Patent Application No. 12 741 978.6.
Chinese Office Action and Search Report dated Oct. 12, 2015 in corresponding corresponding Chinese Patent Application No. 201280007253.0.

\* cited by examiner

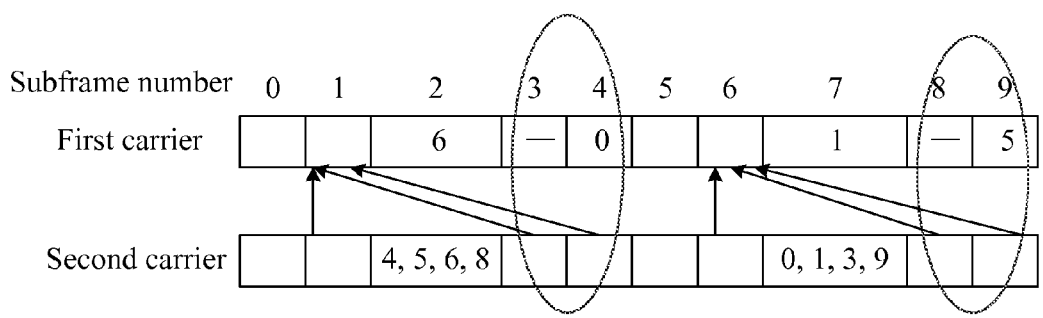

FIG. 2B

| A base station determines, in downlink subframes on a second carrier, a first downlink subframe, in which at time corresponding to the first downlink subframe, a subframe on a first carrier is an uplink subframe | 31 |

| The base station sends, on a fifth downlink subframe on the first carrier, downlink scheduling information corresponding to the first downlink subframe on the second carrier to a terminal, in which the time corresponding to the fifth downlink subframe is before the time corresponding to the first downlink subframe, and the fifth downlink subframe bears downlink scheduling information corresponding to at most one first downlink subframe on the second carrier | 32 |

FIG. 3A

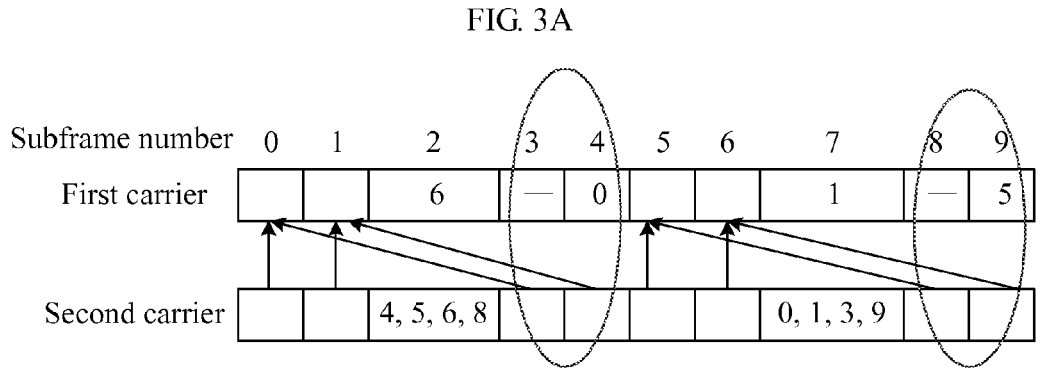

FIG. 3B

| A base station determines, in downlink subframes on a second carrier, a first downlink subframe, in which at time corresponding to the first downlink subframe, a subframe on a first carrier is an uplink subframe | 41A |

↓

| The base station sends, on a fifth downlink subframe on the first carrier, downlink scheduling information corresponding to the first downlink subframe on the second carrier to a terminal, in which a subframe on the second carrier at time corresponding to the fifth downlink subframe is an uplink subframe; the time corresponding to the fifth downlink subframe is before the time corresponding to the first downlink subframe | 42A |

FIG. 4A

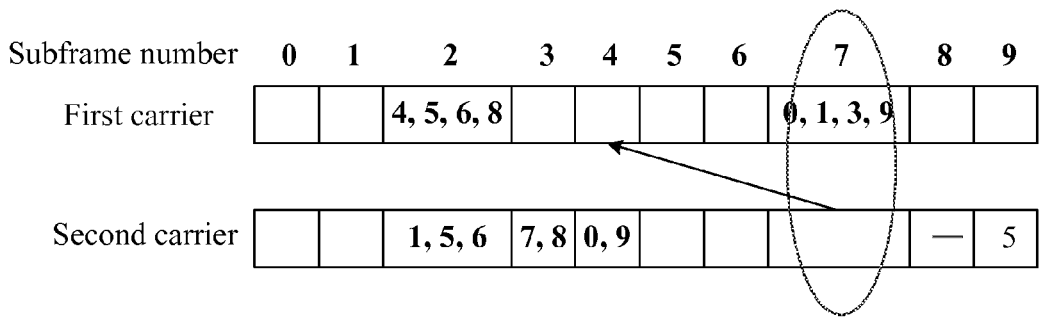

FIG. 4B

| A base station determines, in downlink subframes on a second carrier, a first downlink subframe, in which at an instant corresponding to the first downlink subframe, a subframe on a first carrier is an uplink subframe | 41B |

↓

| The base station sends, on a fifth downlink subframe on the first carrier, downlink scheduling information corresponding to the first downlink subframe on the second carrier to a terminal, in which time corresponding to the fifth downlink subframe is before the time corresponding to the first downlink subframe, and on the first carrier, ACK/NACK binding does not need to be performed on a subframe where an uplink ACK/NACK corresponding to a PDSCH on the fifth downlink subframe is located | 42B |

FIG. 4C

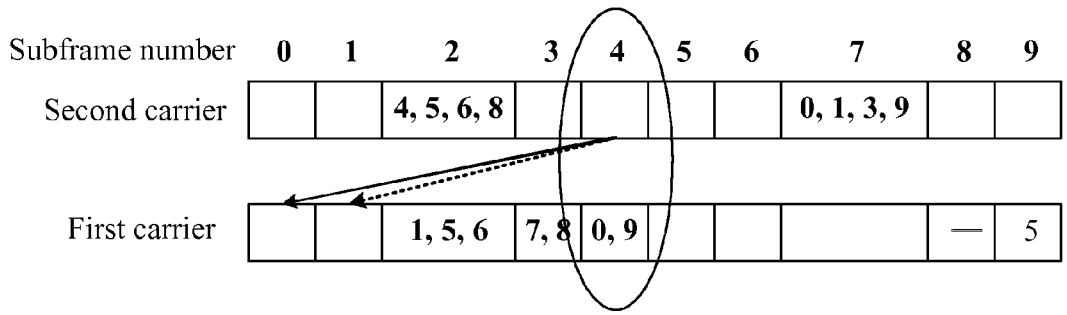

FIG. 4D

| A base station determines, in uplink subframes on a second carrier, a first uplink subframe, in which at time corresponding to a third downlink subframe for scheduling the first uplink subframe on the second carrier during non-cross-carrier scheduling, a subframe on a first carrier is an uplink subframe | 51 |

↓

| The base station sends, on a sixth downlink subframe on the first carrier, uplink scheduling information corresponding to the first uplink subframe on the second carrier to a terminal, in which time corresponding to the sixth downlink subframe is before that corresponding to the first uplink subframe | 52 |

FIG. 5A

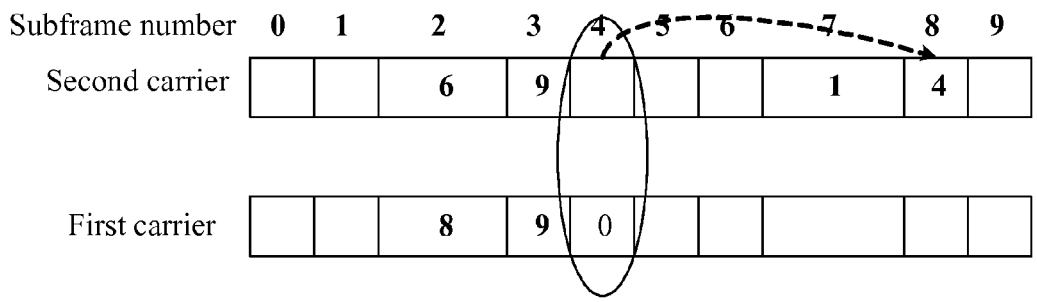

FIG. 5B

A base station determines, in uplink subframes on a second carrier, a first uplink subframe, in which at time corresponding to a third downlink subframe for scheduling the first uplink subframe on the second carrier during non-cross-carrier scheduling, a subframe on a first carrier is an uplink subframe ~61

The base station sends, on the sixth downlink subframe on the first carrier, uplink scheduling information corresponding to the first uplink subframe on the second carrier to the terminal, in which the latency between sending time corresponding to the sixth downlink subframe and that corresponding to the first uplink subframe on the second carrier is minimum, and the sixth downlink subframe and the first uplink subframe are at least spaced by N subframes; the time corresponding to the sixth downlink subframe is before that corresponding to the first uplink subframe ~62

FIG. 6A

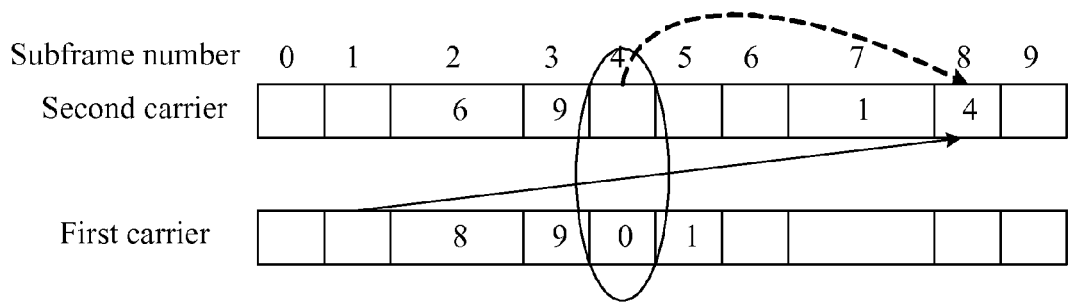

FIG. 6B

A base station determines, in uplink subframes on a second carrier, a first uplink subframe, in which at time corresponding to a third downlink subframe for scheduling the first uplink subframe on the second carrier during non-cross-carrier scheduling, a subframe on a first carrier is an uplink subframe  71

The base station sends, on a sixth downlink subframe on the first carrier, uplink scheduling information corresponding to the first uplink subframe on the second carrier to a terminal, in which time corresponding to the sixth downlink subframe is before that corresponding to the first uplink subframe, and the sixth downlink subframe bears uplink scheduling information corresponding to at most one first uplink subframe on the second carrier  72

FIG. 7A

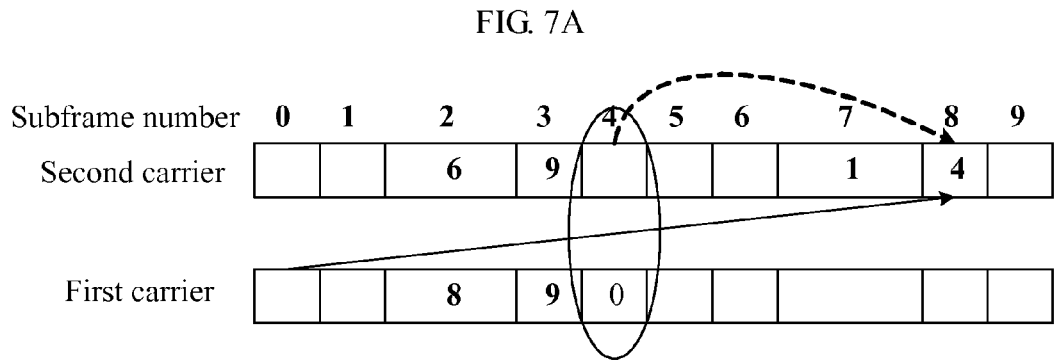

FIG. 7B

A base station determines, in uplink subframes on a second carrier, a first uplink subframe, in which at time corresponding to a third downlink subframe for scheduling the first uplink subframe on the second carrier during non-cross-carrier scheduling, a subframe on a first carrier is an uplink subframe  81

The base station sends, on a sixth downlink subframe on the first carrier, to the terminal a UL_grant corresponding to the first uplink subframe on the second carrier, in which a subframe on the second carrier at time corresponding to that of the sixth downlink subframe bears no UL_grant during non-cross-carrier scheduling; the time corresponding to the sixth downlink subframe is before that corresponding to the first uplink subframe  82

FIG. 8

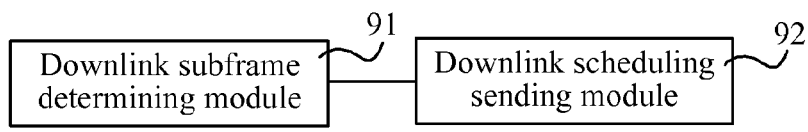

FIG. 9

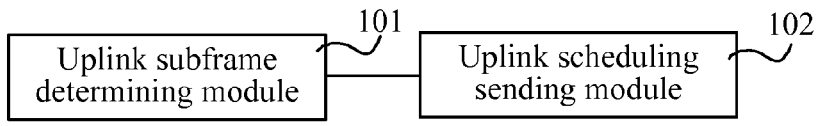

FIG. 10

A terminal receives, on a fifth downlink subframe on a first carrier and at time before that of a first downlink subframe, downlink scheduling information, sent by a base station, corresponding to the first downlink subframe on a second carrier, in which at time corresponding to the first downlink subframe on the second carrier, a subframe on the first carrier is an uplink subframe    111

The terminal receives, on the first downlink subframe on the second carrier, downlink data corresponding to the downlink scheduling information according to the received downlink scheduling information    112

FIG. 11

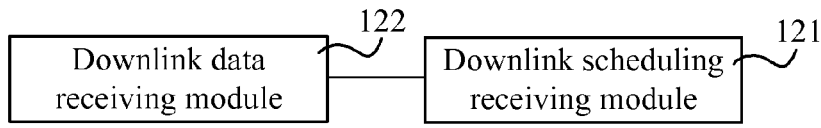

FIG. 12A

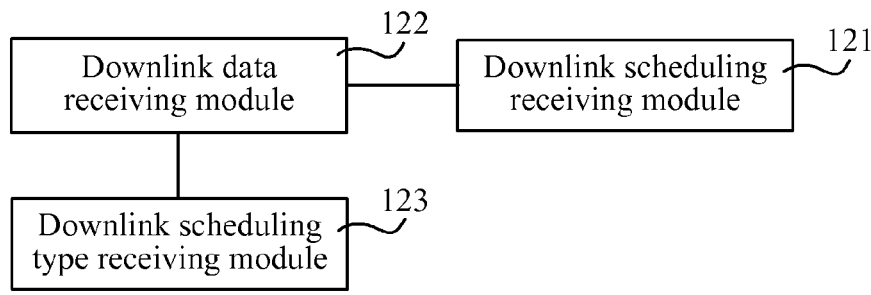

FIG. 12B

A terminal receives, on a sixth downlink subframe on a first carrier and at time before that of a first uplink subframe, uplink scheduling information which is sent by a base station and is corresponding to the first uplink subframe on a second carrier, in which at time corresponding to a third downlink subframe, on the second carrier, for scheduling the first uplink subframe during non-cross-carrier scheduling, a subframe on a first carrier is an uplink subframe 131

The terminal sends, on the first uplink subframe on the second carrier, uplink data corresponding to the uplink scheduling information according to the received uplink scheduling information 132

FIG. 13

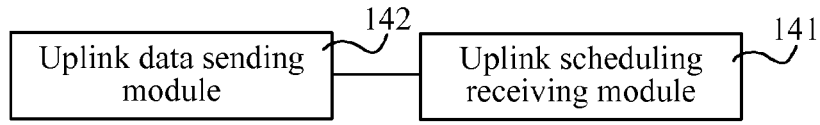

FIG. 14A

| Subframe number | 0 | 1 | 2 | 3 | 4 | 5 | 6 | 7 | 8 | 9 |
|---|---|---|---|---|---|---|---|---|---|---|
| Configuration 2 carrier (Macro cell C1 carrier) | | | 4, 5, 6, 8 | | Blank | | | 0, 1, 3, 9 | | |
| Configuration 3 carrier (Macro cell C2 carrier) | | | 1, 5, 6 | 7, 8 | 0, 9 | | | Blank | | |
| Configuration 2 carrier (Micro cell C1 carrier) | | | 4, 5, 6, 8 | Blank | | | | 0, 1, 3, 9 | | |
| Configuration 3 carrier (Micro cell C2 carrier) | | | 1, 5, 6 | 7, 8 | 0, 9 | | | | | |

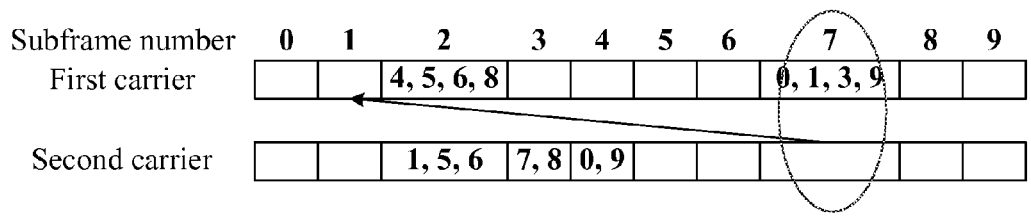

FIG. 16D

| A base station determines, in downlink subframes on a second carrier, a downlink subframe A | 171 |

The base station sends, on a downlink subframe B on a first carrier, downlink scheduling information of a downlink subframe A on a second carrier to a terminal, in which if a subframe on the first carrier at time the same as that of the downlink subframe A on the second carrier is an uplink subframe, time corresponding to the downlink subframe B is before the time corresponding to the downlink subframe A; or if a subframe on the first carrier at time the same as that of the downlink subframe A on the second carrier is a downlink subframe, time corresponding to the downlink subframe B is before the time corresponding to the downlink subframe A, or time corresponding to the downlink subframe B is the same time as the time corresponding to the downlink subframe A — 172

FIG. 17A

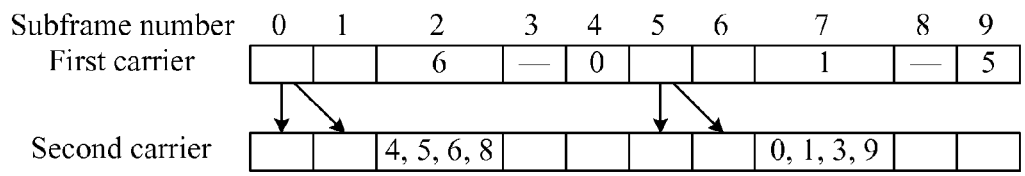

FIG. 17B

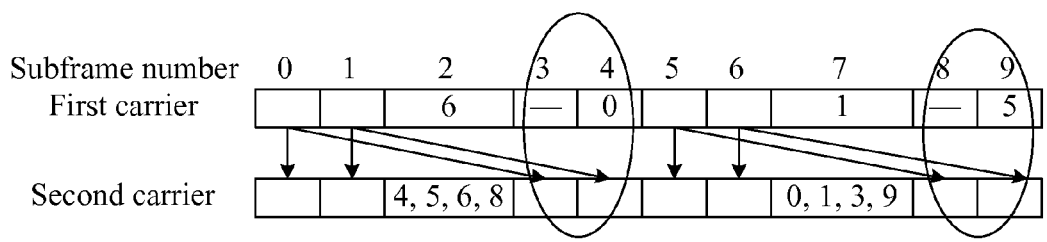

FIG. 17C

| A terminal receives, on a downlink subframe B on a first carrier, downlink scheduling information, of a downlink subframe A on a second carrier, sent by a base station, in which if a subframe on the first carrier at time the same as that of the downlink subframe A on the second carrier is an uplink subframe, time corresponding to the downlink subframe B is before the time corresponding to the downlink subframe A; or If a subframe on the first carrier at time the same as that of the downlink subframe A on the second carrier is a downlink subframe, time corresponding to the downlink subframe B is before the time corresponding to the downlink subframe A, or time corresponding to the downlink subframe B is the same time as the time corresponding to the downlink subframe A | 181 |

↓

| The terminal receives, on the downlink subframe A on the second carrier, downlink data corresponding to the downlink scheduling information according to the received downlink scheduling information | 182 |

FIG. 18

A terminal receives, on a downlink subframe D on a first carrier, uplink scheduling information, of an uplink subframe C on a second carrier, sent by a base station, in which the interval between the time corresponding to the subframe E on the first carrier and the time corresponding to the uplink subframe C is the scheduling interval: N subframes, and if the subframe E is a downlink subframe, the subframe E satisfying the minimum scheduling interval: N subframes is a downlink subframe, and the downlink subframe D and the subframe E are the subframe with the same time, or the downlink subframe D is before the subframe E; or if the subframe E is an uplink subframe, the downlink subframe D is before the subframe E; and N is the number of subframes at least spaced by between receiving, by a terminal, the uplink scheduling information and sending, by the terminal, the uplink data corresponding to the uplink scheduling information ~201

The terminal sends uplink data corresponding to the uplink scheduling information to the base station on the uplink subframe C on the second carrier according to the received uplink scheduling information ~202

FIG. 20

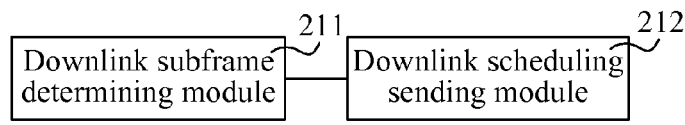

FIG. 21

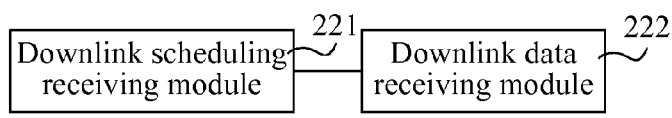

FIG. 22

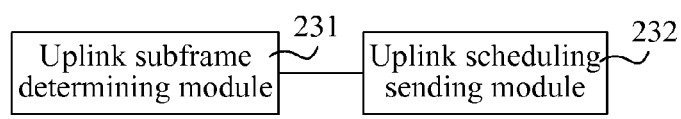

FIG. 23

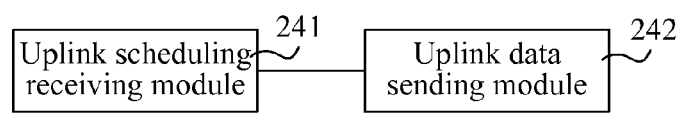

FIG. 24

METHOD AND APPARATUS FOR SENDING UPLINK/DOWNLINK SCHEDULING INFORMATION, AND METHOD AND APPARATUS FOR RECEIVING UPLINK/DOWNLINK SCHEDULING INFORMATION

CROSS-REFERENCE TO RELATED APPLICATIONS

This application is a continuation of International Application No. PCT/CN2012/070828, filed on Feb. 1, 2012, which claims priority to Chinese Patent Application No. 201110034427.X, filed on Feb. 1, 2011 and Chinese Patent Application No. 201110320442.0, filed on Oct. 20, 2011, all of which are hereby incorporated by reference in their entireties.

TECHNICAL FIELD

Embodiments of the present invention relate to communications technologies, and in particular, to a method for sending downlink scheduling information, a method for receiving downlink scheduling information, a method for sending uplink scheduling information, a method for receiving uplink scheduling information, an apparatus for sending downlink scheduling information, an apparatus for receiving downlink scheduling information, an apparatus for sending uplink scheduling information, and an apparatus for receiving uplink scheduling information.

BACKGROUND

In an LTE Release 8 (R8) system, a base station and a terminal communicate and transmit data on a carrier. The terminal scheduled by the base station can have its own physical downlink control channel (Physical Downlink Control Channel, PDCCH for short) in each subframe. Information carried in the PDCCH can be a downlink_grant (Downlink_grant, DL_grant for short) or downlink_Assignment (Downlink_Assignment, DL_Assignment for short), and the DL_grant or DL_Assignment carries scheduling information indicating time frequency resource assignment and the like of a physical downlink shared channel (Physical Downlink Shared Channel, PDSCH for short). The information borne in the PDCCH can also be an uplink_grant (Uownlink_grant, UL_grant for short) or uplink_assignment (Uplink_Assignment, UL_Assignment for short), and the UL grant or UL_Assignment carries scheduling information indicating time frequency resource assignment and the like of a physical uplink shared channel (Physical Uplink Shared Channel, PUSCH for short). The terminal receives and decodes a PDCCH in a corresponding PDCCH search space, and correspondingly receives downlink data PDSCH or sends uplink data PUSCH. Afterward, the terminal feeds back an uplink ACK/NACK for the downlink data, or the base station feeds back a downlink ACK/NACK for the uplink data, and the downlink ACK/NACK is also called a physical HARQ indicator channel (Physical HARQ Indicator Channel, PHICH for short).

In a time division duplexing (Time Division Duplexing, TDD for short) system, both transmission and reception are completed at different time of a same frequency band, namely, the uplink and the downlink are distinguished based on time. An LTE system can support seven different uplink and downlink subframe configurations, and which uplink and downlink subframe configuration is specifically adopted can be notified to the terminal through a broadcast message.

However, when a PDCCH corresponding to one carrier is sent on the other carrier, if uplink and downlink configurations of the two carriers are not the same, the type of a subframe on the one carrier and that of a subframe, at the same time as that of the one carrier, on the other carrier may be different, and downlink scheduling information or uplink scheduling information on the one carrier cannot be sent on a subframe corresponding to the other carrier, so uplink and downlink scheduling cannot be performed, through the other carrier bearing a PDCCH, on the one carrier bearing no PDCCH.

SUMMARY

Embodiments of the present invention provide a method for sending downlink scheduling information, a method for receiving downlink scheduling information, a method for sending uplink scheduling information, a method for receiving uplink scheduling information, an apparatus for sending downlink scheduling information, an apparatus for receiving downlink scheduling information, an apparatus for sending uplink scheduling information, and an apparatus for receiving uplink scheduling information, which are used to solve the defect in the prior art that when an uplink and a downlink are configured with different carrier aggregation, uplink and downlink scheduling cannot be performed on a second carrier bearing no PDCCH through a first carrier bearing a PDCCH.

According to an aspect of the present invention, a method for sending downlink scheduling information is provided, and includes:

determining, in downlink subframes on a second carrier, a first downlink subframe, in which at time corresponding to the first downlink subframe, a subframe on a first carrier is an uplink subframe; and sending, on a fifth downlink subframe on the first carrier, downlink scheduling information corresponding to the first downlink subframe on the second carrier to a terminal, in which time corresponding to the fifth downlink subframe is before the time corresponding to the first downlink subframe.

According to another aspect of the present invention, an apparatus for sending downlink scheduling information is provided, and includes:

a downlink scheduling receiving module, configured to receive, on a fifth downlink subframe that is on a first carrier and that is at time before time of a first downlink subframe, downlink scheduling information which is sent by a base station and is corresponding to the first downlink subframe on a second carrier, in which at time corresponding to the first downlink subframe on the second carrier, a subframe on the first carrier is an uplink subframe; and a downlink data receiving module, configured to receive, on the first downlink subframe on the second carrier, downlink data corresponding to the downlink scheduling information according to the received downlink scheduling information.

According to still another aspect of the present invention, a method for receiving downlink scheduling information is provided, and includes:

on a downlink subframe that is on a first carrier and that is at time before time of a first downlink subframe, receiving downlink scheduling information, sent by a base station in a cross-subframe manner, corresponding to the first downlink subframe on a second carrier, and downlink scheduling information, sent by the base station in a subframe with the same time manner, corresponding to a second downlink subframe on the second carrier, in which a subframe with the same time on the first carrier and of the first downlink subframe on the second carrier is an uplink subframe; and a subframe with the same time of the first carrier and of the second downlink subframe on the second carrier is a downlink subframe;

at the time of determining that a cross-carrier downlink scheduling type of a downlink subframe on the first carrier is subframe with the same time downlink scheduling, receiving, in a subframe with the same time manner on the second carrier, downlink data scheduled by downlink scheduling information; and at the time of determining that a cross-carrier downlink scheduling type of a downlink subframe on the first carrier is cross-subframe downlink scheduling, receiving, in a cross-subframe manner on the second carrier, downlink data scheduled by downlink scheduling information.

According to still another aspect of the present invention, an apparatus for receiving downlink scheduling information is provided, where the apparatus includes:

a downlink scheduling receiving module, configured to, on a downlink subframe that is on a first carrier and that is at time before time of a first downlink subframe, receive downlink scheduling information, sent by a base station in a cross-subframe manner, corresponding to the first downlink subframe on a second carrier, and downlink scheduling information, sent by the base station in a subframe with the same time manner, corresponding to a second downlink subframe on the second carrier, in which a subframe with the same time on the first carrier and of the first downlink subframe on the second carrier is an uplink subframe; and a subframe with the same time of the first carrier and of the second downlink subframe on the second carrier is a downlink subframe;

a first downlink data receiving module, configured to, at the time of determining that a cross-carrier downlink scheduling type of a downlink subframe on the first carrier is subframe with the same time downlink scheduling, receive, in a subframe with the same time manner on the second carrier, downlink data scheduled by downlink scheduling information; and a second downlink data receiving module, configured to, at the time of determining that a cross-carrier downlink scheduling type of a downlink subframe on the first carrier is cross-subframe downlink scheduling, receive, in a cross-subframe manner on the second carrier, downlink data scheduled by downlink scheduling information.

According to still another aspect of the present invention, a method and an apparatus for sending downlink scheduling information, and a method and an apparatus for receiving downlink scheduling information are provided. when a first carrier bears a PDCCH on a second carrier, in order that a PDSCH on the second carrier can be scheduled in a cross-carrier manner on the first carrier, a base station sends, on a fifth downlink subframe on the first carrier, downlink scheduling information corresponding to a first downlink subframe, on the second carrier, whose subframe with the same time on the first carrier is an uplink subframe. Therefore, at the time of cross-carrier PDCCH scheduling, the base station can send, on the first carrier, downlink scheduling information for scheduling the PDSCH on the second carrier.

According to still another aspect of the present invention, a method for sending uplink scheduling information is provided, and includes:

determining, in uplink subframes on a second carrier, a first uplink subframe, in which at time corresponding to a third downlink subframe for scheduling the first uplink subframe on the second carrier during non-cross-carrier scheduling, a subframe on a first carrier is an uplink subframe; and sending, on a sixth downlink subframe on the first carrier, uplink scheduling information corresponding to the first uplink subframe on the second carrier to a terminal, in which time corresponding to the sixth downlink subframe is before time corresponding to the first uplink subframe.

According to still another aspect of the present invention, an apparatus for sending uplink scheduling information is provided, and includes:

an uplink subframe determining module, configured to determine, in uplink subframes on a second carrier, a first uplink subframe, in which at time corresponding to a third downlink subframe for scheduling the first uplink subframe on the second carrier during non-cross-carrier scheduling, a subframe on the first carrier is an uplink subframe; and an uplink scheduling sending module, configured to send, on a sixth downlink subframe on the first carrier, uplink scheduling information corresponding to the first uplink subframe on the second carrier to a terminal, in which time corresponding to the sixth downlink subframe is before time corresponding to the first uplink subframe.

According to still another aspect of the present invention, a method for receiving uplink scheduling information is provided, and includes:

on a sixth downlink subframe that is on a first carrier and that is at time before time of a first uplink subframe, receiving uplink scheduling information which is sent by a base station and is corresponding to the first uplink subframe on a second carrier, in which at time corresponding to a third downlink subframe for scheduling the first uplink subframe on the second carrier during non-cross-carrier scheduling, a subframe on the first carrier is an uplink subframe; and sending, on the first uplink subframe on the second carrier, uplink data corresponding to the uplink scheduling information according to the received uplink scheduling information.

According to still another aspect of the present invention, an apparatus for receiving uplink scheduling information is provided, and includes:

an uplink scheduling receiving module, configured to receive, on a sixth downlink subframe that is on a first carrier and that is at time before time of a first uplink subframe, uplink scheduling information which is sent by a base station and is corresponding to the first uplink subframe on a second carrier, in which at time corresponding to a third downlink subframe for scheduling the first uplink subframe on the second carrier during non-cross-carrier scheduling, a subframe on the first carrier is an uplink subframe; and an uplink data sending module, configured to send, on the first uplink subframe on the second carrier, uplink data corresponding to the uplink scheduling information according to the received uplink scheduling information.

According to still another aspect of the present invention, a method and an apparatus for sending uplink scheduling information, and a method and an apparatus for receiving uplink scheduling information are provided. when a physical downlink control channel on a second carrier is borne on a first carrier, a base station adjusts, in a cross-subframe manner, uplink scheduling information corresponding to a third downlink subframe on the second carrier onto a sixth downlink subframe before a first uplink subframe on the first carrier and sends the uplink scheduling information. Therefore, at the time of cross-carrier PDCCH scheduling, the PUSCH on the second carrier can be scheduled on the first carrier.

According to still another aspect of the present invention, a method for sending downlink scheduling information is provided, and includes:

determining, in downlink subframes on a second carrier, a downlink subframe A; and sending, on a downlink subframe B on a first carrier, downlink scheduling information for scheduling the downlink subframe A on the second carrier to a terminal, in which if a subframe on the first carrier at time the same as that of the downlink subframe A on the second carrier is an uplink subframe, time corresponding to the downlink subframe B is before the time corresponding to the downlink subframe A; or if a subframe on the first carrier at time the same as that of the downlink subframe A on the second carrier is a downlink subframe, time corresponding to the downlink subframe B is before the time corresponding to the downlink subframe A, or, time corresponding to the downlink subframe B is the same time as the time corresponding to the downlink subframe A.

According to still another aspect of the present invention, an apparatus for sending downlink scheduling information is provided, and includes:

a downlink subframe determining module, for determining, in downlink subframes on a second carrier, a downlink subframe A; and a downlink scheduling sending module, for sending, on a downlink subframe B on a first carrier, downlink scheduling information of the downlink subframe A on the second carrier to a terminal, in which if a subframe on the first carrier at time the same as that of the downlink subframe A on the second carrier is an uplink subframe, time corresponding to the downlink subframe B is before the time corresponding to the downlink subframe A; or if a subframe on the first carrier at time the same as that of the downlink subframe A on the second carrier is a downlink subframe, time corresponding to the downlink subframe B is before the time corresponding to the downlink subframe A, or, time corresponding to the downlink subframe B is the same time as the time corresponding to the downlink subframe A.

According to still another aspect of the present invention, a method for receiving downlink scheduling information is provided, and includes:

receiving, by a terminal, on a downlink subframe B on a first carrier, downlink scheduling information, of a downlink subframe A on a second carrier, sent by a base station, in which if a subframe on the first carrier at time the same as that of the downlink subframe A on the second carrier is an uplink subframe, time corresponding to the downlink subframe B is before the time corresponding to the downlink subframe A; or if a subframe on the first carrier at time the same as that of the downlink subframe A on the second carrier is a downlink subframe, time corresponding to the downlink subframe B is before the time corresponding to the downlink subframe A, or, time corresponding to the downlink subframe B is the same time as the time corresponding to the downlink subframe A; and receiving, by the terminal on the downlink subframe A on the second carrier, downlink data corresponding to the downlink scheduling information according to the received downlink scheduling information.

According to still another aspect of the present invention, an apparatus for receiving downlink scheduling information is provided, and includes:

a downlink scheduling receiving module, configured to receive, on a downlink subframe B on a first carrier, downlink scheduling information, of a downlink subframe A on a second carrier, sent by a base station, in which if a subframe on the first carrier at time the same as that of the downlink subframe A on the second carrier is an uplink subframe, time corresponding to the downlink subframe B is before the time corresponding to the downlink subframe A; or if a subframe on the first carrier at time the same as that of the downlink subframe A on the second carrier is a downlink subframe, time corresponding to the downlink subframe B is before the time corresponding to the downlink subframe A, or, time corresponding to the downlink subframe B is the same time as the time corresponding to the downlink subframe A; and a downlink data receiving module, configured to receive, on the downlink subframe A on the second carrier, downlink data corresponding to the downlink scheduling information according to the received downlink scheduling information.

In the method and the apparatus for sending downlink scheduling information, and the method and the apparatus for receiving downlink scheduling information of the embodiments of the present invention, when a first carrier bears a PDCCH on a second carrier, if at time corresponding to a downlink subframe A on the second carrier, a subframe on the first carrier is an uplink subframe, a base station sends, on a downlink subframe B on the first carrier whose time is before the time corresponding to the downlink subframe A, downlink scheduling information corresponding to the downlink subframe A on the second carrier to a terminal, so when the first carrier schedules the second carrier in a cross-carrier manner, the base station can send, on the first carrier, downlink scheduling information for scheduling the PDSCH on the second carrier to the terminal. If at time corresponding to the downlink subframe A on the second carrier, a subframe on the first carrier is a downlink subframe, the base station can send, on the downlink subframe B on the first carrier whose time is before the time corresponding to the downlink subframe A, downlink scheduling information corresponding to the downlink subframe A on the second carrier to the terminal, or can also send, on the downlink subframe A of the first carrier, the downlink scheduling information corresponding to the downlink subframe A on the second carrier to the terminal.

According to still another aspect of the present invention, a method for sending uplink scheduling information is provided, and includes:

determining, in uplink subframes on a second carrier, an uplink subframe C; and sending, on a downlink subframe D on the first carrier, uplink scheduling information for scheduling the uplink subframe C on the second carrier to a terminal, in which an interval between time corresponding to a subframe E on the first carrier and time corresponding to the uplink subframe C is a scheduling interval: N subframes, and if the subframe E is a downlink subframe, the downlink subframe D and the subframe E are the subframe with the same time, or time corresponding to the downlink subframe D is before the time corresponding to the subframe E; or if the subframe E is an uplink subframe, time corresponding to the downlink subframe D is before the time corresponding to the subframe E; and the scheduling interval N is the number of subframes at least which are spaced by between time when the terminal receives the uplink scheduling information and time when the terminal sends uplink data corresponding to the uplink scheduling information.

According to still another aspect of the present invention, an apparatus for sending uplink scheduling information is provided, and includes:

an uplink subframe determining module, configured to determine, in uplink subframes on a second carrier, an uplink subframe C; and an uplink scheduling sending module, configured to send, on a downlink subframe D on the first carrier, uplink scheduling information of the uplink subframe C on the second carrier to a terminal, in which an interval between time corresponding to a subframe E on the first carrier and time corresponding to the uplink subframe C is a scheduling interval: N subframes, and if the subframe E is a downlink subframe, the downlink subframe D and the subframe E are the subframe with the same time, or the downlink subframe D is before the subframe E; or if the subframe E is an uplink subframe, the downlink subframe D is before the subframe E; and the N is the number of subframes at least which are spaced by between receiving, by the terminal, the uplink scheduling information and sending, by the terminal, uplink data corresponding to the uplink scheduling information.

According to still another aspect of the present invention, a method for receiving uplink scheduling information is provided, and includes:

receiving, by a terminal, on a downlink subframe D on a first carrier, uplink scheduling information, of an uplink subframe C on a second carrier, sent by a base station, in which an interval between time corresponding to a subframe E on the first carrier and time corresponding to the uplink subframe C is a scheduling interval: N subframes, and if the subframe E is a downlink subframe, the downlink subframe D and the subframe E are subframe with the same time, or the downlink subframe D is before the subframe E; or if the subframe E is an uplink subframe, the downlink subframe D is before the subframe E; and the N is the number of subframes at least which are spaced by between receiving, by the terminal, the uplink scheduling information and sending, by the terminal, uplink data corresponding to the uplink scheduling information; and sending, by the terminal, on the uplink subframe C on the second carrier, uplink data corresponding to the uplink scheduling information to the base station according to the received uplink scheduling information.

According to still another aspect of the present invention, an apparatus for receiving uplink scheduling information is provided, and includes:

an uplink scheduling receiving module, configured to receive, on a downlink subframe D on a first carrier, uplink scheduling information, of an uplink subframe C on a second carrier, sent by a base station, in which an interval between time corresponding to a subframe E on the first carrier and time corresponding to the uplink subframe C is a scheduling interval: N subframes, and if the subframe E is a downlink subframe, the downlink subframe D and the subframe E are subframe with the same time, or the downlink subframe D is before the subframe E; or if the subframe E is an uplink subframe, the downlink subframe D is before the subframe E; and the N is the number of subframes at least which are spaced by between receiving, by the terminal, the uplink scheduling information and sending, by the terminal, uplink data corresponding to the uplink scheduling information; and an uplink data sending module, configured to send, on the uplink subframe C on the second carrier, uplink data corresponding to the uplink scheduling information to the base station according to the received uplink scheduling information.

In the method and the apparatus for sending uplink scheduling information, and the method and the apparatus for receiving uplink scheduling information of the embodiments of the present invention, when a PDCCH on a second carrier is borne on a first carrier, and when a base station sends, on a downlink subframe D on the first carrier, uplink scheduling information corresponding to an uplink subframe C on the second carrier to a terminal, the downlink subframe D can be the downlink subframe E satisfying the minimum scheduling interval: N subframes between the downlink subframe E and the uplink subframe C, or can also be before the downlink subframe E; if a subframe satisfying the minimum scheduling interval: N subframes between the subframe and the uplink subframe C is an uplink subframe, the downlink subframe D is before the subframe satisfying the minimum scheduling interval: N subframes between the subframe and the uplink subframe C. Therefore, the base station can send, on the first carrier, uplink scheduling information for scheduling the PUSCH on the second carrier to the terminal, so as to solve the technical problem that when at time corresponding to the downlink subframe, on the second carrier, for scheduling the uplink subframe C during non-cross-carrier scheduling, a subframe on the first carrier is an uplink subframe, the base station schedules, on the first carrier, the uplink subframe C on the second carrier.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 2B is an application scenario diagram of Embodiment 2 of the method for sending downlink scheduling information provided by the present invention;

FIG. 3A is a flow chart of Embodiment 3 of the method for sending downlink scheduling information provided by the present invention;

FIG. 3B is an application scenario diagram of Embodiment 3 of the method for sending downlink scheduling information provided by the present invention;

FIG. 4A is a flow chart of Embodiment 4 of the method for sending downlink scheduling information provided by the present invention;

FIG. 4B is an application scenario diagram of Embodiment 4 of the method for sending downlink scheduling information provided by the present invention;

FIG. 4C is a flow chart of Embodiment 5 of the method for sending downlink scheduling information provided by the present invention;

FIG. 4D is an application scenario diagram of Embodiment 5 of the method for sending downlink scheduling information provided by the present invention;

FIG. 5A is a flow chart of Embodiment 1 of a method for sending uplink scheduling information provided by the present invention;

FIG. 5B is an application scenario diagram of Embodiment 1 of the method for sending uplink scheduling information provided by the present invention;

FIG. 6A is a flow chart of Embodiment 2 of the method for sending uplink scheduling information provided by the present invention;

FIG. 6B is an application scenario diagram of Embodiment 2 of the method for sending uplink scheduling information provided by the present invention;

FIG. 7A is a flow chart of Embodiment 3 of the method for sending uplink scheduling information provided by the present invention;

FIG. 7B is an application scenario diagram of Embodiment 3 of the method for sending uplink scheduling information provided by the present invention;

FIG. 8 is a flow chart of Embodiment 4 of the method for sending uplink scheduling information provided by the present invention;

FIG. 9 is a schematic structural diagram of Embodiment 1 of an apparatus for sending downlink scheduling information provided by the present invention;

FIG. 10 is a schematic structural diagram of Embodiment 1 of an apparatus for sending uplink scheduling information provided by the present invention;

FIG. 11 is a flow chart of Embodiment 1 of a method for receiving downlink scheduling information provided by the present invention;

FIG. 12A is a schematic structural diagram of Embodiment 1 of an apparatus for receiving downlink scheduling information provided by the present invention;

FIG. 12B is a schematic structural diagram of Embodiment 2 of the apparatus for receiving downlink scheduling information provided by the present invention;

FIG. 13 is a flow chart of Embodiment 1 of a method for receiving uplink scheduling information provided by the present invention;

FIG. 14A is a schematic structural diagram of Embodiment 1 of an apparatus for receiving uplink scheduling information provided by the present invention;

FIG. 16D is an application scenario diagram of Embodiment 6 of the method for sending downlink scheduling information provided by the present invention;

FIG. 17A is a flow chart of Embodiment 7 of the method for sending downlink scheduling information provided by the present invention;

FIG. 17B is an application scenario diagram of Embodiment 7 of the method for sending downlink scheduling information provided by the present invention;

FIG. 17C is another application scenario diagram of a flow chart of Embodiment 7 of the method for sending downlink scheduling information provided by the present invention;

FIG. 18 is a flow chart of Embodiment 2 of the method for receiving downlink scheduling information provided by the present invention;

FIG. 20 is a flow chart of Embodiment 2 of the method for receiving uplink scheduling information provided by the present invention;

FIG. 21 is a schematic structural diagram of Embodiment 2 of the apparatus for sending downlink scheduling information provided by the present invention;

FIG. 22 is a schematic structural diagram of Embodiment 3 of the apparatus for receiving downlink scheduling information provided by the present invention;

FIG. 23 is a schematic structural diagram of Embodiment 2 of the apparatus for sending uplink scheduling information provided by the present invention; and FIG. 24 is a schematic structural diagram of Embodiment 3 of the apparatus for receiving uplink scheduling information provided by the present invention.

DESCRIPTION OF EMBODIMENTS

To make the objectives, technical solutions, and advantages of the embodiments of the present invention more comprehensible, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

Figure 1A:
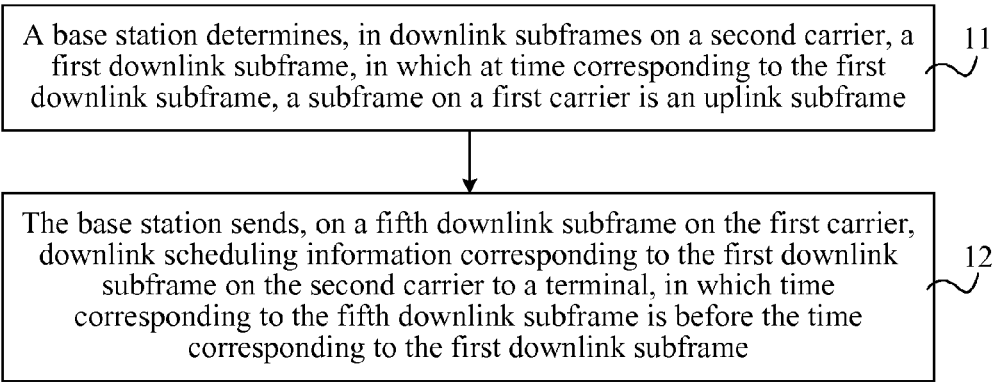
FIG. 1A is a flow chart of Embodiment 1 of a method for sending downlink scheduling information provided by the present invention.

FIG. 1A is a flow chart of Embodiment 1 of a method for sending downlink scheduling information provided by the present invention. As shown in FIG. 1A, this embodiment includes the following steps.

Step 11: A base station determines, in downlink subframes on a second carrier, a first downlink subframe, in which at time corresponding to the first downlink subframe, a subframe on a first carrier is an uplink subframe.

Cross-carrier PDCCH scheduling is to send a PDCCH corresponding to a carrier on another carrier. Information borne in the PDCCH can be a DL_grant or UL_grant, which carries scheduling information indicating time frequency resource assignment of a PDSCH or a PUSCH respectively. A downlink subframe on a carrier is used to bear downlink scheduling information and uplink scheduling information on the carrier. During multi-carrier aggregation, in the embodiment of the present invention, a carrier bearing a PDCCH corresponding to another carrier is referred to as a first carrier, and the another carrier is referred to as a second carrier. Two subframes on the first carrier and the second carrier at the same time are referred to as the subframe with the same, and two subframes at different time are referred to as cross subframes.

When a PDCCH is borne on the second carrier, a downlink subframe on the second carrier is used to bear downlink scheduling information and a PDSCH on the carrier. When the PDCCH on the second carrier is borne on the first carrier (cross-carrier scheduling) during multi-carrier aggregation, if a subframe with the same time on the first carrier and corresponding to a downlink subframe on the second carrier is an uplink subframe, downlink scheduling information corresponding to the downlink subframe on the second carrier (that is, downlink scheduling information used to schedule a PDSCH borne by the downlink subframe on the second carrier) cannot be sent on a subframe with the same time corresponding to the first carrier, so downlink scheduling on the second carrier cannot be implemented on the first carrier. In order to enable the downlink scheduling information corresponding to the downlink subframe on the second carrier to be sent on the first carrier, the base station needs to determine whether a subframe with the same time on the first carrier and corresponding to each downlink subframe on the second carrier is an uplink subframe. In the embodiment of the present invention, a subframe with the same time on the first carrier and of the first downlink subframe on the second carrier is an uplink subframe; a subframe with the same time of the first carrier and of the second downlink subframe on the second carrier is a downlink subframe.

A scenario that the downlink scheduling information on the second carrier cannot be sent on a subframe with the same time corresponding to the first carrier is illustrated in combination with a timing relationship between a PDCCH &PDSCH and an uplink ACK/NACK of the first carrier, and a timing relationship between a PDCCH &PDSCH and an uplink ACK/NACK of the second carrier in an LTE TDD system below. In the timing relationship between a PDCCH &PDSCH and an uplink ACK/NACK shown in FIG. 1B, the DL_grant and the PDSCH scheduled by the DL_grant are located on subframes with the same time, the PDSCH and the uplink ACK/NACK corresponding to the PDSCH are not located on subframes with the same time, subframes where digits are located are uplink subframes, and all other subframes are downlink subframes. A digit in an uplink subframe denotes a downlink subframe, an uplink ACK/NACK corresponding to a PDSCH of which needs to be fed back on the current uplink subframe. Taking the first carrier as an example, the digit in the uplink subframe 2 denotes that an uplink ACK/NACK corresponding to a PDSCH on a downlink subframe 6 of a previous radio frame needs to be fed back on the uplink subframe 2, and the downlink subframe 6 bears a PDSCH corresponding to an ACK/NACK on the uplink subframe 2 of a next radio frame and schedules the DL_grant of the PDSCH. The uplink ACK/NACK is ACK/NACK information fed back by the corresponding downlink subframe which performs scheduling.

Figure 1B:
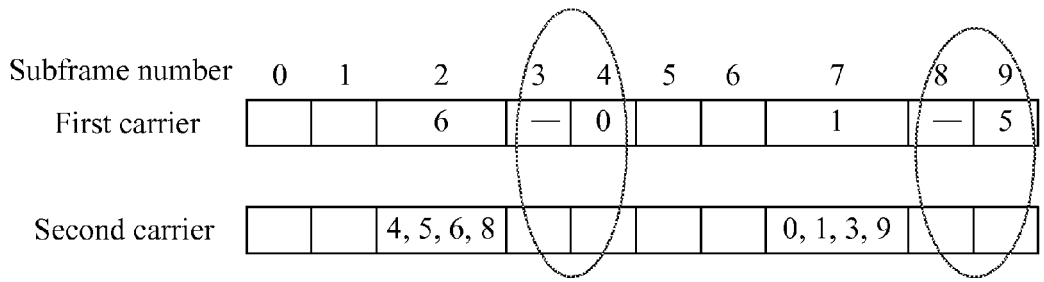
FIG. 1B is an application scenario diagram of Embodiment 1 of the method for sending downlink scheduling information provided by the present invention.

As shown in FIG. 1B, subframes on the first carrier at the same time as that of downlink subframes 3, 4, 8 and 9 on the second carrier are uplink subframes, namely, uplink and downlink configurations of the first carrier and the second carrier are different. Therefore, during cross-carrier scheduling, the downlink scheduling information corresponding to the downlink subframes 3, 4, 8 and 9 of the second carrier cannot be sent on the first carrier. All corresponding subframes with the same time on the first carrier and of the downlink subframes 3, 4, 8 and 9 of the second carrier are uplink subframes, which are referred to as first downlink subframes of the second carrier in the embodiment of the present invention. All corresponding subframes with the same time on the first carrier and of the downlink subframes 0, 1, 5 and 6 of the second carrier are downlink subframes, which are referred to as second downlink subframes of the second carrier in the embodiment of the present invention.

Step 12: The base station sends, on a fifth downlink subframe on the first carrier, downlink scheduling information corresponding to the first downlink subframe on the second carrier to a terminal, in which time corresponding to the fifth downlink subframe is before the time corresponding to the first downlink subframe.

A subframe with the same time on the first carrier and corresponding to a second downlink subframe on the second carrier is also a downlink subframe, so the downlink scheduling information corresponding to the second downlink subframe on the second carrier can be directly sent on a corresponding subframe with the same time on the first carrier. The downlink scheduling information corresponding to the first downlink subframe on the second carrier needs to be adjusted onto a downlink subframe on the first carrier and be borne. Therefore, when the base station determines that a first downlink subframe exists on the second carrier, downlink subframes, on the first carrier, whose time is before that of the first downlink subframe are determined, and the downlink scheduling information corresponding to the first downlink subframe on the second carrier is adjusted onto any one downlink subframe on the downlink subframes, on the first carrier, whose time is before that of the first downlink subframe and is borne. In the embodiment of the present invention, a downlink subframe, on the first carrier, used to bear the downlink scheduling information corresponding to the first downlink subframe on the second carrier is referred to as the fifth downlink subframe on the first carrier. The downlink scheduling information corresponding to the first downlink subframe on the second carrier is adjusted onto the fifth downlink subframe on the first carrier and is borne; the base station can notify the terminal of the time sequence relationship between subframes after the adjustment through signaling, and can also configure the timing relationship between subframes for the terminal, so that the terminal receives the downlink scheduling information according to the timing relationship between subframes, and replies with a corresponding ACK/NACK. Furthermore, the base station can also add a subframe indicator field into the downlink scheduling information of the first carrier, the subframe indicator field is used to indicate the downlink subframe on the second carrier scheduled by the downlink scheduling information in a cross-carrier manner, namely, indicate a downlink subframe, on the second carrier, on which the downlink data scheduled by the downlink scheduling information in a cross-carrier manner is located. For a specific indication method, reference is made to description in an embodiment corresponding to FIG. 17A.

As shown in FIG. 1B, DL-grant corresponding to the downlink subframes 3 and 4 of the second carrier can be adjusted to the downlink subframe 0 or 1 on the first carrier in a cross-subframe manner and be borne; DL-Grants corresponding to the downlink subframes 8 and 9 of the second carrier can be adjusted to the downlink subframe 5 or 6 on the first carrier in a cross-subframe manner.

Furthermore, the base station further sends downlink scheduling information corresponding to the second downlink subframe on the second carrier in a subframe with the same time manner, and sends the downlink scheduling information corresponding to the downlink subframe on the first carrier uplink in a subframe with the same time manner to the terminal on the fifth downlink subframe on the first carrier.

As far as a terminal is concerned, at most two PDCCHs are sent on each downlink subframe on the first carrier, and after the downlink scheduling information borne by the first downlink subframe on the second carrier is adjusted to the downlink subframe on the first carrier, one downlink subframe may send more than three PDCCHs. When more than three PDCCHs are sent on one downlink subframe on the first carrier, these PDCCHs are divided into three types, in which a type is used to schedule a PDSCH of the downlink subframe on the first carrier; another type is used to schedule a PDSCH corresponding to a subframe with the same time on the second carrier; still another type is used to schedule a PDSCH corresponding to a cross subframe on the second carrier. Under the situation without considering PDCCH loads of subframes, more than one PDSCH on the second carrier may be adjusted to the downlink subframe on the first carrier in a cross-subframe manner to be scheduled.

When the base station sends, on a downlink subframe that is on the first carrier and that is at time before time of the first downlink subframe, a PDCCH to the terminal, an independent scheduling manner can be adopted, or a joint scheduling manner can also be adopted. During independent scheduling, the downlink scheduling information for scheduling corresponding PDSCHs is sent to the terminal separately through a plurality of independent PDCCHs. Specifically, on downlink subframes of the first carrier, the downlink scheduling information borne by the first downlink subframe on the second carrier is sent in a cross-subframe manner to the terminal through a PDCCH, the downlink scheduling information borne by the second downlink subframe on the second carrier is sent in a subframe with the same time manner to the terminal through another PDCCH, and then the downlink scheduling information on the first carrier is sent to the terminal through another PDCCH. If a downlink subframe on the first carrier schedules more than one PDSCH on the second carrier in a cross-subframe downlink manner, corresponding PDSCHs are scheduled separately in a cross-subframe downlink manner through more than one independent PDCCH.

When the base station jointly schedules a plurality of PDSCHs on downlink subframes on the first carrier, the downlink scheduling information for scheduling the PDSCH on the second carrier in a cross-carrier manner is borne by adopting a PDCCH, namely, a PDSCH scheduled in a cross-subframe downlink manner and a PDSCH scheduled in a subframe with the same time downlink manner share a PDCCH. At this time, scheduling of two subframes shares control information in the PDCCH. For the PDSCH scheduled by the first carrier, the downlink scheduling information of the PDSCH is borne by adopting another independent PDCCH.

In the method for sending downlink scheduling information of the embodiment of the present invention, when a first carrier bears a PDCCH on a second carrier, in order that a PDSCH on the second carrier can be scheduled in a cross-carrier manner on the first carrier, a base station sends, on a fifth downlink subframe on the first carrier, downlink scheduling information corresponding to a first downlink subframe, on the second carrier, whose subframe with the same time on the first carrier is an uplink subframe. Therefore, at the time of cross-carrier PDCCH scheduling, the base station can send, on the first carrier, downlink scheduling information for scheduling the PDSCH on the second carrier.

Figure 2A:
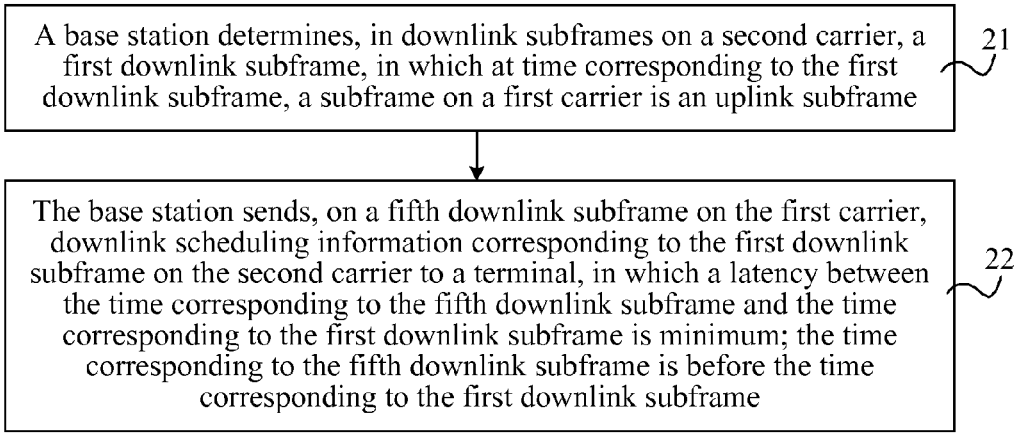
FIG. 2A is a flow chart of Embodiment 2 of the method for sending downlink scheduling information provided by the present invention.

FIG. 2A is a flow chart of Embodiment 2 of the method for sending downlink scheduling information provided by the present invention. In order to minimized the latency from sending, by a base station, downlink scheduling information to receiving, by a terminal, a corresponding PDSCH, as shown in FIG. 2A, this embodiment includes the following steps.

Step 21: A base station determines, in downlink subframes on a second carrier, a first downlink subframe, in which at time corresponding to the first downlink subframe, a subframe on a first carrier is an uplink subframe.

Step 22: The base station sends, on a fifth downlink subframe on the first carrier, downlink scheduling information corresponding to the first downlink subframe on the second carrier to a terminal, in which the latency between the time corresponding to the fifth downlink subframe and the time corresponding to the first downlink subframe is minimum; the time corresponding to the fifth downlink subframe is before the time corresponding to the first downlink subframe.

In this embodiment, on the first carrier, the latency between the time corresponding to the fifth downlink subframe and the time corresponding to the first downlink subframe is minimum, and the time corresponding to the fifth downlink subframe is before the time corresponding to the first downlink subframe. The base station sends, on the fifth downlink subframe on the first carrier, downlink scheduling information corresponding to the first downlink subframe on the second carrier to the terminal in a cross-subframe manner, in which the latency from the sending time corresponding to the fifth downlink subframe to that corresponding to the first downlink subframe on the second carrier is minimum. Moreover, the base station further sends the downlink scheduling information corresponding to the second downlink subframe on the second carrier and the downlink scheduling information corresponding to a downlink subframe on the first carrier to the terminal.

In consideration of minimizing the scheduling latency, as shown in FIG. 2B, according to the sending method provided by step 22, the DL-Grant corresponding to the downlink subframe 3 on the second carrier is adjusted onto the downlink subframe 1 of the first carrier and is sent, namely, the base station sends, on the downlink subframe 1 of the first carrier, the DL-Grant so as to schedule the PDSCH borne by the downlink subframe 3 on the second carrier, and the terminal receives, on the downlink subframe 3 of the second carrier, the PDSCH scheduled on the downlink subframe 1 of the first carrier. The latency between the downlink subframe 1 and the downlink subframe 3 is minimum, so the latency from sending, by the base station, the DL-Grant to receiving, by the terminal, the PDSCH scheduled by the DL-Grant is minimum. By the same token, the DL-Grant corresponding to the downlink subframe 4 on the second carrier is adjusted to the downlink subframe 1 of the first carrier and is sent. The DL-Grant corresponding to the downlink subframes 8 and 9 on the second carrier is adjusted to the downlink subframe 6 of the first carrier and is sent.

In this embodiment, when the downlink scheduling information corresponding to the first downlink subframe on the second carrier is adjusted to a downlink subframe on the first carrier at time before that of the first downlink subframe in a cross-subframe manner and is sent, minimization of the latency from sending, by the base station, the PDCCH to receiving, by the terminal, the PDSCH is considered, and the base station adjusts, in a cross-subframe manner, the downlink scheduling information corresponding to the first downlink subframe on the second carrier onto a downlink subframe on the first carrier, in which the latency from the sending time corresponding to the downlink subframe to that corresponding to the first downlink subframe on the second carrier is minimum.

FIG. 3A is a flow chart of Embodiment 3 of the method for sending downlink scheduling information provided by the present invention. In consideration that after the scheduling latency is minimized, the PDCCH load on a downlink subframe on the first carrier may be unbalanced, and in order to make compromise between minimization of the scheduling latency and balance of the PDCCH load, as shown in FIG. 3A, this embodiment includes the following steps.

Step 31: A base station determines, in downlink subframes on a second carrier, a first downlink subframe, in which at time corresponding to the first downlink subframe, a subframe on a first carrier is an uplink subframe.

Step 32: The base station sends, on a fifth downlink subframe on the first carrier, downlink scheduling information corresponding to the first downlink subframe on the second carrier to a terminal, in which the time corresponding to the fifth downlink subframe is before the time corresponding to the first downlink subframe, and the fifth downlink subframe bears downlink scheduling information corresponding to at most one first downlink subframe on the second carrier.

Step 32 can specifically be: the base station sends, on a seventh downlink subframe on the first carrier, downlink scheduling information corresponding to the first downlink subframe on the second carrier to a terminal. Moreover, the base station further sends the downlink scheduling information corresponding to the second downlink subframe on the second carrier and the downlink scheduling information corresponding to a downlink subframe on the first carrier to the terminal.

In consideration of the method for cross-subframe adjustment by adopting minimization of the scheduling latency, the following phenomenon may occur: one downlink subframe on the first carrier may bear downlink scheduling information of more than three PDSCHs, and another downlink subframe only bearing downlink scheduling information of two PDSCHs may exist on the first carrier, namely, the downlink scheduling information borne by the first carrier and the downlink scheduling information of a PDSCH scheduled in a subframe with the same time downlink manner on the second carrier. Therefore, PDCCH loads of downlink subframes on the first carrier are unbalanced.

As shown in FIG. 2B, in step 22, the base station sends, on the first carrier, the downlink scheduling information, DL-Grants of four PDSCHs needs to be borne on the downlink subframe 1 of the first carrier, namely, a DL-Grant on the downlink subframe 1 of the first carrier, a DL-Grant corresponding to a subframe with the same time on the second carrier (the downlink subframe 1 of the first carrier), a DL-Grant corresponding to a cross subframe on the second carrier (the downlink subframe 3 of the first carrier), and a DL-Grant on the downlink subframe 4, on the second carrier, which is a cross subframe. The downlink subframe 0 of the first carrier only needs to bear DL-Grants of two PDSCHs, namely, the DL-Grant on the downlink subframe 0 of the first carrier, and the DL-Grant on a subframe with the same time on the second carrier and of the downlink subframe 0 of the first carrier. By the same token, DL-Grants of four PDSCHs need to be borne on the downlink subframe 6 of the first carrier, while the downlink subframe 5 of the first carrier only needs to bear DL-Grants of two PDSCHs. Therefore, loads on the downlink subframe 1 and the downlink subframe 6 of the first carrier are maximum, and loads on the downlink subframe 0 and the downlink subframe 5 are minimum, so that the PDCCH loads of the downlink subframes on the first carrier are unbalanced.

As shown in FIG. 3B, according to the sending method provided by step 32, the DL-Grant on the downlink subframe 3 of the second carrier is adjusted to the downlink subframe 0 on the first carrier. By the same token, the DL-Grant on the downlink subframe 8 of the second carrier is adjusted to the downlink subframe 5 on the first carrier, and the DL-Grant on the downlink subframe 9 of the second carrier is adjusted to the downlink subframe 6 on the first carrier. As shown in FIG. 3B, through the sending method of step 32, each downlink subframe on the first carrier bears at most one piece of downlink scheduling information in a cross-subframe manner. DL-Grants of three PDSCHs are borne on each of the downlink subframes 0, 1, 5 and 6 of the first carrier. DL-Grants of three PDSCHs borne by the downlink subframe 0 on the first carrier are respectively: the DL-grant corresponding to the downlink subframe 0 of the first carrier, the DL-grant corresponding to the downlink subframe 0 of the second carrier, and the DL-grant corresponding to the downlink subframe 3 of the second carrier. DL-Grants of three PDSCHs borne by the downlink subframe 1 on the first carrier are respectively: the DL-grant corresponding to the downlink subframe 1 of the first carrier, the DL-grant corresponding to the downlink subframe 1 of the second carrier, and the DL-grant corresponding to the downlink subframe 4 of the second carrier. DL-Grants of three PDSCHs borne by the downlink subframe 5 on the first carrier are respectively: the downlink scheduling information corresponding to the downlink subframe 5 of the first carrier, the downlink scheduling information corresponding to the downlink subframe 5 on the second carrier, and the downlink scheduling information corresponding to the downlink subframe 8 on the second carrier. DL-Grants of three PDSCHs borne by the downlink subframe 6 on the first carrier are respectively: the downlink scheduling information corresponding to the downlink subframe 6 of the first carrier, the downlink scheduling information corresponding to the downlink subframe 6 on the second carrier, and the downlink scheduling information corresponding to the downlink subframe 9 on the second carrier. The downlink subframes 0, 1, 5 and 6 on the first carrier are referred to as seventh downlink subframes in the embodiment of the present invention.

Under the cross-carrier scheduling, a carrier whose PDSCH or PUSCH is scheduled by a PDCCH needs to be distinguished. Further, the cross-carrier scheduling and the same-carrier scheduling can be distinguished through a carrier indicator field (Carrier Indicator Field, CIF for short) in the PDCCH, while in the prior art, there has been no method to distinguish the subframe with the same time downlink scheduling and the cross-subframe downlink scheduling under the cross-carrier scheduling. As shown in FIG. 3B, in DL-Grants of three PDSCHs borne by the downlink subframe 0 on the first carrier, the DL-grant corresponding to the downlink subframe 0 of the second carrier borne by the downlink subframe 0 of the first carrier is referred to as the subframe with the same time downlink scheduling under the cross-carrier scheduling of the downlink subframe 0 of the first carrier, and the DL-grant corresponding to the downlink subframe 3 of the second carrier borne by the downlink subframe 0 of the first carrier is referred to as the cross-subframe downlink scheduling under the cross-carrier scheduling of the downlink subframe 0 of the first carrier. The DL-grant corresponding to the downlink subframe 0 of the second carrier borne by the downlink subframe 0 of the first carrier, and the DL-grant corresponding to the downlink subframe 3 of the second carrier borne by the downlink subframe 0 of the first carrier need to be distinguished, so that after receiving the PDCCH, the terminal determines, according to the indication of the base station, to receive the corresponding PDSCH on a subframe with the same time of the second carrier or to receive the corresponding PDSCH on a cross subframe on the second carrier.

The embodiment of the present invention distinguishes cross-carrier scheduling types of downlink subframes on the first carrier mainly through the following methods, namely, distinguishes the subframe with the same time downlink scheduling and the cross-subframe downlink scheduling.

The first type: distinguishing is made through a CIF. If only two carriers are configured, some redundancy statuses exist in 3 bits of CIF. For example, a PDCCH on a configuration 2 carrier is borne on a configuration 0 carrier in a cross-carrier manner, CIF=000 denotes that a configuration 0 same-carrier is scheduled, and CIF=001 and 010 denotes that a configuration 2 cross-carrier is scheduled, in which 001 denotes cross-carrier scheduling of a subframe with the same time 0, and 010 denotes cross-carrier scheduling of a cross subframe 3.

The second type: distinguishing is made through transmit power control (Transmit Power Control, TPC for short) of an ACK/NACK resource indicator (ACK/NACK Resource Indicator, ARI for short).

In an R10 system, when a plurality of carriers is aggregated, in which there is a pair of uplink and downlink first carriers, the rest carriers are called second carriers, and the ACK/NACK can only be fed back on the uplink first carrier. If a downlink second carrier is scheduled, uplink ACK/NACK resources can be indicated by scheduling 2 bits of TPC in a PDCCH of the downlink second carrier (S-PDCCH, Secondary-PDCCH). At this time, the TPC is used as an ACK/NACK resource indicator (ARI). Specifically, 2 bits can indicate that one of four resources is used by a UE, and TPC in a PDCCH of the downlink first carrier (P-PDCCH, Primary-PDCCH) is scheduled and used as actual transmit power control.

One manner is: part of statuses, namely, ACK/NACK resources, in an ARI are adopted to distinguish subframe with the same time downlink scheduling and cross-subframe downlink scheduling under cross-carrier scheduling, such as, statuses 00 and 01 of the ARI denote the subframe with the same time downlink scheduling, and 00 and 01 denote two available ACK/NACK resources of the subframe with the same time downlink scheduling; the status 10 of the ARI denotes the cross-subframe downlink scheduling, and 10 denotes ACK/NACK resources of the cross-subframe downlink scheduling; the status 11 of the ARI denotes the subframe with the same time downlink scheduling and the cross-subframe downlink scheduling which are simultaneous, and the status 11 denotes ACK/NACK resources of the subframe with the same time downlink scheduling and the cross-subframe downlink scheduling. Specifically, when the ACK/NACK of the subframe with the same time downlink scheduling and the ACK/NACK of the cross-subframe downlink scheduling are fed back on the same uplink subframe, the status 11 can denote an ACK/NACK resource shared by the subframe with the same time downlink scheduling and the cross-subframe downlink scheduling; when the ACK/NACK of the subframe with the same time downlink scheduling and the ACK/NACK of the cross-subframe downlink scheduling are fed back on different uplink subframes, the status 11 can denote respective two ACK/NACK resources of the subframe with the same time downlink scheduling and the cross-subframe downlink scheduling.

The other manner is: distinguishing is made directly by using a TPC field, and power can be adjusted based on the previous PDCCH or in other manners.

The third type: distinguishing is made through a downlink assignment indication (Downlink Assignment Indication, DL DAI for short) in the DL_grant.

Taking the DL DAI as an example, two transmission modes exist for the uplink ACK/NACK under the R10 TDD CA, in which one transmission mode is called the PUCCH format 3, which can be used for transmitting the ACK/NACK not greater than 20 bits, and at this time, 2 bits of DAI in the DL_grant are redundant. For example, if two uplink and downlink configuration 2 carriers are aggregated, eight bits of ACK/NACK need to be fed back on the subframe 2 (if transmission is made by adopting a plurality of code words, the ACK/NACK of two code words corresponding to a same PDSCH adopts a binding feedback manner). The other transmission mode is called the PUCCH format 1a/1b+ channel selection, which can be used for transmitting the ACK/NACK not greater than 4 bits. When the number of original bits of the ACK/NACK or the number of original bits after code word binding is not greater than 4, the PUCCH format 1a/1b+ channel selection is directly adopted, and at this time, 2 bits of DAI in the DL_grant are also redundant; when the number of original bits of the ACK/NACK or the number of original bits after code word binding is greater than 4, the number of bits of the ACK/NACK is enabled to be not greater than 4 by adopting time domain part binding. For example, if two uplink and downlink configuration 2 carriers are aggregated, eight bits of ACK/NACK need to be fed back on the subframe 2 (after code word binding is adopted). At this time, ACK/NACK of different subframes of each carrier can be bound into two bits in a time domain manner, so there are totally four bits for two carriers. Subsequently, transmission is made by using the PUCCH format 1a/1b+ channel selection, and at this time, 2 bits of DAI in the DL_grant are used for finding whether the DL_grant of the last subframe in the time on each carrier is not detected by the UE.

Specifically, the method for distinguishing subframe with the same time downlink scheduling and cross-subframe downlink scheduling under cross-carrier scheduling through a DL DAI is as follows.

a) Distinguishing is directly made by using 2 bits of DL DAI.

Specifically, the distinguishing method is: "01" denotes that one subframe thereof is scheduled, "10" denotes that the other subframe thereof is scheduled, and "11" denotes that the two subframes are simultaneously scheduled.

b) Discussion is made according to situations.

It is assumed that the PDCCH of the second carrier is borne on the first carrier.

When the ACK/NACK transmission mode is the PUCCH format 3 or channel selection of time domain part binding is not performed on the ACK/NACK of the second carrier, 2 bits of DL DAI of the second carrier can be directly used, and the specific method is like that in a).

When the ACK/NACK transmission mode is channel selection, and time domain part binding needs to be performed on the ACK/NACK of the second carrier, but when time domain part binding does not need to be performed on the ACK/NACK of the first carrier, the scheduling of the DAI in the PDCCH of the second carrier (S-DAI, Secondary-DAI) and the scheduling of the DAI in the PDCCH of the first carrier (P-DAI, Primary-DAI) can be jointly used. The specifically used method is as follows:

The S-DAI is still used as a normal DAI. When joint scheduling is adopted, the P-DAI is used for indicating PDSCH scheduling situations of a subframe with the same time and a cross subframe on a cross-carrier, and the specific method is like that in a). If the UE receives no P-DAI, the UE thinks that the PDSCH scheduling of a subframe with the same time and a cross subframe on a cross-carrier is not received. When independent scheduling is adopted, if the P-DAI and the S-DAI are equal, it is denoted that the S-PDCCH of the S-DAI is used for scheduling a PDSCH of a subframe with the same time of a cross-carrier; if unequal, it is denoted that the S-PDCCH of the S-DAI is used for scheduling a PDSCH of a cross subframe on a cross-carrier, and vice versa. If PDSCHs of a subframe with the same time and a cross subframe on a cross-carrier are simultaneously scheduled, an S-DAI with a smaller value denotes that the S-PDCCH of the S-DAI is used for scheduling a PDSCH of a subframe with the same time of a cross-carrier, an S-DAI with a larger value denotes that the S-PDCCH of the S-DAI is used for scheduling a PDSCH of a cross subframe on a cross-carrier, and vice versa. If the UE receives no P-DAI, and only receives one S-DAI, the UE thinks that the PDSCH scheduling of a subframe with the same time and a cross subframe on a cross-carrier is not received.

The fourth type: distinguishing is made through newly added two bits in a PDCCH.

Two bits are newly added, in which "01" denotes that one subframe thereof is scheduled, "10" denotes that the other subframe thereof is scheduled, and "11" denotes that the two subframes are simultaneously scheduled.

The fifth type: distinguishing is made through a newly added scrambling code in a PDCCH.

If independent scheduling is adopted, only one scrambling code needs to be newly added, the original scrambling code denotes the subframe with the same time downlink scheduling, and the newly added scrambling code denotes the cross-subframe downlink scheduling; vice versa.

If joint scheduling is adopted, two scrambling codes 1 and 2 need to be newly added, the original scrambling code denotes the subframe with the same time downlink scheduling, the newly added scrambling code 1 denotes the cross-subframe downlink scheduling, and the newly added scrambling code 2 denotes that a subframe with the same time and a cross subframe are simultaneously scheduled; other combinations are similarly included.

The sixth type: distinguishing is made through a higher-layer signaling configuration.

Whether the subframe with the same time downlink scheduling or the cross-subframe downlink scheduling is adopted through a radio resource control (Radio Resource Control, RRC for short below) signaling configuration or a media access control (Media Access Control, MAC for short below) signaling configuration. Taking the RRC signaling configuration as an example, specifically, in a period of time, the RRC signaling can be semi-statically configured into the subframe with the same time downlink scheduling of the cross-carrier, and the cross-subframe downlink scheduling of the cross-carrier is not supported; or the RRC signaling can be semi-statically configured into the cross-subframe downlink scheduling, and in the subframe, the cross-subframe downlink scheduling of the cross-carrier is not supported.

The seventh type: distinguishing is made through a search space of a PDCCH.

Implicit indication is made through the location of the PDCCH in the search space. For example, scheduling of the PDCCH in a part of the search space thereof denotes the subframe with the same time downlink scheduling, scheduling in another part denotes the cross-subframe downlink scheduling, or a subframe with the same time and a cross subframe perform scheduling simultaneously. The terminal performs PDCCH blind detection through a specified search space location, or a search space location configured by the base station, the PDCCH received in part 1 of the search space can denote the subframe with the same time downlink scheduling of the cross-carrier, the PDCCH received in part 2 of the search space can denote the cross-subframe downlink scheduling of the cross-carrier, and vice versa.

The eighth type: distinguishing is made through a scheduling time of a PDCCH, or other methods for implicit PDCCH notification.

Configurations at different time can be preset or different time can be configured by the base station to the UE. For example, scheduling of a PDCCH at a first subframe or a first radio frame denotes the subframe with the same time downlink scheduling, scheduling of a PDCCH at a second subframe or a second radio frame denotes the cross-subframe downlink scheduling, or a subframe with the same time and a cross subframe perform scheduling simultaneously.

In the first to fifth distinguishing methods, downlink indication information used to indicate a cross-carrier scheduling type is added into the downlink scheduling information through different manners. While in the sixth to eighth methods, the base station and the UE are both pre-configured with an information distinguishing method or the base station configures an information distinguishing method to the UE through signaling, so that after receiving the downlink scheduling information, the terminal distinguishes whether the current cross-carrier scheduling is the subframe with the same time downlink scheduling or the cross-subframe downlink scheduling according to the distinguishing method.

FIG. 4A is a flow chart of Embodiment 4 of the method for sending downlink scheduling information provided by the present invention. In order to avoid simultaneous occurrence of subframe with the same time downlink scheduling and cross-subframe downlink scheduling under cross-carrier scheduling on a downlink subframe on a first carrier, as shown in FIG. 4A, this embodiment includes the following steps.

Step 41A: A base station determines, in downlink subframes on a second carrier, a first downlink subframe, in which at time corresponding to the first downlink subframe, a subframe on a first carrier is an uplink subframe.

Step 42A: The base station sends, on a fifth downlink subframe on the first carrier, downlink scheduling information corresponding to the first downlink subframe on the second carrier to a terminal, in which a subframe on the second carrier at time corresponding to the fifth downlink subframe is an uplink subframe; the time corresponding to the fifth downlink subframe is before the time corresponding to the first downlink subframe.

In this embodiment, at the time corresponding to the fifth downlink subframe, a subframe on the second carrier is an uplink subframe, and the time corresponding to the fifth downlink subframe is before the time corresponding to the first downlink subframe. Step 42A is specifically: The base station sends, on the fifth downlink subframe on the first carrier whose corresponding in time is before the corresponding time of the first downlink subframe, downlink scheduling information corresponding to the first downlink subframe on the second carrier to a terminal, and sends the downlink scheduling information corresponding to the second downlink subframe on the second carrier and the downlink scheduling information corresponding to a downlink subframe on the first carrier to the terminal.

As shown in FIG. 4B, a subframe with the same time on the first carrier and of the downlink subframe 7 on the second carrier is an uplink subframe, and the DL-Grant corresponding to the downlink subframe 7 on the second carrier can be adjusted to the downlink subframe 5 or 6 on the first carrier in a cross-subframe manner and be borne. If minimization of the scheduling latency is considered, the DL-Grant corresponding to the downlink subframe 7 on the second carrier can be adjusted onto the downlink subframe 6 on the first carrier in a cross-subframe manner and be borne. In this way, on the downlink subframe 6 on the first carrier, the subframe with the same time downlink scheduling occurs: the DL-Grant corresponding to the downlink subframe 6 on the second carrier, and meanwhile, the cross-subframe downlink scheduling further exists: the DL-Grant corresponding to the downlink subframe 7 on the second carrier.

When a subframe with the same time on the second carrier and of a downlink subframe on the first carrier is an uplink subframe, the downlink subframe on the first carrier does not need to bear the DL-Grant of the subframe with the same time on the second carrier. Therefore, in order to avoid simultaneous occurrence of the subframe with the same time downlink scheduling and the cross-subframe downlink scheduling on one subframe, a cross subframe corresponding to the downlink subframe on the second carrier can be adjusted onto another downlink subframe on the first carrier, and a subframe with the same time of the downlink subframe on the second carrier is an uplink subframe. As shown in FIG. 4B, In consideration of minimizing the scheduling latency, according to the method provided by step 12A, the DL-Grant corresponding to the downlink subframe 7 on the second carrier is adjusted to the downlink subframe 4 on the first carrier and is sent. The subframe 4 on the second carrier is an uplink subframe, so the downlink subframe 4 on the first carrier does not need to bear the subframe with the same time downlink scheduling, but only needs to bear the cross-subframe downlink scheduling, namely, at this time, the subframe with the same time downlink scheduling and the cross-subframe downlink scheduling of the cross-carrier do not need to be distinguished.

FIG. 4C is a flow chart of Embodiment 5 of the method for sending downlink scheduling information provided by the present invention. As shown in FIG. 4C, this embodiment includes the following steps.

Step 41B: A base station determines, in downlink subframes on a second carrier, a first downlink subframe, in which at time corresponding to the first downlink subframe, a subframe on a first carrier is an uplink subframe.

Step 42B: The base station sends, on a fifth downlink subframe on the first carrier, downlink scheduling information corresponding to the first downlink subframe on the second carrier to a terminal, in which time corresponding to the fifth downlink subframe is before the time corresponding to the first downlink subframe, and on the first carrier, ACK/NACK binding does not need to be performed on a subframe where an uplink ACK/NACK corresponding to a PDSCH on the fifth downlink subframe is located.

As shown in FIG. 4D, the downlink scheduling information corresponding to the subframe 4 on the second carrier cannot be sent on a subframe (uplink subframe) with the same time on the first carrier, and the downlink scheduling information corresponding to the subframe 4 can be adjusted to the subframe 1 on the first carrier according to the criterion of a minimum ACK/NACK feedback latency. If the combination of a P-DAI and an S-DAI in the sending method for distinguishing the subframe with the same time downlink scheduling and the cross-subframe downlink scheduling of the cross-carrier provided by the embodiment corresponding to FIG. 3A is adopted, the P-DAI of the subframe 1 on the first carrier cannot be used, because on the ACK/NACK feedback subframe 2 corresponding to the PDSCH on the subframe 1 of the first carrier, time domain ACK/NACK part binding needs to be performed (at this time, ACK/NACK feedbacks exist on two carriers and the number of ACK/NACK feedbacks on the first carrier is greater than 2) so as to use the P-DAI counting. Therefore, the downlink scheduling information corresponding to the subframe 4 of the second carrier can be adjusted to the subframe 0 on the first carrier. The ACK/NACK feedback subframe 4 corresponding to the PDSCH of the subframe 0 on the first carrier does not need to perform time domain ACK/NACK part binding, so the P-DAI is available.

Through the timing adjustment method, the P-DAI in the PDCCH scheduling the first carrier can be used together with the S-DAI for distinguishing the subframe with the same time downlink scheduling and the cross-subframe downlink scheduling of the cross-carrier.

FIG. 5A is a flow chart of Embodiment 1 of a method for sending uplink scheduling information provided by the present invention. As shown in FIG. 5A, this embodiment includes the following steps.

Step 51: A base station determines, in uplink subframes on a second carrier, a first uplink subframe, in which at time corresponding to a third downlink subframe for scheduling the first uplink subframe on the second carrier during non-cross-carrier scheduling, a subframe on a first carrier is an uplink subframe.

When a PDCCH is borne on the second carrier, according to a timing relationship between a UL_grant on the second carrier and a PUSCH scheduled by the UL_grant, the uplink scheduling information, on the second carrier, for scheduling the PUSCH of the first uplink subframe is sent on the third downlink subframe on the second carrier. When a PDCCH is borne on the second carrier, a downlink subframe, on the second carrier, for scheduling the PUSCH borne on the second uplink subframe is a fourth downlink subframe on the second carrier.

During multi-carrier aggregation, under the situation that the PDCCH on the second carrier is adjusted onto the first carrier and is borne, according to a timing relationship between a UL_grant on the first carrier and a PUSCH scheduled by the UL_grant, a subframe with the same time corresponding to a third downlink subframe on the first carrier is an uplink subframe, and the uplink scheduling information corresponding to the first uplink subframe on the second carrier (that is, the uplink scheduling information used to schedule the PUSCH borne on the first uplink subframe on the second carrier) cannot be sent on a subframe with the same time on the first carrier. A subframe with the same time on the first carrier and corresponding to the fourth downlink subframe on the second carrier is a downlink subframe, and during cross-carrier scheduling, the uplink scheduling information corresponding to the second uplink subframe can be directly sent on a subframe with the same time of the fourth downlink subframe on the first carrier. During cross-carrier scheduling, the uplink scheduling information scheduling the second carrier may be sent on the first carrier, so the base station needs to determine whether a subframe with the same time on the first carrier and corresponding to a downlink subframe, on the second carrier, for scheduling each uplink subframe is an uplink subframe, namely, a first uplink subframe is determined in all the uplink subframes, and the uplink scheduling information, on the second carrier, for scheduling the PUSCH of the first uplink subframe is sent on a downlink subframe, on the first carrier, meeting the requirement.

A scenario that the uplink scheduling information on the second carrier cannot be sent on a subframe corresponding to the first carrier is illustrated in combination with a timing relationship between a UL_grant and an a PUSCH scheduled by the UL_grant of the first carrier, and a timing relationship between a UL_grant and an a PUSCH scheduled by the UL_grant of the second carrier in an LTE TDD system below.

As shown in FIG. 5B, in the timing relationship between a UL_grant and an a PUSCH scheduled by the UL_grant, a subframe where a digit is located denotes an uplink subframe, the rest subframes are downlink subframes, and the digit in the uplink subframe denotes one or several downlink subframes, on which the UL_grant scheduling the PUSCH of the current uplink subframe is sent. For example, the PUSCH of the uplink subframe 8 of the second carrier is scheduled through the UL_grant on the downlink subframe 4 of the second carrier, and the PUSCH of the uplink subframe 7 of the second carrier is scheduled through the UL_grant on the downlink subframe 1 of the second carrier. The subframe with the same time on the first carrier and of the downlink subframe 1 of the second carrier is a downlink subframe, so the UL_grant scheduling the uplink subframe 7 of the second carrier can be sent on the downlink subframe 1 of the first carrier (the downlink subframe 1 of the first carrier is referred to as a subframe with the same time of the downlink subframe 1 on the second carrier). The subframe with the same time on the first carrier and of the downlink subframe 4 of the second carrier is an uplink subframe, so the UL_grant scheduling the uplink subframe 8 of the second carrier cannot be sent on the uplink subframe 4 on the first carrier. The uplink subframe 8 of the second carrier is referred to as the first uplink subframe on the second carrier in the embodiment of the present invention, and the downlink subframe 4 scheduling the downlink subframe 8 on the second carrier is referred to as the third downlink subframe on the second carrier in the embodiment of the present invention.

Step 52: The base station sends, on a sixth downlink subframe on the first carrier, uplink scheduling information corresponding to the first uplink subframe on the second carrier to a terminal, in which time corresponding to the sixth downlink subframe is before that corresponding to the first uplink subframe.

After determining that a first uplink subframe exists on the second carrier, the base station adjusts the uplink scheduling information, corresponding to each third downlink subframe, for scheduling each first uplink subframe separately onto a downlink subframe that is on the first carrier and that is at time before time of the first uplink subframe. Certain time needs to be spaced from sending, by the base station, the uplink scheduling information to sending, by the terminal, a corresponding PUSCH (in the current TDD system, time of at least four subframes needs to be spaced from sending, by the base station, the uplink scheduling information to sending, by the terminal, a corresponding PUSCH), so a certain number of subframes should further be spaced between the downlink subframe and a first uplink subframe, and the number of subframes is the number of subframes which need to be spaced from sending, by the base station, the uplink scheduling information to sending, by the terminal, a corresponding PUSCH. In this embodiment, a downlink subframe, on the first carrier, for bearing the uplink scheduling information corresponding to the first uplink subframe is referred to as the sixth downlink subframe on the first carrier.

After the uplink scheduling information sent by the first uplink subframe on the second carrier is adjusted onto the sixth downlink subframe on the first carrier and is borne, the base station can notify the terminal of the time sequence relationship between subframes after the adjustment through signaling, and can also configure the timing relationship between subframes after the adjustment for the terminal, so that after receiving the uplink scheduling information of the cross-carrier, the terminal replies with uplink data scheduled by the uplink scheduling information on a corresponding uplink subframe according to the timing relationship between subframes. Furthermore, the base station can also add a subframe indicator field into the uplink scheduling information of the first carrier, the subframe indicator field is used to indicate the uplink subframe on the second carrier scheduled by the uplink scheduling information in a cross-carrier manner, namely, indicate an uplink subframe, on the second carrier, on which the uplink data scheduled by the uplink scheduling information in a cross-carrier manner is sent to the base station. For a specific indication method, reference is made to description in an embodiment corresponding to FIG. 19A.

When the base station sends, on the sixth downlink subframe on the first carrier, the uplink scheduling information corresponding to the first uplink/downlink subframe on the second carrier, the base station may further send the uplink scheduling information corresponding to the second uplink subframe on the second carrier; the base station may further send the uplink scheduling information corresponding to the uplink subframe on the first carrier (which is also referred to as the uplink scheduling information used to schedule the PUSCH borne by the uplink subframe on the first carrier).

As shown in FIG. 5B, neither a UL_grant and a PUSCH scheduled by the UL_grant, nor a PUSCH and a PHICH corresponding to the PUSCH are located on a subframe with the same time since the base station or the terminal needs a certain processing time, and this time interval is generally not less than four subframes. In consideration of the latency from sending, by the base station, the uplink scheduling information to sending, by the terminal, a corresponding PUSCH, the UL_grant on the second carrier scheduling the uplink subframe 8 can be adjusted onto the downlink subframe 0 or the downlink subframe 1, on the first carrier, and be borne, in which the downlink subframe 0 or the downlink subframe 1 is before the uplink subframe 8, and at least four subframes are spaced by between the downlink subframe 0 or the downlink subframe 1 and the uplink subframe.

Furthermore, on the sixth downlink subframe that is on the first carrier and that is at time before time of the first uplink subframe, the base station further sends to the terminal the uplink scheduling information corresponding to the second uplink subframe on the second carrier, and the uplink scheduling information corresponding to the uplink subframe on the first carrier.

When the base station schedules PUSCH uplink data of the terminal on a downlink subframe on the first carrier, the independent scheduling manner can be adopted, or the joint scheduling manner can also be adopted. During independent scheduling, the uplink scheduling information for scheduling corresponding PUSCHs is sent to the terminal separately through a plurality of independent PDCCHs. Specifically, on downlink subframes of the first carrier, the uplink scheduling information corresponding to the first uplink subframe on the second carrier, the uplink scheduling information corresponding to the second uplink subframe on the second carrier, and the uplink scheduling information corresponding to an uplink subframe on the first carrier are sent in a cross-subframe manner to the terminal respectively through a plurality of independent PDCCHs.

When the base station jointly schedules a plurality of PUSCHs on downlink subframes on the first carrier, the uplink scheduling information for scheduling the PUSCH on the second carrier in a cross-carrier manner is borne by adopting a PDCCH, namely, after carrier aggregation, a PUSCH scheduled in a cross-subframe manner and a PUSCH scheduled in a subframe with the same time downlink manner share a PDCCH. Specifically, on downlink subframes of the first carrier, the uplink scheduling information corresponding to the first uplink subframe on the second carrier and the uplink scheduling information corresponding to the second uplink subframe on the second carrier are sent in a cross-subframe manner to the terminal through a PDCCH. At this time, scheduling of two subframes shares control information in the PDCCH. The uplink scheduling information corresponding to an uplink subframe on the first carrier is sent to the terminal through another PDCCH.

In the method for sending uplink scheduling information of the embodiment of the present invention, when a physical downlink control channel on a second carrier is borne on a first carrier, a base station adjusts, in a cross-subframe manner, uplink scheduling information corresponding to a third downlink subframe on the second carrier onto a sixth downlink subframe before a first uplink subframe on the first carrier and sends the uplink scheduling information. Therefore, at the time of cross-carrier PDCCH scheduling, the PUSCH on the second carrier can be scheduled on the first carrier.

FIG. 6A is a flow chart of Embodiment 2 of the method for sending uplink scheduling information provided by the present invention. In order to minimize the latency from sending, by the base station, the uplink scheduling information to sending, by the terminal, a corresponding PUSCH, as shown in FIG. 6A, this embodiment includes the following steps.

Step 61: A base station determines, in uplink subframes on a second carrier, a first uplink subframe, in which at time corresponding to a third downlink subframe for scheduling the first uplink subframe on the second carrier during non-cross-carrier scheduling, a subframe on a first carrier is an uplink subframe.

Step 62: The base station sends, on the sixth downlink subframe on the first carrier, uplink scheduling information corresponding to the first uplink subframe on the second carrier to the terminal, in which the latency between the sending time corresponding to the sixth downlink subframe and that corresponding to the first uplink subframe on the second carrier is minimum, and the sixth downlink subframe and the first uplink subframe are at least spaced by N subframes; the time corresponding to the sixth downlink subframe is before that corresponding to the first uplink subframe.

In this embodiment, the latency between the sending time corresponding to the sixth downlink subframe on the first carrier and the sending time corresponding to the first uplink subframe on the second carrier is minimum, and the sixth downlink subframe and the first uplink subframe are spaced by at least N subframes. The N is the number of subframes which are spaced by between receiving, by a terminal, the uplink scheduling information and sending, by the terminal, the uplink data corresponding to the uplink scheduling information. Certain time needs to be spaced from receiving, by the terminal, a UL-Grant to sending, by the terminal, a PUSCH scheduled by the UL-Grant, namely, several subframes are spaced by, so when the base station sends the uplink scheduling information corresponding to the first uplink subframe to the terminal, the sixth downlink subframe and the first uplink subframe need to be spaced by several subframes.

Step 62 is specifically: the base station sends, on the sixth downlink subframe, the downlink scheduling information corresponding to the first uplink subframe on the second carrier to the terminal. Furthermore, the base station further sends, on the sixth downlink subframe, uplink scheduling information corresponding to the second uplink subframe on the second carrier and the uplink scheduling information corresponding to an uplink subframe on the first carrier to the terminal.

As shown in FIG. 6B, in the downlink subframe 0 and the downlink subframe 1 on the first carrier at time before that of the uplink subframe 8, it is determined that the UL-Grant corresponding to the uplink subframe 8 is sent on the downlink subframe 1. The latency from time corresponding to the downlink subframe 1 to that corresponding to the uplink subframe 8 is minimum, the downlink subframe 1 is before the uplink subframe 8, and the downlink subframe 1 and the uplink subframe 8 are at least spaced by four subframes.

FIG. 7A is a flow chart of Embodiment 3 of the method for sending uplink scheduling information provided by the present invention. After minimization of the scheduling latency is considered, one downlink subframe on the first carrier may bear uplink scheduling information of more than three PUSCHs, and another downlink subframe only bearing uplink scheduling information of one PUSCH may exist on the first carrier. Therefore, PDCCH loads of downlink subframes on the first carrier are unbalanced. In order to make compromise between minimization of the scheduling latency and balance of the PDCCH load, as shown in FIG. 7A, this embodiment includes the following steps.

Step 71: A base station determines, in uplink subframes on a second carrier, a first uplink subframe, in which at time corresponding to a third downlink subframe for scheduling the first uplink subframe on the second carrier during non-cross-carrier scheduling, a subframe on a first carrier is an uplink subframe.

Step 72: The base station sends, on a sixth downlink subframe on the first carrier, uplink scheduling information corresponding to the first uplink subframe on the second carrier to a terminal, in which time corresponding to the sixth downlink subframe is before that corresponding to the first uplink subframe, and the sixth downlink subframe bears uplink scheduling information corresponding to at most one first uplink subframe on the second carrier.

In the sending method in step 62, the uplink scheduling information borne by the third downlink subframe on the second carrier during non-cross-carrier scheduling may not be borne on some downlink subframes on the first carrier, that is to say, some downlink subframes do not bear the uplink scheduling information scheduling two or more than two first uplink subframes on the second carrier respectively during non-cross-carrier scheduling. However, some downlink subframes bear the uplink scheduling information borne during non-cross-carrier scheduling by two or more than two third downlink subframes on the second carrier. As shown in FIG. 6B, according to the sending method in step 62, three UL_grants borne by the downlink subframe 1 on the first carrier includes: a UL_grant for scheduling a PUSCH on the uplink subframe 5 on the first carrier, a UL_grant for scheduling a PUSCH on the uplink subframe 7 on the second carrier, and a UL_grant for scheduling a PUSCH on the uplink subframe 8 on the second carrier. However, the downlink subframe 0 on the first carrier only bears one UL_grant: the UL_grant for scheduling the uplink subframe 4 on the first carrier. Therefore, the load of the downlink subframe 1 on the first carrier is maximum while that of the downlink subframe 0 is minimum, so PDCCH loads of downlink subframes on the first carrier are unbalanced.

When minimization of the scheduling latency and balance of the PDCCH load are considered, the base station determines the sixth downlink subframe on downlink subframes on the first carrier at time before that of the first uplink subframe. The sixth downlink subframe bears uplink scheduling information corresponding to at most one first uplink subframe on the second carrier, and the fifth downlink subframe and the first uplink subframe are at least spaced by N subframes. Furthermore, besides satisfying the above condition, the latency between the time corresponding to the sixth downlink subframe and that corresponding to the first uplink subframe further needs to be minimum.

As shown in FIG. 7B, the downlink subframe 0 of the first carrier is before the uplink subframe 8 of the second carrier, and the downlink subframe 0 and the uplink subframe 8 are spaced by seven subframes; according to the sending method provided by step 72, the UL_grant corresponding to the downlink subframe 4 on the second carrier is adjusted to the downlink subframe 0 on the first carrier, so the downlink subframe 0 on the first carrier bears the uplink scheduling information corresponding to at most one first uplink subframe on the second carrier, and the compromise between the minimization of the scheduling latency and the balance of the PDCCH load is made.

In the uplink scheduling procedure, scheduling of two subframes under cross-carrier scheduling exists. As shown in FIG. 6B, scheduling, on the downlink subframe 1 on the first carrier, of a PUSCH on the uplink subframe 7 on the second carrier (during non-cross-carrier scheduling, the downlink subframe 1 on the second carrier schedules the uplink subframe 7 on the second carrier) is first subframe uplink scheduling under the cross-carrier; scheduling, on the downlink subframe 1 on the first carrier, of a PUSCH on the uplink subframe 8 on the second carrier (during non-cross-carrier scheduling, the downlink subframe 4 on the second carrier schedules the uplink subframe 8 on the second carrier; while during cross-carrier scheduling, a subframe with the same time on the first carrier and of the downlink subframe 4 on the second carrier is an uplink subframe) is second subframe uplink scheduling under the cross-carrier.

The base station indicates a cross-carrier uplink scheduling type of a downlink subframe on the first carrier to the terminal through a newly added bit, a newly added scrambling code, a carrier indicator field, transmit power control, a downlink assignment indication, or an uplink index (UL Index) in a physical downlink control channel; or, through RRC signaling, MAC signaling, a search space of a physical downlink control channel or a scheduling time of a physical downlink control channel. The cross-carrier uplink scheduling type includes the first subframe uplink scheduling and the second subframe uplink scheduling under the cross-carrier. For the specific indication method, reference is made to description in the embodiment of the method for sending downlink scheduling information.

FIG. 8 is a flow chart of Embodiment 4 of the method for sending uplink scheduling information provided by the present invention. Scheduling between carriers can be distinguished through a CIF in a PDCCH, while in the prior art, there has been no method to distinguish scheduling of two subframes under the cross-carrier scheduling. As shown in FIG. 8, in order to avoid simultaneous occurrence of the first subframe uplink scheduling and the second subframe uplink scheduling the second subframe uplink scheduling on downlink subframes of the first carrier, this embodiment includes the following steps.

Step 81: A base station determines, in uplink subframes on a second carrier, a first uplink subframe, in which at time corresponding to a third downlink subframe for scheduling the first uplink subframe on the second carrier during non-cross-carrier scheduling, a subframe on a first carrier is an uplink subframe.

Step 82: The base station sends, on a sixth downlink subframe on the first carrier, to the terminal a UL_grant corresponding to the first uplink subframe on the second carrier, in which a subframe on the second carrier at time corresponding to that of the sixth downlink subframe bears no UL_grant during non-cross-carrier scheduling; the time corresponding to the sixth downlink subframe is before that corresponding to the first uplink subframe.

In this embodiment, at the time corresponding to the sixth downlink subframe, a subframe on the second carrier does not bear the UL_grant during non-cross-carrier scheduling.

As shown in FIG. 7B, the subframe number of a subframe with the same time on the second carrier and corresponding to the downlink subframe 0 on the first carrier does not occur in all uplink subframes on the second carrier; meanwhile, the downlink subframe 0 is before the uplink subframe 8, and seven subframes exist between the downlink subframe 0 and the uplink subframe 8. The downlink subframe 0 on the second carrier bears no UL_grant of any uplink subframe before cross-carrier scheduling; after the UL_grant for scheduling the uplink subframe 8 on the second carrier is adjusted to the downlink subframe 0 on the first carrier, only the first subframe uplink scheduling instead of the second subframe uplink scheduling exists for the downlink subframe 0 on the first carrier under the cross-carrier, namely, at this time, the first subframe uplink scheduling and the second subframe uplink scheduling under the cross-carrier does not need to be distinguished, so the purpose of avoiding distinguishing of the first subframe uplink scheduling and the second subframe uplink scheduling under the cross-carrier can be achieved.

FIG. 9 is a schematic structural diagram of Embodiment 1 of an apparatus for sending downlink scheduling information provided by the present invention. As shown in FIG. 9, this embodiment includes: a downlink subframe determining module 91 and a downlink scheduling sending module 92.

The downlink subframe determining module 91 is configured to determine, in downlink subframes on a second carrier, a first downlink subframe, in which at time corresponding to the first downlink subframe, a subframe on a first carrier is an uplink subframe.

The downlink scheduling sending module 92 is configured to send, on a fifth downlink subframe on the first carrier, downlink scheduling information corresponding to the first downlink subframe on the second carrier to a terminal, in which the time corresponding to the fifth downlink subframe is before the time corresponding to the first downlink subframe.

When minimization of the scheduling latency is considered, the latency between time corresponding to the fifth downlink subframe used to send the downlink scheduling information corresponding to the first downlink subframe on the second carrier, and time corresponding to the first downlink subframe is minimum. When the compromise between the minimization of the scheduling latency and the load balance is made, a subframe on the second carrier at time corresponding to the fifth downlink subframe is an uplink subframe. In order to avoid distinguishing of the subframe with the same time downlink scheduling and the cross-subframe downlink scheduling under the cross-carrier scheduling, the fifth downlink subframe bears downlink scheduling information corresponding to at most one first downlink subframe on the second carrier.

Furthermore, when the subframe with the same time downlink scheduling and the cross-subframe downlink scheduling under the cross-carrier scheduling are distinguished, the downlink scheduling sending module 92 indicates a cross-carrier downlink scheduling type of the fifth downlink subframe on the first carrier to the terminal through a newly added bit, a newly added scrambling code, a carrier indicator field, transmit power control, a downlink assignment indication, or an ACK/NACK resource indicator in a physical downlink control channel; or, indicate a cross-carrier downlink scheduling type of the fifth downlink subframe on the first carrier to the terminal through radio resource control signaling, media access control signaling, a search space of a physical downlink control channel or a scheduling time of a physical downlink control channel.

Additionally, when the downlink scheduling sending module 92 sends the downlink scheduling information to the terminal, an independent scheduling manner can be adopted, or a joint scheduling manner can also be adopted. During independent scheduling, the downlink scheduling sending module 92 is specifically configured to send the downlink scheduling information corresponding to the first downlink subframe on the second carrier, the downlink scheduling information corresponding to the second downlink subframe on the second carrier, and the corresponding downlink scheduling information on the first carrier to the terminal respectively through a plurality of independent physical downlink control channels. During joint scheduling, the downlink scheduling sending module 92 is specifically configured to send, on the fifth downlink subframe that is on the first carrier and that is at time before time of the first downlink subframe, the downlink scheduling information corresponding to the first downlink subframe on the second carrier in a cross-subframe manner, and the downlink scheduling information corresponding to the second downlink subframe on the second carrier in a subframe with the same time manner to the terminal through a physical downlink control channel; and the corresponding downlink scheduling information on the first carrier to the terminal through another physical downlink control channel.

For working mechanisms of the modules, reference is made to description in the embodiments corresponding to FIG. 1A, FIG. 2A, FIG. 3A and FIG. 4A, and no more details are given here.

Further, in order to distinguish cross-carrier scheduling types at the time of scheduling a DL_Grant in a cross-carrier manner on the first carrier, a subframe on the first carrier at the same time as that of the fifth downlink subframe on the first carrier is a subframe which is of all downlink subframes corresponding to an uplink ACK/NACK which the third uplink subframe on the second carrier is capable of feeding back when the second carrier is used to feed back the uplink ACK/NACK, and which is at the earliest scheduling time when the second carrier is scheduled by the first carrier in a cross-carrier manner; the downlink scheduling sending module indicates, through the downlink assignment indication in the downlink scheduling information sent on the fifth downlink subframe on the first carrier, the cross-carrier downlink scheduling type on the fifth downlink subframe on the first carrier to the terminal.

In the apparatus for sending downlink scheduling information of the embodiment of the present invention, before a first carrier bears a PDCCH on a second carrier in a cross-carrier manner, in order to ensure that a PDSCH on the second carrier is scheduled in a cross-carrier manner on the first carrier, a base station adjusts downlink scheduling information corresponding to a first downlink subframe to a downlink subframe on the first carrier and bears the downlink scheduling information, in which a subframe with the same time on the first carrier and of the first downlink subframe on the second carrier is an uplink subframe. Therefore, at the time of cross-carrier, the base station can send, on the first carrier, downlink scheduling information for scheduling the PDSCH on the second carrier.

FIG. 10 is a schematic structural diagram of Embodiment 1 of an apparatus for sending uplink scheduling information provided by the present invention. As shown in FIG. 10, the apparatus includes: an uplink subframe determining module 101 and an uplink scheduling sending module 102.

The uplink subframe determining module 101 is configured to determine, in uplink subframes on a second carrier, a first uplink subframe, in which at time corresponding to a third downlink subframe for scheduling the first uplink subframe on the second carrier during non-cross-carrier scheduling, a subframe on the first carrier is an uplink subframe.

The uplink scheduling sending module 102 is configured to send, on a sixth downlink subframe on the first carrier, uplink scheduling information corresponding to the first uplink subframe on the second carrier to a terminal, in which time corresponding to the sixth downlink subframe is before the first uplink subframe.

If minimization of the scheduling latency is considered, the latency between sending time corresponding to the sixth downlink subframe and sending time corresponding to the first uplink subframe on the second carrier is minimum, and the sixth downlink subframe and the first uplink subframe are spaced by at least N subframes; N is the number of subframes which are spaced by between receiving, by a terminal, the uplink scheduling information and sending, by the terminal, the uplink data corresponding to the uplink scheduling information. In consideration that the balance between the minimization of the scheduling latency and the load balance is made, at the time corresponding to the sixth downlink subframe, a subframe on the second carrier does not bear the uplink scheduling information during non-cross-carrier scheduling. In order to avoid distinguishing of the first subframe uplink scheduling and the second subframe uplink scheduling under the cross-carrier scheduling, at the time corresponding to the sixth downlink subframe, a subframe on the second carrier does not bear the uplink scheduling information during non-cross-carrier scheduling.

Furthermore, the uplink scheduling sending module 102 indicates a cross-carrier uplink scheduling type of the sixth downlink subframe on the first carrier to the terminal through a newly added bit, a newly added scrambling code, a carrier indicator field, transmit power control, a downlink assignment indication, or an uplink index in a physical downlink control channel; or, indicate a cross-carrier uplink scheduling type of the sixth downlink subframe on the first carrier to the terminal through radio resource control signaling, media access control signaling, a search space of a physical downlink control channel or scheduling time of a physical downlink control channel.

Additionally, when the uplink scheduling sending module 102 sends the uplink scheduling information to the terminal, an independent scheduling manner can be adopted, or a joint scheduling manner can also be adopted. During independent scheduling, the uplink scheduling sending module 102 is specifically configured to send, on the sixth downlink subframe that is on the first carrier and that is at time before time of the first uplink subframe, the uplink scheduling information corresponding to the first uplink subframe on the second carrier, the uplink scheduling information corresponding to the second uplink subframe on the second carrier, and the uplink scheduling information corresponding to an uplink subframe on the first carrier to the terminal respectively through a plurality of independent physical downlink control channels. When joint scheduling is adopted, the uplink scheduling sending module 102 is specifically configured to send, on the sixth downlink subframe that is on the first carrier and that is at time before time of the first uplink subframe, the uplink scheduling information corresponding to the first uplink subframe on the second carrier, and the uplink scheduling information corresponding to the second uplink subframe on the second carrier to the terminal through a physical downlink control channel; and send, on a downlink subframe on the first carrier at time before that of the first uplink subframe, the uplink scheduling information corresponding to an uplink subframe on the first carrier to the terminal through another physical downlink control channel.

For working mechanisms of the modules, reference is made to description in the embodiments corresponding to FIG. 5A, FIG. 6A, FIG. 7A and FIG. 8, and no more details are given here.

Further, in order to distinguish cross-carrier scheduling types at the time of scheduling a DL_Grant in a cross-carrier manner on the first carrier, the downlink scheduling information sent on the fifth downlink subframe on the first carrier includes a downlink assignment indication, where the downlink assignment indication is used to indicate a cross-carrier downlink scheduling type on the fifth downlink subframe on the first carrier to the terminal. The fifth downlink subframe on the first carrier is determined according to a method as follows: determining, according to a first time sequence relationship, all downlink subframes corresponding to a maximum number of uplink ACK/NACKs which a third uplink subframe on the second carrier is capable of feeding back, and determining a downlink subframe at the earliest scheduling time of all the downlink subframes, in which the downlink subframe at the earliest scheduling time is a subframe on the second carrier at the same time as that of the fifth downlink subframe on the first carrier. The first time sequence relationship can be an uplink ACK/NACK time sequence relationship when the second carrier is solely configured.

In the apparatus for sending uplink scheduling information of the embodiment of the present invention, when a physical downlink control channel on a second carrier is borne on a first carrier, the uplink scheduling sending module adjusts, in a cross-subframe manner, uplink scheduling information corresponding to a third downlink subframe on the second carrier onto a sixth downlink subframe before a first uplink subframe on the first carrier and sends the uplink scheduling information. Therefore, at the time of cross-carrier PDCCH scheduling, the PUSCH on the second carrier can be scheduled on the first carrier.

FIG. 11 is a flow chart of Embodiment 1 of a method for receiving downlink scheduling information further provided by the present invention. As shown in FIG. 11, this embodiment includes the following steps.

Step 111: A terminal receives, on a fifth downlink subframe that is on a first carrier and that is at time before time of a first downlink subframe, downlink scheduling information, sent by a base station, corresponding to the first downlink subframe on a second carrier, in which at time corresponding to the first downlink subframe on the second carrier, a subframe on the first carrier is an uplink subframe.

The terminal receives, on a fifth downlink subframe that is on a first carrier and that is at time before time of a first downlink subframe, downlink scheduling information which is sent by a base station and is corresponding to the first downlink subframe on a second carrier; and meanwhile further receives the downlink scheduling information corresponding to the second downlink subframe on the second carrier sent by the base station. At time corresponding to the second downlink subframe on the second carrier, a subframe on the first carrier is a downlink subframe.

Step 112: The terminal receives, on the first downlink subframe on the second carrier, downlink data corresponding to the downlink scheduling information according to the received downlink scheduling information.

When a physical downlink control channel on a second carrier is borne on a first carrier, the terminal receives, on the fifth downlink subframe that is on the first carrier and that is at time before time of the first downlink subframe, the downlink scheduling information which is sent by the base station in a cross-subframe manner and is corresponding to the first downlink subframe on the second carrier according to the timing relationship between a configured PDCCH &PDSCH and an uplink ACK/NACK. In the embodiment of the present invention, the timing relationship between a PDCCH &PDSCH and an uplink ACK/NACK is a new timing relationship between a PDCCH &PDSCH and an uplink ACK/NACK determined by the base station again in order to schedule, on the first carrier, the downlink scheduling information on the second carrier when the physical downlink control channel on the second carrier is borne on the first carrier. The base station can deliver a new timing relationship between a PDCCH &PDSCH and an uplink ACK/NACK to the terminal through signaling, and the signaling can be higher-layer signaling such as the RRC or the MAC, layer 1 signaling or layer 2 signaling, such as the PDCCH. Alternatively, a new timing relationship between a PDCCH &PDSCH and an uplink ACK/NACK is pre-configured at two sides of the base station and the terminal.

Furthermore, when the base station bears the PDCCH on the second carrier onto the first carrier, if a subframe indicator field is added into the downlink scheduling information on the first carrier, the subframe indicator field is used to indicate the downlink subframe on the second carrier scheduled by the downlink scheduling information in a cross-carrier manner, namely, indicate a downlink subframe, on the second carrier, on which the downlink data scheduled by the downlink scheduling information in a cross-carrier manner is located, the terminal can determine, according to an indicator of the subframe indicator field corresponding to the downlink scheduling information, which downlink subframe on the second carrier is scheduled by the downlink scheduling information in a cross-carrier manner, so as to receive the downlink data corresponding to the downlink scheduling information on the corresponding downlink subframe on the second carrier. For the method for the terminal to determine, according to an indicator of the subframe indicator field corresponding to the downlink scheduling information, which downlink subframe on the second carrier is scheduled by the downlink scheduling information in a cross-carrier manner, reference can be made to description in the embodiment corresponding to FIG. 18.

The subframe with the same time downlink scheduling and the cross-subframe downlink scheduling may simultaneously occur on a downlink subframe on the first carrier under the cross-carrier. In order to distinguish the subframe with the same time downlink scheduling and the cross-subframe downlink scheduling, the terminal receives a cross-carrier downlink scheduling type indicated by a newly added bit, a newly added scrambling code, a carrier indicator field, transmit power control, a downlink assignment indication, or an ACK/NACK resources indicator in a physical downlink control channel; or RRC signaling, MAC signaling, a search space of a physical downlink control channel or scheduling time of a physical downlink control channel, and receives, on the first downlink subframe on the second carrier, the downlink data corresponding to the downlink scheduling information according to the cross-carrier downlink scheduling type of the fifth downlink subframe on the first carrier and the downlink scheduling information.

At the time of determining that a cross-carrier downlink scheduling type of a downlink subframe on the first carrier is subframe with the same time downlink scheduling, the terminal receives, on the first downlink subframe on the second carrier, the downlink data scheduled by the downlink scheduling information. At the time of determining that the DL Grant is the subframe with the same time downlink scheduling after receiving the DL Grant on the fifth downlink subframe on the first carrier at time before that of the first downlink subframe, the terminal receives, on a subframe with the same time on the second carrier corresponding to the downlink subframe, the PDSCH scheduled by the DL Grant.

Further, when the cross-carrier downlink scheduling type of a downlink subframe on the first carrier is cross-subframe downlink scheduling, the terminal receives, in a cross-subframe manner on the second carrier, the downlink data corresponding to the downlink scheduling information corresponding to the second downlink subframe on the second carrier. At the time of determining that the DL Grant is the cross-subframe downlink scheduling after receiving the DL Grant on the fifth downlink subframe on the first carrier at time before that of the first downlink subframe, the terminal receives, on a cross subframe on the second carrier corresponding to the downlink subframe, the PDSCH scheduled by the DL Grant.

It should be noted that: under the situation of the cross-subframe downlink scheduling, a time sequence in which the terminal feeds back an ACK/NACK corresponding to the PDSCH to the base station is determined according to the PDSCH rather than according to the corresponding PDCCH.

Further, the terminal receives, on the fifth downlink subframe, the downlink scheduling information, sent by the base station in a cross-subframe manner, corresponding to the first downlink subframe on the second carrier according to a new timing relationship between a PDCCH &PDSCH capable of minimizing the scheduling latency and an uplink ACK/NACK, in which the latency from the sending time corresponding to the fifth downlink subframe to that corresponding to the first downlink subframe on the second carrier is minimum and the sending time corresponding to the fifth downlink subframe is before that corresponding to the first downlink subframe.

Further, the terminal receives, on the fifth downlink subframe that is on the first carrier and that is at time before time of the first downlink subframe, the downlink scheduling information which is sent by the base station in a cross-subframe manner and is corresponding to the first downlink subframe on the second carrier according to the new timing relationship between a PDCCH &PDSCH and an uplink ACK/NACK which can be compromised between the minimization of the scheduling latency and the PDCCH load. The fifth downlink subframe only bears downlink scheduling information corresponding to one first downlink subframe.

Further, in order to avoid distinguishing of the cross-subframe downlink scheduling and the subframe with the same time downlink scheduling under the cross-carrier downlink scheduling, the base station can send the downlink scheduling information to the terminal on the fifth downlink subframe, in which the time of the fifth downlink subframe on the first carrier is before that of the first downlink subframe and subframe with the same time on the second carrier and of the fifth downlink subframe is an uplink subframe. Therefore, the terminal receives, on the fifth downlink subframe according to the timing relationship between a PDCCH &PDSCH and an uplink ACK/NACK, the downlink scheduling information sent in a cross-subframe manner by the base station, in which the time of the fifth downlink subframe on the first carrier is before that of the first downlink subframe and subframe with the same time on the second carrier and of the fifth downlink subframe is an uplink subframe.

The present invention further provides an embodiment of an apparatus for receiving downlink scheduling information. FIG. 12A is a schematic structural diagram of Embodiment 1 of an apparatus for receiving downlink scheduling information provided by the present invention. As shown in FIG. 12A, this embodiment includes: a downlink scheduling receiving module 121 and a downlink data receiving module 122.

The downlink scheduling receiving module 121 is configured to receive, on a fifth downlink subframe that is on a first carrier and that is at time before time of a first downlink subframe, downlink scheduling information, sent by a base station, corresponding to the first downlink subframe on a second carrier, in which at time corresponding to the first downlink subframe on the second carrier, a subframe on the first carrier is an uplink subframe.

The downlink data receiving module 122 is configured to receive, on the first downlink subframe on the second carrier, downlink data corresponding to the downlink scheduling information according to the received downlink scheduling information.

Further, when minimization of the scheduling latency is considered, the latency between the time corresponding to the fifth downlink subframe and the time corresponding to the first downlink subframe is minimum.

Further, in consideration that the compromise between the minimization of the scheduling latency and the PDCCH load is made, the fifth downlink subframe bears downlink scheduling information corresponding to at most one first downlink subframe on the second carrier.

Further, in order to avoid distinguishing of the subframe with the same time downlink scheduling and the cross-subframe downlink scheduling under the cross-carrier scheduling, at the time corresponding to the fifth downlink subframe, a subframe on the second carrier is an uplink subframe.

In order to distinguishing the subframe with the same time downlink scheduling and the cross-subframe downlink scheduling information under the cross-carrier scheduling, as shown in FIG. 12B, on the basis of FIG. 12A, a downlink scheduling type receiving module 123 is further included. FIG. 12B is a schematic structural diagram of Embodiment 2 of the apparatus for receiving downlink scheduling information provided by the present invention.

The downlink scheduling type receiving module 123 is configured to receive a cross-carrier downlink scheduling type of the fifth downlink subframe on the first carrier, wherein the cross-carrier downlink scheduling type is indicated by a newly added bit, a newly added scrambling code, a carrier indicator field, transmit power control, a downlink assignment indication, or an ACK/NACK resource indicator in a physical downlink control channel; or indicated by radio resource control signaling, media access control signaling, a search space of a physical downlink control channel or scheduling time of a physical downlink control channel.

The downlink data receiving module 122 is specifically configured to receive, on the first downlink subframe on the second carrier, the downlink data corresponding to the downlink scheduling information according to the cross-carrier downlink scheduling type of the fifth downlink subframe on the first carrier and the downlink scheduling information.

In the apparatus for receiving downlink scheduling information of the embodiment of the present invention, the downlink scheduling receiving module receives, on a fifth subframe on the first carrier, downlink scheduling information corresponding to the first downlink subframe on the second carrier. Therefore, at the time of cross-carrier PDCCH scheduling, the PDSCH on the second carrier can be scheduled on the first carrier.

The present invention further provides an embodiment of a method for receiving uplink scheduling information. FIG. 13 is a flow chart of Embodiment 1 of a method for receiving uplink scheduling information provided by the present invention. As shown in FIG. 13, this embodiment includes the following steps.

Step 131: A terminal receives, on a sixth downlink subframe that is on a first carrier and that is at time before time of a first uplink subframe, uplink scheduling information which is sent by a base station and is corresponding to the first uplink subframe on a second carrier, in which at time corresponding to a third downlink subframe for scheduling the first uplink subframe on the second carrier during non-cross-carrier scheduling, a subframe on a first carrier is an uplink subframe.

When a physical downlink control channel on a second carrier is borne on a first carrier, the terminal receives, on the downlink subframe on the first carrier and at determined time before that of the first uplink subframe, the uplink scheduling information which is sent by the base station and is corresponding to the first uplink subframe on the second carrier according to the timing relationship between a configured UL_grant and a PUSCH scheduled by the UL_grant. A subframe with the same time on the first carrier and of a third downlink subframe for scheduling the first uplink subframe on the second carrier during non-cross-carrier scheduling is an uplink subframe. In the embodiment of the present invention, the timing relationship between a UL_grant and a PUSCH scheduled by the UL_grant is a new timing relationship between a UL_grant and a PUSCH scheduled by the UL_grant determined by the base station again in order to schedule, on the first carrier, the uplink scheduling information on the second carrier when the physical downlink control channel on the second carrier is borne on the first carrier. The base station can deliver a new timing relationship between a UL_grant and a PUSCH scheduled by the UL_grant to the terminal through signaling, and the signaling can be higher-layer signaling such as the RRC or the MAC, layer 1 signaling or layer 2 signaling, such as the PDCCH. Alternatively, a new timing relationship between a UL_grant and a PUSCH scheduled by the UL_grant is pre-configured at two sides of the base station and the terminal.

Furthermore, when the base station bears the PDCCH on the second carrier onto the first carrier, if a subframe indicator field is added into the uplink scheduling information on the first carrier, the subframe indicator field is used to indicate the uplink subframe on the second carrier scheduled by the uplink scheduling information in a cross-carrier manner, namely, indicate an uplink subframe, on the second carrier, on which the uplink data scheduled by the uplink scheduling information in a cross-carrier manner is sent to the base station, the terminal can determine, according to an indicator of the subframe indicator field corresponding to the uplink scheduling information, which uplink subframe on the second carrier is scheduled by the uplink scheduling information in a cross-carrier manner, so as to send, on the corresponding uplink subframe on the second carrier, the downlink data scheduled by the uplink scheduling information to the base station. For the method for the terminal to determine, according to an indicator of the subframe indicator field corresponding to the uplink scheduling information, which uplink subframe on the second carrier is scheduled by the uplink scheduling information in a cross-carrier manner, reference can be made to description in the embodiment corresponding to FIG. 20.

Step 132: The base station sends, on the first uplink subframe on the second carrier, uplink data corresponding to the uplink scheduling information according to the received uplink scheduling information.

In the method for receiving uplink scheduling information of the embodiment of the present invention, when the PDCCH on the second carrier is borne onto the first carrier, the terminal receives, on the sixth subframe on the first carrier, the uplink scheduling information corresponding to the first uplink subframe on the second carrier. Therefore, at the time of cross-carrier PDCCH scheduling, the PUSCH on the second carrier can be scheduled on the first carrier.

Further, the terminal receives, on the sixth downlink subframe on the first carrier according to a new timing relationship between a UL_grant capable of minimizing the scheduling latency and a PUSCH scheduled by the UL_grant, the uplink scheduling information corresponding to the first uplink subframe on the second carrier sent by the base station, in which the sixth downlink subframe at time before that of the first uplink subframe, the latency between the sending time corresponding to the sixth downlink subframe and that corresponding to the first uplink subframe on the second carrier is minimum, and the sixth downlink subframe and the first uplink subframe are at least spaced by N subframes; N is the number of subframes which are spaced by between sending, by the base station, the uplink scheduling information and receiving, by the base station, the uplink data corresponding to the uplink scheduling information.

Further, the terminal receives, on the sixth downlink subframe that is on the first carrier and that is at time before time of the first uplink subframe, the uplink scheduling information which is sent by the base station and is corresponding to the first uplink subframe on the second carrier according to the new timing relationship between a UL_grant and a PUSCH scheduled by the UL_grant which can be compromised between the minimization of the scheduling latency and the PDCCH load, and the fifth downlink subframe bears uplink scheduling information corresponding to at most one first uplink subframe on the second carrier.

The first subframe uplink scheduling the first subframe uplink scheduling and the second subframe uplink scheduling the second subframe uplink scheduling may simultaneously occur on a downlink subframe on the first carrier under the cross-carrier. Further, the terminal receives a cross-carrier uplink scheduling type of the sixth downlink subframe, wherein the cross-carrier uplink scheduling type is indicated by a newly added bit, a newly added scrambling code, a carrier indicator field, transmit power control, or an uplink assignment index in a physical downlink control channel; or indicated by RRC signaling, MAC signaling, a search space of a physical downlink control channel or scheduling time of a physical downlink control channel. The terminal sends, on the first uplink subframe on the second carrier, the uplink data corresponding to the uplink scheduling information according to the cross-carrier uplink scheduling type of the sixth downlink subframe and the downlink scheduling information.

Further, in order to avoid distinguishing of the first sub-frame uplink scheduling and the second sub-frame uplink scheduling under the cross-carrier uplink scheduling, the base station can send the uplink scheduling information to the terminal according to a new timing relationship between a UL_grant and a PUSCH scheduled by the UL_grant. Therefore, the terminal receives, on the sixth downlink subframe that is on the first carrier and that is at time before time of the first uplink subframe, the uplink scheduling information which is sent by the base station and is corresponding to the first uplink subframe on the second carrier according to the new timing relationship between a UL_grant and a PUSCH scheduled by the UL_grant. A subframe with the same time on the second carrier and of the sixth downlink subframe does not bear the uplink scheduling information during non-cross-carrier scheduling.

The present invention further provides an embodiment of an apparatus for receiving uplink scheduling information. FIG. 14A is a schematic structural diagram of Embodiment 1 of an apparatus for receiving uplink scheduling information provided by the present invention. As shown in FIG. 14A, this embodiment includes: an uplink scheduling receiving module 141 and an uplink data sending module 142.

The uplink scheduling receiving module 141 is configured to receive, on a sixth downlink subframe that is on a first carrier and that is at time before time of a first uplink subframe, uplink scheduling information which is sent by a base station and is corresponding to the first uplink subframe on a second carrier, in which at time corresponding to a third downlink subframe for scheduling the first uplink subframe on the second carrier during non-cross-carrier scheduling, a subframe on a first carrier is an uplink subframe.

The uplink data sending module 142 is configured to send, on the first uplink subframe on the second carrier, uplink data corresponding to the uplink scheduling information according to the received uplink scheduling information.

The latency between sending time corresponding to the sixth downlink subframe and sending time corresponding to the first uplink subframe on the second carrier is minimum, and the sixth downlink subframe and the first uplink subframe are spaced by at least N subframes; N is the number of subframes which are spaced by between receiving, by a terminal, the uplink scheduling information and sending, by the terminal, the uplink data corresponding to the uplink scheduling information. Alternatively, at the time corresponding to the sixth downlink subframe, a subframe on the second carrier does not bear the uplink scheduling information during non-cross-carrier scheduling. Alternatively, the sixth downlink subframe bears uplink scheduling information corresponding to at most one first uplink subframe on the second carrier.

Figures 14B, 15:
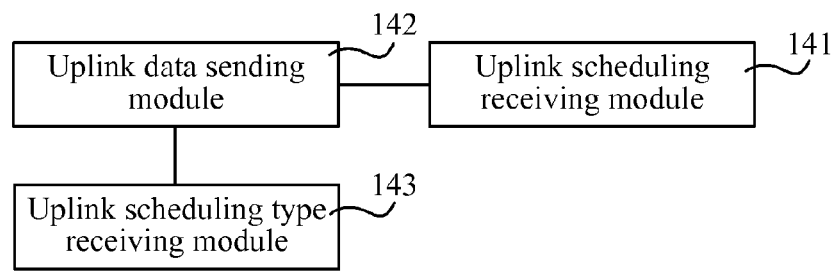
FIG. 14B is a schematic structural diagram of Embodiment 2 of the apparatus for receiving uplink scheduling information provided by the present invention.
FIG. 15 is an application scenario diagram of solving PDCCH interference between a macro cell and a micro cell through a method for switching off sending of a PDCCH with an interfering cell provided by the present invention.

FIG. 14B is a schematic structural diagram of Embodiment 2 of the apparatus for receiving uplink scheduling information provided by the present invention. As shown in FIG. 14B, on the basis of FIG. 14A, an uplink scheduling type receiving module 143 is further included. The uplink scheduling type receiving module 143 is configured to receive a cross-carrier uplink scheduling type of the sixth downlink subframe, wherein the cross-carrier uplink scheduling type is indicated by a newly added bit, a newly added scrambling code, a carrier indicator field, transmit power control, or an uplink assignment index in a physical downlink control channel; or indicated by radio resource control signaling, media access control signaling, a search space of a physical downlink control channel or scheduling time of a physical downlink control channel.

The uplink data sending module 142 is specifically configured to send, on the first uplink subframe on the second carrier, the uplink data corresponding to the uplink scheduling information according to the cross-carrier uplink scheduling type of the sixth downlink subframe and the downlink scheduling information.

In the apparatus for receiving uplink scheduling information of the embodiment of the present invention, when the PDCCH on the second carrier is borne onto the first carrier, the uplink scheduling receiving module receives, on a sixth subframe on the first carrier, uplink scheduling information corresponding to the first uplink subframe on the second carrier. Therefore, at the time of cross-carrier PDCCH scheduling, the PUSCH on the second carrier can be scheduled on the first carrier.

Under some specific scenarios, such as a heterogeneous network, interference between a control channel of a macro cell and that of a micro cell is larger; during carrier aggregation (Carrier Aggregation, CA for short), PDCCHs of a plurality of carriers can be placed on part of the carriers, and the macro cell and the micro cell each have aggregation of two carriers: aggregation of the carrier C1 and the carrier C2. Two carriers of the two cells are at the same frequency, so the PDCCH interference is larger. The macro cell can place both the PDCCH of the C1 and the PDCCH of the C2 onto the C2, while the micro cell can place both the PDCCH of the C1 and the PDCCH of the C2 onto the carrier C1, so the PDCCH interference can be reduced so as to further ensure the PDCCH performance. As shown in FIG. 15, under a configuration of cross-carrier scheduling, the configuration 3 carrier C2 of the base station of the macro cell is the first carrier, and used to bear a PDCCH, and the configuration 2 carrier C1 of the base station of the micro cell is the first carrier, and used to bear a PDCCH, so interference between the PDCCHs is reduced through a frequency division manner between the PDCCHs of the two cells.

If the cross-carrier cross-subframe downlink scheduling or the cross-carrier second subframe uplink scheduling is not adopted, sending of a PDCCH can be switched off by adopting an interfering cell so as to coordinate the interference. The base stations can be coordinated through coordination between two cells such as a method that the base station of the macro cell can send coordination information to the base station of the micro cell or coordination information is configured in advance through the base station of the micro/macro cell instead of being notified through signaling. The coordination information includes information about that the base station of the first cell (such as, the base station of the macro cell) switches off sending of a PDCCH on a subframe and the base station of the second cell (such as, the base station of the micro cell) normally sends a PDCCH on a subframe, so the base station of the macro/micro cell performs does not need to adopt the cross-carrier scheduling on some subframes, and in the above embodiment, the downlink scheduling information corresponding to the first downlink subframe or the uplink scheduling information corresponding to the first uplink subframe can be performed according to the existing time sequence between a PDCCH &PDSCH and an uplink ACK/NACK or the existing time sequence between a UL_grant and a PUSCH scheduled by the UL_grant on the same carrier corresponding to scheduled data. The cross-subframe downlink scheduling or the cross-carrier second subframe uplink scheduling does not need to be introduced into this method, and the time sequence relationship of the existing system is not modified.

As shown in FIG. 15, the subframe 4 of the configuration 2 carrier of the macro cell switches off of PDCCH sending, and correspondingly, the subframe 4 of the configuration 2 carrier of the micro cell can send a PDCCH to schedule the same current carrier (the configuration 2 carrier of the micro cell); by the same token, the subframe 3 of the configuration 2 carrier of the micro cell switches off of PDCCH sending, and correspondingly, the subframe 3 of the configuration 2 carrier of the macro cell can send a PDCCH to schedule the same current carrier (the configuration 2 carrier of the macro cell).

Additionally, the interfering cell can also adopt same-carrier cross-subframe scheduling, and scheduling timing selection can ensure that ACK/NACK feedback of the subframe with the same time scheduling and ACK/NACK feedback of the cross-subframe scheduling are at different uplink subframes so as to reduce ACK/NACK resource conflict. For example, the PDCCH corresponding to the PDSCH downlink scheduling of the subframe 3 of the configuration 2 carrier of the macro cell can be sent on the subframe 8 of the same-carrier (the configuration 2 carrier of the macro cell), so the uplink ACK/NACK corresponding to the PDSCH of the subframe 8 of the same-carrier subframe with the same time scheduling and the uplink ACK/NACK corresponding to the PDSCH of the subframe 3 of the same-carrier cross-subframe scheduling are sent on different uplink subframes, which are respectively the uplink subframe 2 and the uplink subframe 7, so as to reduce the ACK/NACK resource conflict, and by introducing the same-carrier cross-subframe scheduling, the sending of PDCCHs on some subframes of the interfering cell does not need to be switched off, so as to further improve the system throughput.

To solve the scheduling time sequence problem under a scenario of cross-carrier scheduling of carrier aggregation of different configurations of the TDD, the present invention further includes an embodiment: it is assumed that two TDD carriers are aggregated, the two TDD carriers can be a first carrier and a second carrier, and uplink and downlink configurations of the two TDD carriers are different. Under a cross-carrier scheduling scenario, a PDCCH for scheduling the second carrier is sent on the first carrier. At same time, if the first carrier is an uplink subframe while the second carrier is a downlink subframe, the first carrier cannot send the PDCCH to schedule a downlink subframe on the second carrier at this time, and the downlink subframe on the second carrier is a first subframe; at this time the second carrier can be scheduled by adopting the same-carrier, namely, the PDCCH of the first subframe on the second carrier is scheduled and sent on the first subframe on the second carrier, but the PDCCH is sent on a data area of the first subframe on the second carrier, namely, non-control area. The control area is an area for bearing a PDCCH in an LTE low-release system, can be former n symbols of a subframe, and the data area is an area for bearing a PDSCH, namely, the $(n+1)^{th}$ symbol to the last symbol in the subframe, in which the n is a natural number not greater than 4. Alternatively, the PDCCH can be transmitted based on a UE specific reference signal, namely, transmitted in a manner based on channel information precoding.

The present invention further includes the following embodiment.

The TDD system adopts the carrier aggregation technology, and if two aggregated carriers are located at different frequency bands, each carrier can adopt an independent uplink and downlink configuration. If two carriers of the TDD system adopt different uplink and downlink configurations, for same time, subframes with inconsistent transmission directions exist for the two carriers, namely, for one carrier, namely, the first carrier, the up is an uplink subframe, and simultaneously for the other carrier, namely, the second carrier, the up is a downlink subframe; at this time, in order to simplify implementation of the UE and enable the UE not to support simultaneous receiving and sending, namely, the UE can only receive this type of subframes with inconsistent transmission directions on the second carrier and cannot send the subframes on the first carrier; at this time, the uplink ACK/NACK cannot be sent on the first carrier, namely, the downlink subframe corresponding to the ACK/NACK cannot be scheduled; or, the subframes can only be sent on the first carrier and cannot be received on the second carrier, namely, the second carrier cannot be scheduled to perform downlink transmission.

Directions of inconsistent subframes are selected to enable the use efficiency of a subframe to be improved, and the following method can be adopted.

For subframes with inconsistent transmission directions on different carriers at same time, for example, at same time, a main carrier is an uplink subframe, and an auxiliary carrier is a downlink subframe. If uplink acknowledgment/negative acknowledgment information (ACK/NACK) is not sent on the uplink subframe on the main carrier according to a configured time sequence relationship, the subframes with inconsistent transmission directions adopt the downlink direction at this time, namely, for the subframes with inconsistent transmission directions on different carriers at the same time, the UE receives data and/or control information on a downlink subframe on the same time, and sends no data and/or control information at the same time. For example, if the TDD configuration of the main carrier is the configuration 0, and the TDD configuration of the auxiliary carrier is the configuration 2, all of subframes 3, 4, 8, and 9 are subframes with inconsistent transmission directions, namely, these four subframes of the main carrier are uplink subframes, and these four subframes of the auxiliary carrier are downlink subframes; also, according to a configured time sequence relationship, no uplink ACK/NACK is borne on the uplink subframes 3 and 8 of the main carrier, so at this time, for this type of subframes 3 and 8 with inconsistent transmission directions, it can be specified that the UE receives data and/or control information on the auxiliary carrier, and sends no data and/or control information on the main carrier.

Figure 16A:
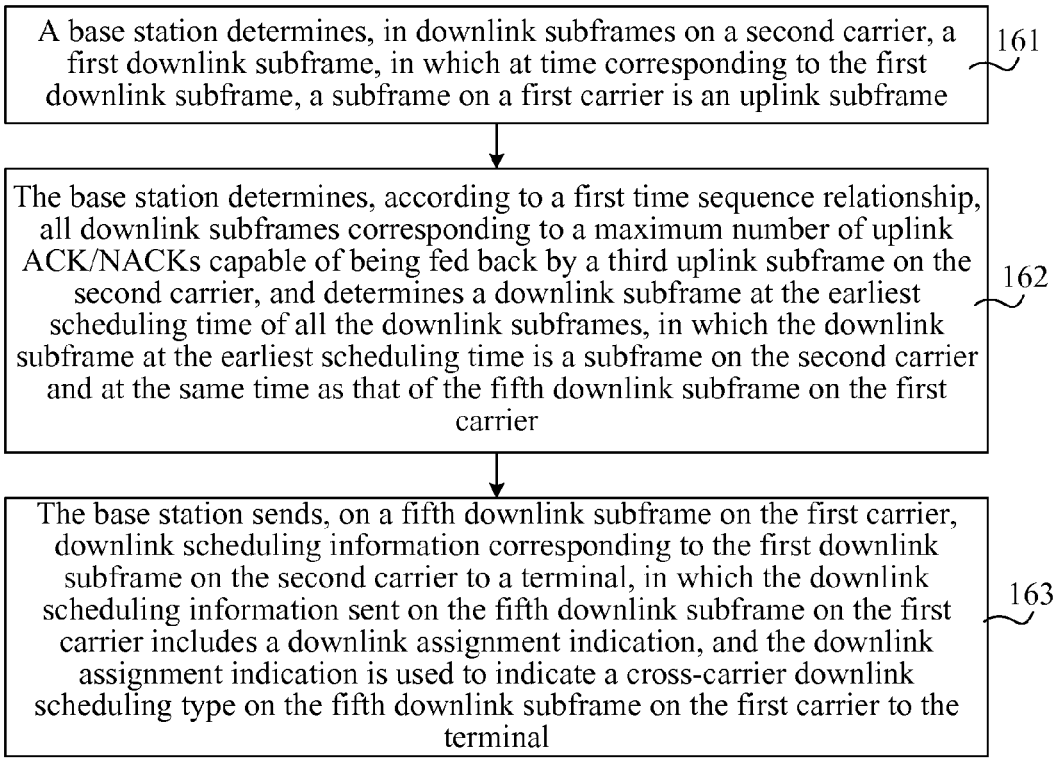
FIG. 16A is a flow chart of Embodiment 6 of the method for sending downlink scheduling information provided by the present invention.

FIG. 16A is a flow chart of Embodiment 6 of the method for sending downlink scheduling information provided by the present invention. The method provided by this embodiment can distinguish cross-carrier scheduling types at the time of scheduling a DL_Grant in a cross-carrier manner on the first carrier. As shown in FIG. 16A, this embodiment includes the following steps.

Step 161: A base station determines, in downlink subframes on a second carrier, a first downlink subframe, in which at time corresponding to the first downlink subframe, a subframe on a first carrier is an uplink subframe.

Step 162: The base station determines, according to a first time sequence relationship, all downlink subframes corresponding to a maximum number of uplink ACK/NACKs which a third uplink subframe on the second carrier is capable of feeding back, and determines a downlink subframe at the earliest scheduling time of all the downlink subframes, in which the downlink subframe at the earliest scheduling time is a subframe on the second carrier at the same time as that of the fifth downlink subframe on the first carrier.

Step 163: The base station sends, on a fifth downlink subframe on the first carrier, downlink scheduling information corresponding to the first downlink subframe on the second carrier to a terminal, in which the downlink scheduling information sent on the fifth downlink subframe on the first carrier includes a downlink assignment indication, where the downlink assignment indication is used to indicate a cross-carrier downlink scheduling type on the fifth downlink subframe on the first carrier to the terminal.

At time corresponding to the first downlink subframe on the second carrier, a subframe on the first carrier is an uplink subframe, so the DL_Grant on the first downlink subframe on the second carrier cannot be sent on subframe with the same time on the first carrier. In order to distinguish cross-carrier scheduling types at the time of scheduling a DL_Grant in a cross-carrier manner on the first carrier, the DL_Grant corresponding to the first downlink subframe on the second carrier can be configured onto the fifth downlink subframe that is on the first carrier and that is at time before time of the first downlink subframe and be sent, and the cross-carrier downlink scheduling type of the fifth downlink subframe on the first carrier is indicated to the terminal through the DL DAI of the fifth downlink subframe. At this time, the fifth downlink subframe on the first carrier is determined according to a method as follows: determining, according to a first time sequence relationship, all downlink subframes corresponding to a maximum number of uplink ACK/NACKs which a third uplink subframe on the second carrier is capable of feeding back, and determining a downlink subframe at the earliest scheduling time of all the downlink subframes, in which the downlink subframe at the earliest scheduling time is a subframe on the second carrier at the same time as that of the fifth downlink subframe on the first carrier. The first time sequence relationship is an uplink ACK/NACK time sequence relationship when the second carrier is solely configured.

During independent scheduling of the second carrier, which can also be understood as during non-cross-carrier scheduling of the second carrier, the second carrier is used to feed back an uplink ACK/NACK, namely, the second carrier is solely configured and does not need to be scheduled by other carriers in a cross-carrier manner. For example, the terminal is only configured with one carrier: the second carrier, and an uplink ACK/NACK corresponding to a downlink subframe on the second carrier is fed back on the second carrier. When the second carrier is used to feed back an ACK/NACK, all downlink subframes corresponding to uplink ACK/NACKs which the third uplink subframe on the second carrier is capable of feeding back can be understood as an ACK/NACK feedback window of the third uplink subframe on the second carrier. For example, if downlink subframes corresponding to a maximum number of uplink ACK/NACKs which the uplink subframe 2 on the TDD configuration 2 carrier is capable of feeding back are downlink subframes 4, 5, 6 and 8, the ACK/NACK feedback window of the uplink subframe 2 includes these four downlink subframes 4, 5, 6 and 8. Even if the base station only schedules a part of these four subframes, the feedback window still includes four subframes, which does not depend on the number of scheduled subframes. A subframe on the second carrier and at time same as that of the fifth downlink subframe on the first carrier is a subframe at the earliest scheduling time when the second carrier is scheduled by the first carrier in a cross-carrier manner in the ACK/NACK feedback window of the third uplink subframe on the second carrier when the second carrier is solely configured.

In the prior art, through two bits of DL DAI in a DL_grant on a downlink subframe, the sequence at which the downlink subframe is scheduled in an ACK/NACK feedback window of an uplink subframe corresponding to the downlink subframe is distinguished, that is, the sequence at which the DL_Grant is received is identified. When the first carrier schedules the second carrier in a cross-carrier manner, a subframe on the second carrier and at time same as that of the fifth downlink subframe on the first carrier, namely, a subframe with the same time on the second carrier and of the fifth downlink subframe on the first carrier, is a subframe at the earliest scheduling time in the uplink ACK/NACK feedback window of the third uplink subframe on the second carrier, the terminal receives a cross-carrier DL_grant from the fifth downlink subframe on the first carrier, can determine that the DL_grant is a DL_grant at the earliest scheduling time in an ACK/NACK feedback window of an uplink subframe, and can confirm by default that the value of the DL DAI in the DL_grant is 1, and the scheduling sequence indicating the DL_grant does not need to be displayed through the value of the DL DAI, so the DL DAI of the DL_grant can be used for distinguishing the cross-carrier downlink scheduling type. The specific distinguishing method is: if the value of the DL DAI is "01", it denotes that what is scheduled by a corresponding DL_grant is a subframe with the same time of the cross-carrier, which is the subframe with the same time downlink scheduling under the cross-carrier scheduling; if the value of the DL DAI is "10", it denotes that what is scheduled by a corresponding DL_grant is a cross subframe on the cross-carrier, which is the cross-subframe downlink scheduling under the cross-carrier scheduling; if the value of the DL DAI is "11", it denotes that what is scheduled by a corresponding DL_grant is a subframe with the same time and a cross subframe on the cross-carrier, which is the subframe with the same time downlink scheduling under the cross-carrier scheduling and the cross-subframe downlink scheduling under the cross-carrier scheduling. Additionally, other denotation methods can also be used, and the embodiment of the present invention imposes no limitation. If the number of subframes of cross-subframe scheduling is greater than 1, the cross-subframe scheduling can also be bound. For example, if the value of the DL DAI is "01", it denotes that what is scheduled by a corresponding DL_grant is a subframe with the same time of the cross-carrier, which is the subframe with the same time downlink scheduling under the cross-carrier scheduling; if the value of the DL DAI is "10", it denotes that a corresponding DL_grant schedules a plurality of cross subframes under the cross-carrier, which is downlink scheduling of a plurality of cross subframes under the cross-carrier scheduling; if the value of the DL DAI is "11", it denotes that what a corresponding DL_grant schedules a subframe with the same time under the cross-carrier scheduling and a plurality of cross subframes under the cross-carrier, which is the subframe with the same time downlink scheduling and the downlink scheduling of a plurality of cross subframes under the cross-carrier scheduling.

Figure 16B:
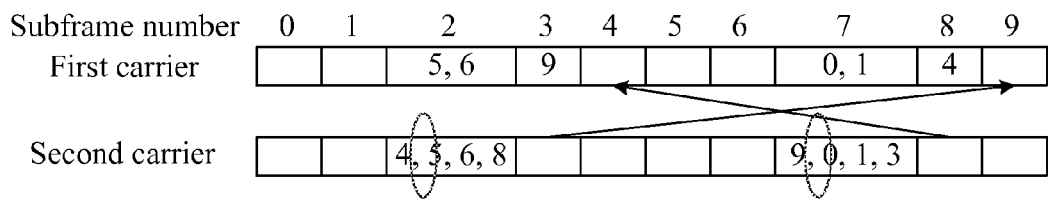
FIG. 16B is an application scenario diagram of Embodiment 6 of the method for sending downlink scheduling information provided by the present invention.

According to a timing relationship between a PDCCH/PDSCH on a second carrier and an uplink ACK/NACK shown in FIG. 16B, during independent scheduling of the second carrier, a subframe for feeding back the ACK/NACK corresponding to the downlink subframe 8 is the uplink subframe 2, and the uplink ACK/NACK feedback window of the uplink subframe 2 is 4, 5, 6 and 8. For example, if the base station schedules all the downlink subframes in the feedback window, the value of the DL DAI in the DL_Grant of the downlink subframe 4 is 1, the value of the DL DAI in the DL_Grant of the downlink subframe 5 is 2, the value of the DL DAI in the DL_Grant of the downlink subframe 6 is 3, and the value of the DL DAI in the DL_Grant of the downlink subframe 8 is 4, the terminal needs to feed back an ACK/NACK corresponding to each of the downlink subframes 4, 5, 6 and 8 to the base station on the uplink subframe 2; if the base station sends no DL_Grant on the downlink subframe 4, and only sends a DL_Grant on each of the downlink subframes 5, 6 and 8, the terminal only feeds back an uplink ACK/NACK corresponding to each of the DL_Grants on the downlink subframe 5, 6 and 8 to the base station on the uplink subframe 2, and does not need to feed back the ACK/NACK corresponding to the DL_Grant on the downlink subframe 4 to the base station on the uplink subframe 2. At this time, the base station only schedules a part of these four subframes 4, 5, 6 and 8, but the uplink ACK/NACK feedback window of the uplink subframe 2 is still 4, 5, 6 and 8, and the uplink ACK/NACK feedback window of the uplink subframe does not depend on the number of subframes scheduled by the base station. Therefore, the ACK/NACK feedback window of the uplink subframe 2 is defined as all the downlink subframes corresponding to the ACK/NACKs which the uplink subframe 2 is capable of feeding back.

Figure 16C:
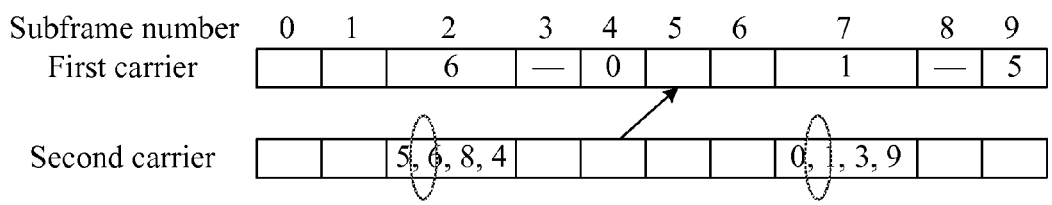
FIG. 16C is an application scenario diagram of Embodiment 6 of the method for sending downlink scheduling information provided by the present invention.

As shown in FIG. 16C, under a scenario that the first carrier schedules the second carrier in a cross-carrier manner, the subframe 8 on the first carrier and at time the same as that of the downlink subframe 8 on the second carrier is an uplink subframe. Therefore, the downlink subframe 8 on the second carrier cannot be scheduled through the uplink subframe 8 of the first carrier. Any one uplink subframe is determined on the second carrier, and the uplink ACK/NACK feedback window of the uplink subframe is determined when the second carrier is used to feed back the uplink ACK/NACK. Later, a subframe at the earliest scheduling time when the second carrier is scheduled by the first carrier in a cross-carrier manner is determined in the ACK/NACK feedback window of the uplink subframe, the DL_grant for scheduling the downlink subframe 8 of the second carrier can be adjusted onto the subframe at the earliest scheduling time and be sent, and a subframe with the same time on the first carrier and of the subframe at the earliest scheduling time is before the time of the downlink subframe 8.

For example, the uplink subframe 2 is determined on the second carrier, and the ACK/NACK feedback window of the uplink subframe 2 is 4, 5, 6 and 8. When the first carrier schedules the second carrier in a cross-carrier manner, the subframe at the earliest scheduling time of all the downlink subframes in the ACK/NACK feedback window of the uplink subframe 2 is the downlink subframe 4, the DL_grant for scheduling the downlink subframe 8 of the second carrier can be adjusted onto the downlink subframe 4 of the first carrier, and the time of the downlink subframe 4 of the first carrier is before that of the downlink subframe 8 of the second carrier. When receiving the DL_grant of the cross-carrier scheduling on the downlink subframe 4 of the first carrier, the terminal can determine that the DL_grant is the DL_grant at the earliest scheduling time in the uplink ACK/NACK feedback window of an uplink subframe on the second carrier, and the value of the DL DAI in the DL_grant can be 1 by default. The DL DAI of the downlink subframe 4 of the first carrier is adopted to distinguish the cross-carrier scheduling type on the downlink subframe 4 of the first carrier, namely, distinguish whether the DL_grant on the downlink subframe 4 of the first carrier schedules a subframe with the same time of the second carrier, or a cross subframe on the second carrier in a cross-carrier manner, or schedules a subframe with the same time and a cross subframe on the second carrier simultaneously.

Furthermore, as shown in FIG. 16B, the uplink subframe 7 is determined on the second carrier, and because the base station sends a DL_Grant on each of the downlink subframes 9, 0, 1 and 3 of the first carrier when the second carrier is used to feed back an ACK/NACK, the ACK/NACK feedback window of the uplink subframe 7 is the downlink subframes 9, 0, 1 and 3. When the first carrier schedules the second carrier in a cross-carrier manner, the subframe at the earliest scheduling time of all the downlink subframes in the ACK/NACK feedback window of the uplink subframe 7 is the downlink subframe 9, the DL_grant for scheduling the downlink subframe 8 of the second carrier can also be adjusted onto the downlink subframe 9 of the first carrier, and the time of the downlink subframe 9 of the first carrier is before that of the downlink subframe 8 of the second carrier. The sending the DL_grant of the downlink subframe 8 of the second carrier on the downlink subframe 4 of the first carrier is compared with the sending the DL_grant of the downlink subframe 8 of the second carrier on the downlink subframe 9 of the first carrier, and the latency between from sending, by the base station, the DL_Grant on the first carrier to the terminal to receiving, by the terminal, the PDSCH scheduled by the DL_Grant on the second carrier is shorter.

As shown in FIG. 16C, under a scenario that the first carrier schedules the second carrier in a cross-carrier manner, the subframe 4 on the first carrier and at time the same as that of the downlink subframe 4 on the second carrier is an uplink subframe. Therefore, the downlink subframe 4 on the second carrier cannot be scheduled through a subframe with the same time on the first carrier, namely, the uplink subframe 4 of the first carrier. When the second carrier is used to feed back the uplink ACK/NACK, the ACK/NACK feedback window of the uplink subframe 2 is 4, 5, 6 and 8. When the first carrier schedules the second carrier in a cross-carrier manner, the downlink subframe 5 on the second carrier becomes the downlink subframe at the earliest scheduling time in the ACK/NACK feedback window of the uplink subframe 2, and the DL_grant for scheduling the downlink subframe 4 of the second carrier can be adjusted onto the downlink subframe 5 of the first carrier. The cross-carrier downlink scheduling type is distinguished through the DL DAI in the DL_grant of the cross-carrier scheduling on the downlink subframe 5 of the first carrier.

As shown in FIG. 16D, under a scenario that the first carrier schedules the second carrier in a cross-carrier manner, the subframe 7 on the first carrier and at time the same as that of the downlink subframe 7 on the second carrier is an uplink subframe. Therefore, the downlink subframe 7 on the second carrier cannot be scheduled through a subframe with the same time on the first carrier. The uplink subframe 2 can be determined on the second carrier, and when the second carrier is used to feed back the uplink ACK/NACK, the ACK/NACK feedback window of the uplink subframe 2 is 1, 5 and 6. When the first carrier schedules the second carrier, the subframe at the earliest scheduling time of all the downlink subframes in the uplink ACK/NACK feedback window of the uplink subframe 2 is the downlink subframe 1, the DL_grant for scheduling the downlink subframe 7 of the second carrier can be adjusted onto the downlink subframe 1 of the first carrier, and the time of the downlink subframe 1 of the first carrier is before that of the downlink subframe 7 of the second carrier. The cross-carrier downlink scheduling type on the downlink subframe 1 of the first carrier is distinguished by adopting the DL DAI in the DL_grant on the downlink subframe 1 of the first carrier. Furthermore, the uplink subframe 4 can also be determined on the second carrier, and when the second carrier is used to feed back the uplink ACK/NACK, the ACK/NACK feedback window of the uplink subframe 4 is 0 and 9. When the first carrier schedules the second carrier, the subframe at the earliest scheduling time of all the downlink subframes in the uplink ACK/NACK feedback window of the uplink subframe 4 is the downlink subframe 0, the DL_grant for scheduling the downlink subframe 7 of the second carrier can be adjusted onto the downlink subframe 0 of the first carrier, and the cross-carrier downlink scheduling type on the downlink subframe 1 of the first carrier is distinguished through the DL DAI in the DL_grant on the downlink subframe 1 of the first carrier. Furthermore, the uplink subframe 3 can also be determined on the second carrier, and when the second carrier is used to feed back the ACK/NACK, the uplink ACK/NACK feedback window of the uplink subframe 4 is 7 and 8. When the first carrier schedules the second carrier, the subframe at the earliest scheduling time of all the downlink subframes in the uplink ACK/NACK feedback window of the uplink subframe 3 is the downlink subframe 8, the DL_grant for scheduling the downlink subframe 7 of the second carrier can be adjusted onto the downlink subframe 8 of the first carrier, and the cross-carrier downlink scheduling type on the downlink subframe 8 of the first carrier is distinguished through the DL DAI in the DL_grant on the downlink subframe 8 of the first carrier.

In the prior art, if at time corresponding to the downlink subframe A on the second carrier, a subframe on the first carrier is a downlink subframe, when a PDCCH on a second carrier is borne on a first carrier, the base station only sends, on subframe with the same time of the downlink subframe A and on the first carrier, namely, a downlink subframe on the first carrier and at time the same as that of the downlink subframe A, the downlink scheduling information corresponding to the downlink subframe A on the second carrier to the terminal. In the following embodiment for sending downlink scheduling information, the base station can send, on a subframe with the same time of the downlink subframe A and on the first carrier, namely, a downlink subframe on the first carrier and at time the same as that of the downlink subframe A, or on a downlink subframe that is on the first carrier and that is at time before time of the downlink subframe A, the downlink scheduling information corresponding to the downlink subframe A on the second carrier to the terminal.

FIG. 17A is a flow chart of Embodiment 7 of the method for sending downlink scheduling information provided by the present invention. As shown in FIG. 17A, this embodiment includes the following steps.

Step 171: A base station determines, in downlink subframes on a second carrier, a downlink subframe A.

Step 172: The base station sends, on a downlink subframe B on a first carrier, downlink scheduling information of a downlink subframe A on a second carrier to a terminal, in which if a subframe on the first carrier at time the same as that of the downlink subframe A on the second carrier is an uplink subframe, time corresponding to the downlink subframe B is before the time corresponding to the downlink subframe A; or if a subframe on the first carrier at time the same as that of the downlink subframe A on the second carrier is a downlink subframe, time corresponding to the downlink subframe B is before the time corresponding to the downlink subframe A, or time corresponding to the downlink subframe B is the same time as the time corresponding to the downlink subframe A.

If a subframe with the same time on the first carrier and of the downlink subframe A on the second carrier, namely, a subframe on the first carrier and at time the same as that of the downlink subframe A on the second carrier, is an uplink subframe, the downlink subframe B at time before that of the downlink subframe A is determined on the first carrier, and the downlink scheduling information corresponding to the downlink subframe A on the second carrier is sent to the terminal on the downlink subframe B of the first carrier. As shown in FIG. 16C, the downlink scheduling information corresponding to the downlink subframe 4 on the second carrier is adjusted onto the downlink subframe 1 on the first carrier and is sent. The downlink scheduling information corresponding to the downlink subframe 9 on the second carrier is adjusted onto the downlink subframe 6 on the first carrier and is sent.

If a subframe on the first carrier at time the same as that of the downlink subframe A on the second carrier is a downlink subframe, the base station can send, on a subframe with the same time of the downlink subframe A and on the first carrier, namely, a downlink subframe on the first carrier and at time the same as that of the downlink subframe A, the downlink scheduling information corresponding to the downlink subframe A on the second carrier to the terminal. As shown in FIG. 17B, the downlink scheduling information corresponding to the downlink subframe 0 on the first carrier can be sent to the terminal on the downlink subframe 0 on the first carrier.

If at time corresponding to the downlink subframe A on the second carrier, a subframe on the first carrier is a downlink subframe, the base station can also send, on a downlink subframe that is on the first carrier and that is at time before time of the downlink subframe A, the downlink scheduling information corresponding to the downlink subframe A on the second carrier to the terminal. As shown in FIG. 16B, the base station can send the downlink scheduling information corresponding to the downlink subframe 1 on the second carrier to the terminal on the downlink subframe 0 on the first carrier, and the base station can send the downlink scheduling information corresponding to the downlink subframe 6 on the second carrier to the terminal on the downlink subframe 5 on the first carrier.

Further, the base station indicates a downlink subframe on the second carrier scheduled by the downlink scheduling information in a cross-carrier manner to the terminal through a subframe indicator field in the downlink scheduling information, so when receiving, on the first carrier, the downlink scheduling information of the second carrier, the terminal determines a downlink subframe, of the second carrier, on which the downlink data scheduled by the downlink scheduling information is received. The subframe indicator field in the downlink scheduling information on the first carrier at least includes at least one of a first value, a second value, a third value and a fourth value.

For example, a bit can be newly added into the PDCCH on the first carrier, and a downlink subframe, on the second carrier, on which the downlink data is scheduled in a cross-carrier manner by the downlink scheduling information on the first carrier is indicated through the newly added bit. The newly added bit is referred to as a subframe indicator field (Sub-frame Indicator Field, SIF for short). Taking a TDD system as an example, the newly added SIF in the downlink scheduling information is two bits, the first value can be 00, the second value can be 01, the third value can be 10, and the fourth value can be 11. That the value of the subframe indicator field is 00 denotes that time corresponding to the downlink subframe A on the second carrier scheduled by the downlink scheduling information in a cross-carrier manner is the same as that corresponding to the downlink subframe B on the first carrier; that the value of the subframe indicator field is 01 denotes that the downlink subframe A on the second carrier scheduled by the downlink scheduling information in a cross-carrier manner is the first downlink subframe lagging behind the time corresponding to the downlink subframe B on the first carrier, namely, the downlink subframe A of the second carrier is the first downlink subframe lagging behind a subframe with the same time on the second carrier and of the downlink subframe B on the first carrier; that the value of the subframe indicator field is 10 denotes that the downlink subframe A on the second carrier scheduled by the downlink scheduling information in a cross-carrier manner is the second downlink subframe lagging behind the time corresponding to the downlink subframe B on the first carrier; that the value of the subframe indicator field is 11 denotes that the downlink subframe A on the second carrier scheduled by the downlink scheduling information in a cross-carrier manner is the third downlink subframe lagging behind the time corresponding to the downlink subframe B on the first carrier.

The base station indicates a downlink subframe on the second carrier scheduled by the downlink scheduling information in a cross-carrier manner to the terminal through a downlink assignment indication (Downlink Assignment Indication, DL DAI for short) in the downlink scheduling information, and the specific indication method is the same as the method for performing indication through an SIF. For example, that the value of the DL DAI is 00 denotes that time corresponding to the downlink subframe A on the second carrier scheduled by the downlink scheduling information in a cross-carrier manner is the same as that corresponding to the downlink subframe B on the first carrier; that the value of the DL DAI is 01 denotes that the downlink subframe A on the second carrier scheduled by the downlink scheduling information in a cross-carrier manner is the first downlink subframe lagging behind the time corresponding to the downlink subframe B on the first carrier, namely, the downlink subframe A of the second carrier is the first downlink subframe lagging behind a subframe with the same time on the second carrier and of the downlink subframe B on the first carrier; that the value of the DL DAI is 10 denotes that the downlink subframe A on the second carrier scheduled by the downlink scheduling information in a cross-carrier manner is the second downlink subframe lagging behind the time corresponding to the downlink subframe B on the first carrier; that the value of the DL DAI is 11 denotes that the downlink subframe A on the second carrier scheduled by the downlink scheduling information in a cross-carrier manner is the third downlink subframe lagging behind the time corresponding to the downlink subframe B on the first carrier.

FIG. 17B and FIG. 17C below are taken as an example to illustrate how to indicate, in the DL-Grant of the cross-carrier scheduling, a downlink subframe on the second carrier scheduled by the DL-Grant in a cross-carrier manner, namely, how to indicate a downlink subframe, on the second carrier, on which the downlink data scheduled by the DL-Grant in a cross-carrier manner is located.

As shown in FIG. 17B, the base station sends the DL-Grant corresponding to the downlink subframe 1 on the second carrier to the terminal on the downlink subframe 0 on the first carrier. The downlink subframe 1 on the second carrier is the first downlink subframe lagging behind a subframe with the same time on the second carrier and of the downlink subframe 0 on the first carrier, so the base station sets, in the PDCCH of the downlink subframe 0 on the first carrier, the value of the SIF corresponding to the DL-Grant corresponding to the downlink subframe 1 on the second carrier scheduled in a cross-carrier manner to 01.

As shown in FIG. 17C, subframes on the first carrier at the same time as that of downlink subframes 3, 4, 8 and 9 on the second carrier are uplink subframes, namely, subframes with the same time on the first carrier and of the downlink subframes 3, 4, 8 and 9 on the second carrier are uplink subframes. During cross-carrier scheduling, the downlink scheduling information corresponding to the downlink subframes 3, 4, 8 and 9 of the second carrier is sent on the first carrier. The DL-Grant corresponding to the downlink subframe 3 of the second carrier can be adjusted onto the downlink subframe 0 on the first carrier in a cross-subframe manner and be borne; the DL-Grant corresponding to the downlink subframe 4 of the second carrier can be adjusted onto the downlink subframe 1 on the first carrier in a cross-subframe manner and be borne; the DL-Grant corresponding to the downlink subframe 8 of the second carrier can be adjusted onto the downlink subframe 5 on the first carrier in a cross-subframe manner and be borne; the DL-Grant corresponding to the downlink subframe 9 of the second carrier can be adjusted onto the downlink subframe 6 on the first carrier in a cross-subframe manner and be borne.

After the DL-Grant corresponding to the downlink subframe 3 of the second carrier is adjusted onto the downlink subframe 0 on the first carrier in a cross-subframe manner and be borne, the downlink subframe 0 on the first carrier bears the DL-Grant corresponding to the downlink subframe 0 on the first carrier, the DL-Grant corresponding to the downlink subframe 0 on the second carrier (cross-carrier subframe with the same time scheduling), and the DL-Grant corresponding to the downlink subframe 3 on the second carrier (cross-carrier cross-subframe scheduling). The base station sets, in the PDCCH of the downlink subframe 0 on the first carrier, the value of the SIF corresponding to the DL-Grant corresponding to the downlink subframe 0 on the second carrier scheduled in a cross-carrier manner to 00, and the value of the SIF corresponding to the DL-Grant corresponding to the downlink subframe 3 on the second carrier to 11. By the same token, the base station sets, on the downlink subframe 1 on the first carrier, the value of the SIF corresponding to the DL-Grant corresponding to the downlink subframe 1 on the second carrier scheduled in a cross-carrier manner to 00, and the value of the SIF corresponding to the DL-Grant corresponding to the downlink subframe 4 on the second carrier to 11. By the same token, the base station sets, on the downlink subframe 5 on the first carrier, the value of the SIF corresponding to the downlink scheduling information corresponding to the downlink subframe 5 on the second carrier scheduled in a cross-carrier manner to 00, and the value of the SIF corresponding to the DL-Grant corresponding to the downlink subframe 8 on the second carrier to 11. By the same token, the base station sets, on the downlink subframe 6 on the first carrier, the value of the SIF corresponding to the DL-Grant corresponding to the downlink subframe 6 on the second carrier scheduled in a cross-carrier manner to 00, and the value of the SIF corresponding to the DL-Grant corresponding to the downlink subframe 9 on the second carrier to 11.

In the method for sending downlink scheduling information of the embodiment of the present invention, when a first carrier bears a PDCCH on a second carrier, if at time corresponding to a downlink subframe A on the second carrier, a subframe on the first carrier is an uplink subframe, a base station sends, on a downlink subframe B on the first carrier whose time is before the time corresponding to the downlink subframe A, downlink scheduling information corresponding to the downlink subframe A on the second carrier to a terminal, so when the first carrier schedules the second carrier in a cross-carrier manner, the base station can send, on the first carrier, downlink scheduling information for scheduling the PDSCH on the second carrier to the terminal. If at time corresponding to the downlink subframe A on the second carrier, a subframe on the first carrier is a downlink subframe, the base station can send, on the downlink subframe B on the first carrier whose time is before the time corresponding to the downlink subframe A, downlink scheduling information corresponding to the downlink subframe A on the second carrier to the terminal, or can also send, on the downlink subframe A of the first carrier, the downlink scheduling information corresponding to the downlink subframe A on the second carrier to the terminal. Further, the base station further indicates a downlink subframe on the second carrier scheduled by the downlink scheduling information in a cross-carrier manner to the terminal through a newly added subframe indicator field in the downlink scheduling information, so when receiving, on the first carrier, the downlink scheduling information of the second carrier, the terminal determines a downlink subframe, of the second carrier, on which the downlink data scheduled by the downlink scheduling information is received.

FIG. 18 is a flow chart of Embodiment 2 of the method for receiving downlink scheduling information provided by the present invention. This embodiment illustrates how the terminal receives, on a corresponding downlink subframe on the second carrier, the downlink data corresponding to the downlink scheduling information according to a subframe indicator field after the base station adds, in a PDCCH, the subframe indicator field for the downlink scheduling information in the embodiment corresponding to FIG. 17A. As shown in FIG. 18, this embodiment includes the following steps.

Step 181: A terminal receives, on a downlink subframe B on a first carrier, downlink scheduling information, of a downlink subframe A on a second carrier, sent by a base station, in which if a subframe on the first carrier at time the same as that of the downlink subframe A on the second carrier is an uplink subframe, time corresponding to the downlink subframe B is before the time corresponding to the downlink subframe A; or If a subframe on the first carrier at time the same as that of the downlink subframe A on the second carrier is a downlink subframe, time corresponding to the downlink subframe B is before the time corresponding to the downlink subframe A, or time corresponding to the downlink subframe B is the same time as the time corresponding to the downlink subframe A.

Step 182: The terminal receives, on the downlink subframe A on the second carrier, downlink data corresponding to the downlink scheduling information according to the received downlink scheduling information.

As shown in FIG. 17B, in combination with the embodiment corresponding to FIG. 16A, after the DL-Grant corresponding to the downlink subframe 3 of the second carrier is adjusted onto the downlink subframe 0 on the first carrier in a cross-subframe manner and be borne, the base station sets, in the PDCCH of the downlink subframe 0 on the first carrier, the value of the SIF corresponding to the DL-Grant of the PDSCH on the downlink subframe 0 on the second carrier scheduled in a cross-carrier manner to 00, and the value of the SIF corresponding to the DL-Grant of the PDSCH on the downlink subframe 3 on the second carrier to 11. The terminal receives, on the PDCCH of the downlink subframe 0 on the first carrier, DL-Grants of three PDSCHs. The value of the SIF corresponding to one DL-Grant thereof is 00, the terminal can determine that the downlink subframe on the second carrier scheduled by the DL-Grant in a cross-carrier manner is a subframe with the same time on the second carrier and of the downlink subframe 0 on the first carrier, namely, the downlink subframe on the second carrier scheduled by the DL-Grant in a cross-carrier manner is at time the same as that of the downlink subframe 0 on the first carrier, and the PDSCH scheduled by the DL-Grant is received on the downlink subframe 0 of the second carrier; the value of the SIF corresponding to another DL-Grant thereof is 11, the terminal can determine that the downlink subframe on the second carrier scheduled by the DL-Grant in a cross-carrier manner is the third downlink subframe at time lagging behind the time corresponding to the downlink subframe 0 on the first carrier, and the downlink scheduling data scheduled by the DL-Grant is received on the downlink subframe 3 of the second carrier; still another DL-Grant has no corresponding SIF, and the terminal determines that the DL-Grant schedules the PDSCH of the downlink subframe 0 on the first carrier in a subframe with the same time scheduling manner under the same-carrier scheduling.

In the method for receiving downlink scheduling information of the embodiment of the present invention, when a first carrier bears a PDCCH on a second carrier, if a subframe on the first carrier at time the same as that corresponding to the downlink subframe A on the second carrier is an uplink subframe, the terminal device receives, on the downlink subframe B on the first carrier whose time is before the time corresponding to the downlink subframe A, downlink scheduling information corresponding to the downlink subframe A on the second carrier sent by the base station, so when the first carrier schedules the second carrier in a cross-carrier manner, the base station can send, on the first carrier, downlink scheduling information for scheduling the PDSCH on the second carrier to the terminal. If a subframe on the first carrier at time the same as that corresponding to the downlink subframe A on the second carrier is a downlink subframe, the terminal can receive, on the downlink subframe B on the first carrier whose time is before the time corresponding to the downlink subframe A, downlink scheduling information corresponding to the downlink subframe A on the second carrier sent by the base station, or can also send, on the downlink subframe A of the first carrier, the downlink scheduling information corresponding to the downlink subframe A on the second carrier to the terminal. Further, the base station further indicates a downlink subframe on the second carrier scheduled by the downlink scheduling information in a cross-carrier manner to the terminal through a newly added subframe indicator field in the downlink scheduling information, so when receiving, on the first carrier, the downlink scheduling information of the second carrier, the terminal determines a downlink subframe, of the second carrier, on which the downlink data scheduled by the downlink scheduling information is received.

In the following embodiment for sending uplink scheduling information, if at time corresponding to the downlink subframe E for scheduling the uplink subframe C on the second carrier during non-cross-carrier scheduling, a subframe on a first carrier is a downlink subframe, the base station can send the UL_grant for scheduling the uplink subframe C on the second carrier to the terminal on the downlink subframe E of the first carrier, and the base station can also send, on any one downlink subframe on the first carrier, the UL_grant for scheduling the uplink subframe C on the second carrier to the terminal, in which the downlink subframe is at time before that of the uplink subframe C of the second carrier and satisfies the minimum scheduling interval: N subframes between the downlink subframe and the uplink subframe C of the second carrier. However, in the prior art, the base station can only send the UL_grant for scheduling the uplink subframe C on the second carrier to the terminal on the downlink subframe E of the first carrier.

Figure 19A:
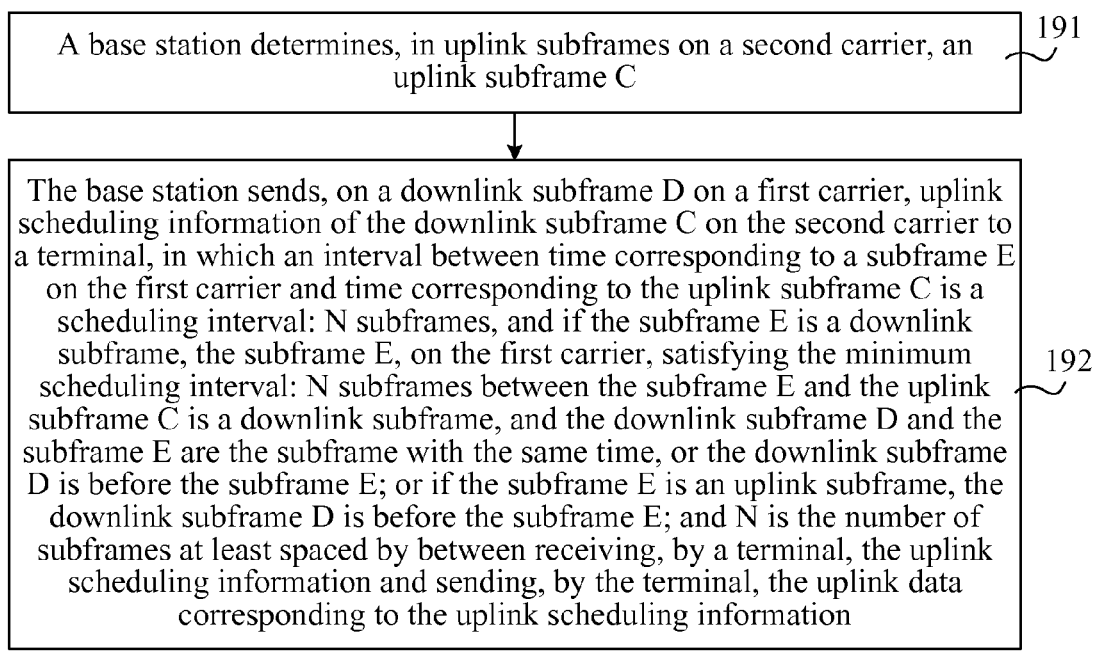
FIG. 19A is a flow chart of Embodiment 5 of the method for sending uplink scheduling information provided by the present invention.

FIG. 19A is a flow chart of Embodiment 5 of the method for sending uplink scheduling information provided by the present invention. As shown in FIG. 19A, this embodiment includes the following steps.

Step 191: A base station determines, in uplink subframes on a second carrier, an uplink subframe C.

Step 192: The base station sends, on a downlink subframe D on a first carrier, uplink scheduling information of the downlink subframe C on the second carrier to a terminal, in which an interval between time corresponding to a subframe E on the first carrier and time corresponding to the uplink subframe C is a scheduling interval: N subframes, and if the subframe E is a downlink subframe, the downlink subframe D and the subframe E are subframes with the same time, or the downlink subframe D is before the subframe E; or if the subframe E is an uplink subframe, the downlink subframe D is before the subframe E; and N is the number of subframes at least which are spaced by between receiving, by a terminal, the uplink scheduling information and sending, by the terminal, the uplink data corresponding to the uplink scheduling information.

The interval between the time corresponding to the subframe E on the first carrier and the time corresponding to the uplink subframe C is the scheduling interval: N subframes, and if the subframe E is a downlink subframe, the base station can send, on the subframe E of the first carrier, or on a downlink subframe that is on the first carrier and that is at time before time of the subframe E, the uplink scheduling information for scheduling the uplink subframe C on the second carrier to the terminal; or if the subframe E is an uplink subframe, the base station can send, on a downlink subframe that is on the first carrier and that is at time before time of the subframe E, the uplink scheduling information for scheduling the uplink subframe C on the second carrier to the terminal.

When at time corresponding to the downlink subframe for scheduling the uplink subframe C, a subframe on the first carrier is the uplink subframe G during non-cross-carrier scheduling of the second carrier, namely, individual configuration, if the uplink subframe G and the uplink subframe C are spaced by N subframes, the downlink subframe D is before the uplink subframe G; if the uplink subframe G and the uplink subframe C are spaced by more than N subframes, and the subframe E, on the first carrier, satisfying the minimum scheduling interval: N subframes between the subframe E and the uplink subframe C is an uplink subframe, the downlink subframe D is a downlink subframe that is on the first carrier and that is at time before time of the subframe E; or if the uplink subframe G and the uplink subframe C are spaced by more than N subframes, and the subframe E, on the first carrier, satisfying the minimum scheduling interval: N subframes between the subframe E and the uplink subframe C is a downlink subframe, the downlink subframe D can be the subframe E of the first carrier, or can also be a downlink subframe that is on the first carrier and that is at time before time of the subframe E.

Figure 19B:
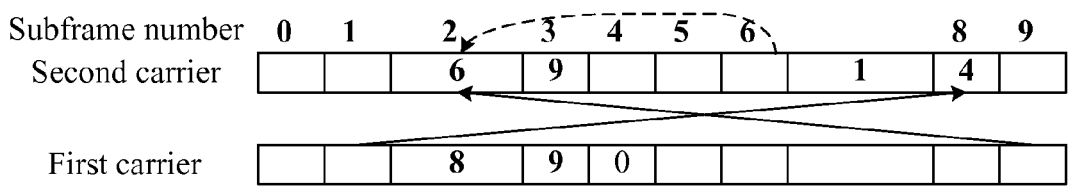
FIG. 19B is an application scenario diagram of a flow chart of Embodiment 5 of the method for sending uplink scheduling information provided by the present invention.

Taking a TDD system as an example, in consideration of the latency from sending, by the base station, the UL_grant to sending, by the terminal, a corresponding PUSCH, at least four subframes are spaced by from sending, by the base station, the UL-grant to sending, by the terminal, the corresponding PUSCH. As shown in FIG. 19B, the base station can send, on any one downlink subframe on the first carrier, the UL-grant for scheduling the uplink subframe 2 on the second carrier to the terminal, in which the downlink subframe is at time corresponding to the uplink subframe 2 on the second carrier, and the downlink subframe and the uplink subframe 2 are at least spaced by four subframes. For example, the downlink subframe 6 on the first carrier and the uplink subframe 2 on the second carrier are spaced by four subframes, and the time of the downlink subframe 6 of the first carrier is before that of the uplink subframe 2 of the second carrier. Therefore, when the PDCCH of the second carrier is borne on the first carrier, the base station can send the UL-grant for scheduling the uplink subframe 2 on the second carrier to the terminal on the downlink subframe 6 on the first carrier. Also, for example, the downlink subframe 9 of the first carrier and the uplink subframe 2 on the second carrier are spaced by seven subframes, and the time of the downlink subframe 9 of the first carrier is before that of the uplink subframe 2 of the second carrier. Therefore, the base station can also send the UL-grant for scheduling the uplink subframe 2 on the second carrier to the terminal on the downlink subframe 9 of the first carrier.

As shown in FIG. 19B, when a subframe, on the first carrier, satisfying the minimum scheduling interval: four subframes between the subframe and the uplink subframe 8 of the second carrier is the uplink subframe 4, and the PDCCH of the second carrier is borne on the first carrier, the UL-grant for scheduling the uplink subframe on the second carrier cannot be sent to the terminal on the uplink subframe 4 of the first carrier. In consideration of the latency from sending, by the base station, the UL_grant to sending, by the terminal, a corresponding PUSCH, the UL_grant for scheduling the uplink subframe 8 of the second carrier can be adjusted onto the downlink subframe 1 on the first carrier and be borne. The time of the downlink subframe 1 on the first carrier is before that of the uplink subframe 8 of the second carrier, and the downlink subframe 1 and the uplink subframe 8 are spaced by eight subframes, thereby satisfying the requirement of the minimum scheduling interval: four subframes.

Further, the base station indicates an uplink subframe on the second carrier scheduled by the uplink scheduling information in a cross-carrier manner through a subframe indicator field in the uplink scheduling information, so the terminal sends uplink data corresponding to the uplink scheduling information to the base station on a corresponding uplink subframe on the second carrier. The subframe indicator field includes at least one of a fifth value, a sixth value, a seventh value and an eighth value. Specifically, a bit can be newly added into the uplink scheduling information of the first carrier, and an uplink subframe, on the second carrier, on which the uplink data scheduled in a cross-carrier manner by the uplink scheduling information on the first carrier is sent is indicated through the newly added bit. The newly added bit is referred to as a subframe indicator field (SIF). The first value included by the SIF can be 00, the second value included by the SIF can be 01, the third value included by the SIF can be 10 and the fourth value included by the SIF can be 11.

Taking a TDD system as an example, the SIF newly added into the PDCCH for the uplink scheduling information is two bits, and because in the TDD system, time of four subframes at least needs to be spaced from sending, by the base station, the uplink scheduling information to sending, by the terminal, corresponding uplink data to the base station, the value of the SIF corresponding to the uplink scheduling information denotes a time relationship between the uplink subframe C of the second carrier scheduled by the uplink scheduling information in a cross-carrier manner, and a subframe with the same time on the second carrier and of the downlink subframe D on the first carrier.

That the value of the SIF is 00 denotes that the uplink subframe C of the second carrier scheduled by the uplink scheduling information in a cross-carrier manner lags behind the time corresponding to the downlink subframe D on the first carrier; that the value of the subframe indicator field SIF is 01 denotes that the uplink subframe C of the second carrier scheduled by the uplink scheduling information in a cross-carrier manner is the first uplink subframe lagging behind the reference subframe F on the second carrier, and the reference subframe F on the second carrier lags behind the time corresponding to the downlink subframe D on the first carrier by N subframes; that the value of the subframe indicator field is 10 denotes that the uplink subframe C of the second carrier scheduled by the uplink scheduling information in a cross-carrier manner is the second uplink subframe lagging behind the reference subframe F on the second carrier; that the value of the subframe indicator field is 11 denotes that the uplink subframe C of the second carrier scheduled by the uplink scheduling information in a cross-carrier manner is the third uplink subframe lagging behind the time corresponding to the reference subframe F on the second carrier.

As shown in FIG. 19B, when the PDCCH of the second carrier is borne on the first carrier, if the base station sends the UL-Grant for scheduling the uplink subframe 2 on the second carrier and the UL-Grant for scheduling the uplink subframe 3 of the second carrier to the terminal on the downlink subframe 9 of the first carrier, the PDCCH of the downlink subframe 9 of the first carrier includes two cross-carrier scheduling UL-Grants, in which the value of the SIF corresponding to the UL-Grant for scheduling the uplink subframe 3 of the first carrier in the PDCCH is 11. The downlink subframe 5 of the second carrier lags behind the time corresponding to the downlink subframe 9 of the first carrier by four subframes, which are referred to as reference subframes. The uplink subframe 2 of the second carrier is the third uplink subframe lagging behind a subframe with the same time of the first carrier and of a reference subframe on the second carrier, so the value of the SIF corresponding to the UL-Grant for scheduling the uplink subframe 3 of the first carrier in the PDCCH is 11.

As shown in FIG. 19B, the subframe, on the first carrier, satisfying the minimum scheduling interval: four subframes between the subframe and the uplink subframe 8 of the second carrier is the uplink subframe 4, and when the PDCCH of the second carrier is borne on the first carrier, in consideration of the latency from sending, by the base station, the UL_grant to sending, by the terminal, a corresponding PUSCH, the UL_grant for scheduling the uplink subframe 8 of the second carrier is borne on the downlink subframe 1 on the first carrier. Furthermore, the time of the downlink subframe 1 of the first carrier is before that of the downlink subframe 7 of the second carrier, and the downlink subframe 1 and the downlink subframe 7 satisfy the requirement of the minimum scheduling interval: four subframes, and when the PDCCH of the second carrier is borne on the first carrier, the UL_grant for scheduling the uplink subframe 7 of the second carrier can be borne on the downlink subframe 1 on the first carrier. Therefore, when the PDCCH of the second carrier is borne on the first carrier, the PDCCH of the downlink subframe 1 of the first carrier includes two cross-carrier scheduling UL-Grants: a UL_grant for scheduling the downlink subframe 7 of the second carrier and a UL_grant for scheduling the uplink subframe 8 of the second carrier. The downlink subframe 5 of the second carrier lags behind the subframe with the same time on the second carrier and of the downlink subframe 1 of the first carrier by four subframes, which are referred to as reference subframes. The downlink subframe 7 of the second carrier is the second uplink subframe lagging behind the reference subframe on the second carrier, so the value of the SIF in the UL_grant of the downlink subframe 7 of the second carrier is set to 10; the downlink subframe 8 of the second carrier is the second uplink subframe lagging behind the reference subframe on the second carrier, so the value of the SIF in the UL_grant for scheduling the uplink subframe 8 of the second carrier is set to 11.

Furthermore, the SIF newly added for the UL_grant in the PDCCH can also be three bits, and because in the TDD system, time of four subframes at least needs to be spaced from sending, by the base station, the UL_grant to sending, by the terminal, the corresponding PUSCH to the base station, valid values of the SIF are 100, 101, 110 and 111 at this time.

In the method for sending uplink scheduling information of the embodiment of the present invention, when a PDCCH on a second carrier is borne on a first carrier, and when a base station sends, on a downlink subframe D on the first carrier, uplink scheduling information corresponding to an uplink subframe C on the second carrier to a terminal, the downlink subframe D can be the downlink subframe E satisfying the minimum scheduling interval: N subframes between the downlink subframe E and the uplink subframe C, or can also be before the downlink subframe E; if a subframe satisfying the minimum scheduling interval: N subframes between the subframe and the uplink subframe C is an uplink subframe, the downlink subframe D is before the subframe satisfying the minimum scheduling interval: N subframes between the subframe and the uplink subframe C. Therefore, the base station can send, on the first carrier, uplink scheduling information for scheduling the PUSCH on the second carrier to the terminal, so as to solve the technical problem that when at time corresponding to the downlink subframe for scheduling the uplink subframe C on the second carrier during non-cross-carrier scheduling, a subframe on the first carrier is an uplink subframe, the base station schedules, on the first carrier, the uplink subframe C on the second carrier. Further, the base station determines an uplink subframe on the second carrier scheduled by the uplink scheduling information in a cross-carrier manner through a subframe indicator field in the uplink scheduling information, so the terminal sends uplink data corresponding to the uplink scheduling information to the base station on a corresponding uplink subframe on the second carrier.

FIG. 20 is a flow chart of Embodiment 2 of the method for receiving uplink scheduling information provided by the present invention. As shown in FIG. 20, this embodiment includes the following steps.

Step 201: A terminal receives, on a downlink subframe D on a first carrier, uplink scheduling information, of an uplink subframe C on a second carrier, sent by a base station, in which the interval between the time corresponding to the subframe E on the first carrier and the time corresponding to the uplink subframe C is the scheduling interval: N subframes, and if the subframe E is a downlink subframe, the downlink subframe D and the subframe E are subframes with the same time, or the downlink subframe D is before the subframe E; or if the subframe E is an uplink subframe, the downlink subframe D is before the subframe E; and N is the number of subframes at least which are spaced by between receiving, by a terminal, the uplink scheduling information and sending, by the terminal, the uplink data corresponding to the uplink scheduling information.

Step 202: The terminal sends uplink data corresponding to the uplink scheduling information to the base station on the uplink subframe C on the second carrier according to the received uplink scheduling information.

Further, the uplink scheduling information received by the terminal further includes a subframe indicator field, and the subframe indicator field corresponding to the uplink scheduling information is used to indicate, to the terminal, an uplink subframe on the second carrier scheduled by the uplink scheduling information in a cross-carrier manner. The terminal sends, on the uplink subframe C on the second carrier, the uplink data corresponding to the uplink scheduling information to the base station according to the uplink scheduling information and the subframe indicator field corresponding to the uplink scheduling information.

In combination with FIG. 19B, when the PDCCH of the second carrier is borne on the first carrier, if the base station sends the UL-Grant for scheduling the uplink subframe 2 on the second carrier and the UL-Grant for scheduling the uplink subframe 3 of the second carrier to the terminal on the downlink subframe 9 of the first carrier, the PDCCH of the downlink subframe 9 of the first carrier includes two cross-carrier scheduling UL-Grants. One UL-Grant is the UL-Grant for scheduling the uplink subframe 2 of the second carrier, the other UL-Grant is the UL-Grant for scheduling the uplink subframe 3 of the first carrier, and the value of the SIF corresponding to the UL-Grant for scheduling the uplink subframe 3 of the first carrier in the PDCCH is 11. When receiving, on the downlink subframe 9 of the first carrier, the UL-Grant, the value of the SIF of which is 11, the terminal determines the uplink subframe 2 of the second carrier scheduled by the UL-Grant is the third uplink subframe lagging behind the time corresponding to a reference subframe on the second carrier, and the terminal sends, on the third uplink subframe lagging behind the time corresponding to the reference subframe on the second carrier, the PUSCH corresponding to the UL_grant to the base station. Here, the reference subframe on the second carrier is the downlink subframe 5 on the second carrier, which lags behind the time corresponding to the downlink subframe 9 of the first carrier by four subframes.

In combination with FIG. 19B, when the PDCCH of the second carrier is borne on the first carrier, the terminal receives, on the downlink subframe 1 of the first carrier, two cross-carrier scheduling UL-Grants: a UL_grant for scheduling the downlink subframe 7 of the second carrier and a UL_grant for scheduling the uplink subframe 8 of the second carrier. The value of the SIF in the UL_grantH of the downlink subframe 7 of the second carrier is set to 10, and the value of the SIF in the UL_grant for scheduling the uplink subframe 8 of the second carrier is set to 11. The downlink subframe 5 of the second carrier lags behind the time corresponding to the downlink subframe 1 of the first carrier by four subframes, which are referred to as reference subframes.

For the UL_grant whose SIF value is 10, the terminal can determine that the uplink subframe on the second carrier scheduled by the UL_grant is the second uplink subframe lagging behind the time corresponding to a reference subframe on the second carrier, and the reference subframe on the second carrier lags behind the subframe with the same time on the second carrier and of the downlink subframe 1 on the first carrier by four subframes, so the terminal sends, on the second uplink subframe lagging behind the time corresponding to the reference subframe on the second carrier, the PUSCH corresponding to the UL_grant to the base station.

For the UL_grant whose SIF value is 11, the terminal can determine that the uplink subframe on the second carrier scheduled by the UL_grant is the third uplink subframe lagging behind the time corresponding to a reference subframe on the second carrier, and the reference subframe on the second carrier lags behind the subframe with the same time on the second carrier and of the downlink subframe 1 on the first carrier by four subframes, so the terminal sends, on the third uplink subframe lagging behind the time corresponding to the reference subframe on the second carrier, the PUSCH corresponding to the UL_grant to the base station.

In the method for receiving uplink scheduling information of the embodiment of the present invention, when a PDCCH on a second carrier is borne on a first carrier, and when a base station sends, on a downlink subframe D on the first carrier, uplink scheduling information corresponding to an uplink subframe C on the second carrier to a terminal, the downlink subframe D can be the downlink subframe E satisfying the minimum scheduling interval: N subframes between the downlink subframe E and the uplink subframe C, or can also be before the downlink subframe E; if a subframe satisfying the minimum scheduling interval: N subframes between the subframe and the uplink subframe C is an uplink subframe, the downlink subframe D is before the subframe satisfying the minimum scheduling interval: N subframes between the subframe and the uplink subframe C. Therefore, the terminal can receive, on the first carrier, uplink scheduling information for scheduling the PUSCH on the second carrier, so as to solve the technical problem that when at time corresponding to the downlink subframe for scheduling the uplink subframe C on the second carrier during non-cross-carrier scheduling, a subframe on the first carrier is an uplink subframe, the terminal receives, on the first carrier, the uplink scheduling information for scheduling the uplink subframe C on the second carrier. Further, the subframe indicator field in the uplink scheduling information is used to indicate an uplink subframe on the second carrier scheduled by the uplink scheduling information in a cross-carrier manner, and the terminal sends uplink data corresponding to the uplink scheduling information to the base station on a corresponding uplink subframe on the second carrier.

FIG. 21 is a schematic structural diagram of Embodiment 2 of the apparatus for sending downlink scheduling information provided by the present invention. As shown in FIG. 21, this embodiment includes: a downlink subframe determining module 211 and a downlink scheduling sending module 212.

The downlink subframe determining module 211 is configured to determine, in downlink subframes on a second carrier, a downlink subframe A.

The downlink scheduling sending module 212 is configured to send, on a downlink subframe B on a first carrier, downlink scheduling information of the downlink subframe A on the second carrier to a terminal, in which if a subframe on the first carrier at time the same as that of the downlink subframe A on the second carrier is an uplink subframe, time corresponding to the downlink subframe B is before the time corresponding to the downlink subframe A; or if a subframe on the first carrier at time the same as that of the downlink subframe A on the second carrier is a downlink subframe, time corresponding to the downlink subframe B is before the time corresponding to the downlink subframe A, or time corresponding to the downlink subframe B is the same time as the time corresponding to the downlink subframe A.

Further, the downlink scheduling information includes a subframe indicator field, and the subframe indicator field is used to indicate the downlink subframe, scheduled by the downlink scheduling information in a cross-carrier manner, on the second carrier. The subframe indicator field in the downlink scheduling information includes at least one of a first value, a second value, a third value and a fourth value; the first value is used to denote that the time corresponding to the downlink subframe A of the second carrier and the time corresponding to the downlink subframe B on the first carrier are the same; the second value is used to denote that the downlink subframe A of the second carrier is the first downlink subframe, of the subframes on the second carrier, which lags behind the time corresponding to the downlink subframe B on the first carrier; the third value is used to denote that the downlink subframe A of the second carrier is the second downlink subframe, of the subframes on the second carrier, which lags behind the time corresponding to the downlink subframe B on the first carrier; the fourth value is used to denote that the downlink subframe A of the second carrier is the third downlink subframe, of the subframes on the second carrier, which lags behind the time corresponding to the downlink subframe B on the first carrier.

Furthermore, the downlink assignment indication in the downlink scheduling information can also be used to indicate the downlink subframe on the second carrier scheduled by the downlink scheduling information in a cross-carrier manner to the terminal. The specific indication method is the same as the subframe indicator field indication method.

For working mechanisms of the modules, reference is made to description in the embodiment corresponding to FIG. 17A, and no more details are given here.

FIG. 22 is a schematic structural diagram of Embodiment 3 of the apparatus for receiving downlink scheduling information provided by the present invention. As shown in FIG. 22, this embodiment includes: a downlink scheduling receiving module 221 and a downlink data receiving module 222.

The downlink scheduling receiving module 221 is configured to receive, on a downlink subframe B on a first carrier, downlink scheduling information, of a downlink subframe A on a second carrier, sent by a base station, in which if a subframe on the first carrier at time the same as that of the downlink subframe A on the second carrier is an uplink subframe, time corresponding to the downlink subframe B is before the time corresponding to the downlink subframe A; or if a subframe on the first carrier at time the same as that of the downlink subframe A on the second carrier is a downlink subframe, time corresponding to the downlink subframe B is before the time corresponding to the downlink subframe A, or time corresponding to the downlink subframe B is the same time as the time corresponding to the downlink subframe A.

The downlink data receiving module 222 is configured to receive, on the downlink subframe A on the second carrier, downlink data corresponding to the downlink scheduling information according to the received downlink scheduling information.

Further, the downlink scheduling information includes a subframe indicator field, and the subframe indicator field is used to indicate the downlink subframe, scheduled by the downlink scheduling information in a cross-carrier manner, on the second carrier, and the subframe indicator field at least includes at least one of a first value, a second value, a third value and a fourth value. The downlink data receiving module 222 is specifically configured to, if the value of the subframe indicator field is the first value, receive, on a subframe on the second carrier at time the same as the time corresponding to the downlink subframe B on the first carrier, the downlink data corresponding to the downlink scheduling information; if the value of the subframe indicator field is the second value, receive, on the first downlink subframe, on the first carrier, which lags behind the time corresponding to the downlink subframe B on the first carrier, the downlink data corresponding to the downlink scheduling information; if the value of the subframe indicator field is the third value, receive, on the second downlink subframe, on the first carrier, which lags behind the time corresponding to the downlink subframe B on the first carrier, the downlink data corresponding to the downlink scheduling information; and if the value of the subframe indicator field is the fourth value, receive, on the third downlink subframe, on the first carrier, which lags behind the time corresponding to the downlink subframe B on the first carrier, the downlink data corresponding to the downlink scheduling information.

For working mechanisms of the modules, reference is made to description in the embodiment corresponding to FIG. 18, and no more details are given here.

FIG. 23 is a schematic structural diagram of Embodiment 2 of the apparatus for sending uplink scheduling information provided by the present invention. As shown in FIG. 23, this embodiment includes: an uplink subframe determining module 231 and an uplink scheduling sending module 232.

The uplink subframe determining module 231 is configured to determine, in uplink subframes on a second carrier, an uplink subframe C.

The uplink scheduling sending module 232 is configured to send, on a downlink subframe D on the first carrier, uplink scheduling information of the uplink subframe C on the second carrier to a terminal, in which the interval between the time corresponding to the subframe E on the first carrier and the time corresponding to the uplink subframe C is the scheduling interval: N subframes, and if the subframe E is a downlink subframe, the downlink subframe D and the subframe E are subframes with the same time, or the downlink subframe D is before the subframe E; or if the subframe E is an uplink subframe, the downlink subframe D is before the subframe E; and N is the number of subframes at least which are spaced by between receiving, by a terminal, the uplink scheduling information and sending, by the terminal, the uplink data corresponding to the uplink scheduling information.

Further, the uplink scheduling information includes a subframe indicator field, and the subframe indicator field indicates the uplink subframe, scheduled by the uplink scheduling information in a cross-carrier manner, on the second carrier to the terminal. The subframe indicator field in the uplink scheduling information includes at least one of a fifth value, a sixth value, a seventh value and an eighth value; the fifth value is used to denote that the time corresponding to the uplink subframe C of the second carrier lags behind the time corresponding to the downlink subframe D on the first carrier are the same by N subframes; the sixth value is used to denote that the uplink subframe C of the second carrier is the first uplink subframe, on the second carrier, which lags behind the time corresponding to the reference subframe F on the second carrier, and the reference subframe F on the second carrier is a subframe, on the second carrier, which lags behind the time corresponding to the downlink subframe D on the first carrier by N subframes; the seventh value is used to denote that the uplink subframe C of the second carrier is the second uplink subframe, on the second carrier, which lags behind the time corresponding to the reference subframe F on the second carrier; the eighth value is used to denote that the uplink subframe C of the second carrier is the third uplink subframe, on the second carrier, which lags behind the time corresponding to the reference subframe F on the second carrier.

For working mechanisms of the modules, reference is made to description in the embodiment corresponding to FIG. 19A, and no more details are given here.

FIG. 24 is a schematic structural diagram of Embodiment 3 of the apparatus for receiving uplink scheduling information provided by the present invention. As shown in FIG. 24, this embodiment includes: an uplink scheduling receiving module 241 and an uplink data sending module 242.

The uplink scheduling receiving module 241 is configured to receive, on a downlink subframe D on a first carrier, uplink scheduling information, of an uplink subframe C on a second carrier, sent by a base station, in which the interval between the time corresponding to the subframe E on the first carrier and the time corresponding to the uplink subframe C is the scheduling interval: N subframes, and if the subframe E is a downlink subframe, the downlink subframe D and the subframe E are subframes with the same time, or the downlink subframe D is before the subframe E; or if the subframe E is an uplink subframe, the downlink subframe D is before the subframe E; and N is the number of subframes at least which are spaced by between receiving, by a terminal, the uplink scheduling information and sending, by the terminal, the uplink data corresponding to the uplink scheduling information.

The uplink data sending module 242 is configured to send, on the uplink subframe C on the second carrier, uplink data corresponding to the uplink scheduling information according to the received uplink scheduling information.

Further, the uplink scheduling information includes a subframe indicator field, and the subframe indicator field indicates the uplink subframe, scheduled by the uplink scheduling information in a cross-carrier manner, on the second carrier to the terminal. The subframe indicator field includes at least one of a fifth value, a sixth value, a seventh value and an eighth value. The uplink data sending module 242 is specifically configured to, if the value of the subframe indicator field is the fifth value, send, on an uplink subframe, on the second carrier, which lags behind time corresponding to the downlink subframe D on the first carrier by N subframes, the uplink data corresponding to the uplink scheduling information to the base station according to the received uplink scheduling information; if the value of the subframe indicator field is the sixth value, send, on the first uplink subframe, on the second carrier, which lags behind time corresponding to a reference subframe on the second carrier, the uplink data corresponding to the uplink scheduling information to the base station, in which the reference subframe on the second carrier lags behind the time corresponding to the downlink subframe D on the first carrier by N subframes; if the value of the subframe indicator field is the seventh value, send, on the second uplink subframe, on the second carrier, which lags behind time corresponding to a reference subframe on the second carrier, the uplink data corresponding to the uplink scheduling information to the base station; and if the value of the subframe indicator field is the eighth value, send, on the third uplink subframe, on the second carrier, which lags behind time corresponding to a reference subframe on the second carrier, the uplink data corresponding to the uplink scheduling information to the base station.

For working mechanisms of the modules, reference is made to description in the embodiment corresponding to FIG. 20, and no more details are given here.

Persons of ordinary skill in the art should understand that, all or part of the steps of the foregoing method embodiments may be implemented by a program instructing relevant hardware. The foregoing program may be stored in a computer readable storage medium. When the program is run, the foregoing steps included in the method embodiments are performed. The foregoing storage medium may be any medium capable of storing program codes, such as a ROM, a RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solution described in the foregoing embodiments or make equivalent replacements to some technical features thereof; without departing from the spirit and scope of the technical solution of the embodiments of the present invention.

What is claimed is:

1. A method for sending uplink scheduling information, comprising:
   determining, in uplink subframes on a second carrier, a first uplink subframe, wherein at a time corresponding to a third downlink subframe for scheduling the first uplink subframe on the second carrier during non-cross-carrier scheduling, a subframe on a first carrier is an uplink subframe; and
   sending, on a sixth downlink subframe on the first carrier, uplink scheduling information corresponding to the first uplink subframe on the second carrier to a terminal, wherein time corresponding to the sixth downlink subframe is before time corresponding to the first uplink subframe.

2. The method for sending uplink scheduling information according to claim 1, wherein the latency between the time corresponding to the sixth downlink subframe and the time corresponding to the first uplink subframe on the second carrier is minimum, and the sixth downlink subframe and the first uplink subframe are spaced by at least N subframes, wherein the N is the number of subframes which are between receiving, by the terminal, the uplink scheduling information and sending, by the terminal, uplink data corresponding to the uplink scheduling information; or
   at the time corresponding to the sixth downlink subframe, a subframe on the second carrier does not bear the uplink scheduling information during non-cross-carrier scheduling.

3. The method for sending uplink scheduling information according to claim 1, wherein the sixth downlink subframe bears uplink scheduling information corresponding to at most one first uplink subframe on the second carrier.

4. The method for sending uplink scheduling information according to claim 1, wherein indicating a cross-carrier uplink scheduling type of the sixth downlink subframe on the first carrier to the terminal through a newly added bit, a newly added scrambling code, a carrier indicator field, transmit power control, a downlink assignment indication, or an uplink index in a physical downlink control channel; or, indicating a cross-carrier uplink scheduling type of the sixth downlink subframe on the first carrier to the terminal through radio resource control signaling, media access control signaling, a search space of a physical downlink control channel or scheduling time of the physical downlink control channel.

5. A method for receiving uplink scheduling information, comprising:
   on a sixth downlink subframe that is on a first carrier and that is at time before that of a first uplink subframe, receiving uplink scheduling information which is sent by a base station and is corresponding to the first uplink subframe on a second carrier, wherein at a time corresponding to a third downlink subframe for scheduling the first uplink subframe on the second carrier during non-cross-carrier scheduling, a subframe on the first carrier is an uplink subframe; and
   sending, on the first uplink subframe on the second carrier, uplink data corresponding to the uplink scheduling information according to the received uplink scheduling information.

6. The method for receiving uplink scheduling information according to claim 5, wherein the latency between sending time corresponding to the sixth downlink subframe and sending time corresponding to the first uplink subframe on the second carrier is minimum, and the sixth downlink subframe and the first uplink subframe are spaced by at least N subframes, wherein the N is the number of subframes which are between receiving, by a terminal, the uplink scheduling information and sending, by the terminal, the uplink data corresponding to the uplink scheduling information;
   or
   at the time corresponding to the sixth downlink subframe, a subframe on the second carrier does not bear the uplink scheduling information during non-cross-carrier scheduling; or
   the sixth downlink subframe bears uplink scheduling information corresponding to at most one first uplink subframe on the second carrier.

7. The method for receiving uplink scheduling information according to claim 5, further comprising:
   receiving a cross-carrier uplink scheduling type of the sixth downlink subframe, wherein the cross-carrier uplink scheduling type is indicated by a newly added bit, a newly added scrambling code, a carrier indicator field, transmit power control, or an uplink assignment indication in a physical downlink control channel; or indicated by radio resource control signaling, media access control signaling, a search space of a physical downlink control channel or a scheduling time of the physical downlink control channel, wherein
   the sending, on the first uplink subframe on the second carrier, uplink data corresponding to the uplink scheduling information according to the received uplink scheduling information comprises:
   sending, on the first uplink subframe on the second carrier, the uplink data corresponding to the uplink scheduling information according to the cross-carrier uplink scheduling type of the sixth downlink subframe and the uplink scheduling information.

8. An apparatus for sending uplink scheduling information, comprising:
   an uplink subframe determining module, configured to determine, in uplink subframes on a second carrier, a first uplink subframe, wherein at a time corresponding to a third downlink subframe for scheduling the first uplink subframe on the second carrier during non-cross-carrier scheduling, a subframe on the a carrier is an uplink subframe; and
   an uplink scheduling sending module, configured to send, on a sixth downlink subframe on the first carrier, uplink scheduling information corresponding to the first uplink subframe on the second carrier to a terminal, wherein time corresponding to the sixth downlink subframe is before time corresponding to the first uplink subframe.

9. The apparatus for sending uplink scheduling information according to claim 8, wherein the latency between sending time corresponding to the sixth downlink subframe and sending time corresponding to the first uplink subframe on the second carrier is minimum, and the sixth downlink subframe and the first uplink subframe are spaced by at least N subframes, wherein the N is the number of subframes which are between receiving, by the terminal, the uplink scheduling information and sending, by the terminal, uplink data corresponding to the uplink scheduling information; or
   at the time corresponding to the sixth downlink subframe, a subframe on the second carrier does not bear the uplink scheduling information during non-cross-carrier scheduling.

10. The apparatus for sending uplink scheduling information according to claim 8, wherein
the uplink scheduling sending module is specifically configured to indicate a cross-carrier uplink scheduling type of the sixth downlink subframe on the first carrier to the terminal through a newly added bit, a newly added scrambling code, a carrier indicator field, transmit power control, a downlink assignment indication, or an uplink index in a physical downlink control channel; or, indicate a cross-carrier uplink scheduling type of the sixth downlink subframe on the first carrier to the terminal through radio resource control signaling, media access control signaling, a search space of a physical downlink control channel or scheduling time of the physical downlink control channel.

11. An apparatus for receiving uplink scheduling information, comprising:
an uplink scheduling receiving module, configured to receive, on a sixth downlink subframe that is on a first carrier and that is at time before that of a first uplink subframe, uplink scheduling information which is sent by a base station and is corresponding to the first uplink subframe on a second carrier, wherein at a time corresponding to a third downlink subframe for scheduling the first uplink subframe on the second carrier during non-cross-carrier scheduling, a subframe on the first carrier is an uplink subframe; and
an uplink data sending module, configured to send, on the first uplink subframe on the second carrier, uplink data corresponding to the uplink scheduling information according to the received uplink scheduling information.

12. The apparatus for receiving uplink scheduling information according to claim 11, wherein the latency between sending time corresponding to the sixth downlink subframe and sending time corresponding to the first uplink subframe on the second carrier is minimum, and the sixth downlink subframe and the first uplink subframe are spaced by at least N subframes, wherein the N is the number of subframes which are between receiving, by a terminal, the uplink scheduling information and sending, by the terminal, the uplink data corresponding to the uplink scheduling information; or
at the time corresponding to the sixth downlink subframe, a subframe on the second carrier does not bear the uplink scheduling information during non-cross-carrier scheduling; or
the sixth downlink subframe bears uplink scheduling information corresponding to at most one first uplink subframe on the second carrier.

13. The apparatus for receiving uplink scheduling information according to claim 11, further comprising:
an uplink scheduling type receiving module, configured to receive a cross-carrier uplink scheduling type of the sixth downlink subframe, wherein the cross-carrier uplink scheduling type is indicated by a newly added bit, a newly added scrambling code, a carrier indicator field, transmit power control, or an uplink assignment indication in a physical downlink control channel; or indicated by radio resource control signaling, media access control signaling, a search space of a physical downlink control channel or scheduling time of the physical downlink control channel, wherein
the uplink scheduling sending module is specifically configured to send, on the first uplink subframe on the second carrier, the uplink data corresponding to the uplink scheduling information according to the cross-carrier uplink scheduling type of the sixth downlink subframe and the uplink scheduling information.

* * * * *

UNITED STATES PATENT AND TRADEMARK OFFICE
CERTIFICATE OF CORRECTION

PATENT NO. : 9,504,054 B2  
APPLICATION NO. : 13/956899  
DATED : November 22, 2016  
INVENTOR(S) : Lei Guan et al.

Page 1 of 1

It is certified that error appears in the above-identified patent and that said Letters Patent is hereby corrected as shown below:

On the Title Page

Page 2, Line 39, Item (56) Other Publications

After "corresponding" delete "corresponding", therefor.

Signed and Sealed this  
Seventh Day of February, 2017

Michelle K. Lee  
*Director of the United States Patent and Trademark Office*